(12) United States Patent
Gadi et al.

(10) Patent No.: US 10,331,546 B2
(45) Date of Patent: *Jun. 25, 2019

(54) DETERMINATION OF A CULPRIT THREAD AFTER A PHYSICAL CENTRAL PROCESSING UNIT LOCKUP

(71) Applicant: VMware, Inc., Palo Alto, CA (US)

(72) Inventors: Sowgandh Sunil Gadi, San Jose, CA (US); Hariprakash Govindarajalu, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 107 days.

This patent is subject to a terminal disclaimer.

(21) Appl. No.: 15/415,261

(22) Filed: Jan. 25, 2017

(65) Prior Publication Data

US 2017/0371766 A1 Dec. 28, 2017

Related U.S. Application Data

(60) Provisional application No. 62/353,721, filed on Jun. 23, 2016.

(51) Int. Cl.
G06F 11/07 (2006.01)
G06F 11/36 (2006.01)
(52) U.S. Cl.
CPC .......... *G06F 11/366* (2013.01); *G06F 11/079* (2013.01); *G06F 11/3664* (2013.01)
(58) Field of Classification Search
CPC ... G06F 11/366; G06F 11/3664; G06F 11/079
See application file for complete search history.

(56) References Cited

U.S. PATENT DOCUMENTS

| 5,111,384 | A | 5/1992 | Aslanian et al. |
| 5,790,779 | A | 8/1998 | Ben-Natan et al. |
| 6,728,907 | B1 | 4/2004 | Wang et al. |
| 6,951,011 | B1 | 9/2005 | Sexton |
| 7,278,058 | B1 | 10/2007 | Narisi |
| 7,475,286 | B2 | 1/2009 | Altaf et al. |
| 7,490,268 | B2 | 2/2009 | Keromytis et al. |
| 8,245,081 | B2 * | 8/2012 | Colbert .............. G06F 11/0766 714/38.1 |
| 8,806,037 | B1 | 8/2014 | Kalra et al. |

(Continued)

FOREIGN PATENT DOCUMENTS

CN 103106132 B 3/2016

OTHER PUBLICATIONS

Seo, et al., "Predicting Recurring Crash Stacks", In Automated Software Engineering (ASE), 2012 Proceedings of the 27th IEEE/ACM International Conference, IEEE, Sep. 2012, pp. 180-189.

(Continued)

*Primary Examiner* — Paul Contino

(57) ABSTRACT

An automated end-to-end analysis of customer service requests is disclosed. A core dump is received, wherein the core dump corresponds to a customer service request regarding a crash of a computer system. A processor automatically analyzes the core dump to determine if a pcpu lockup of the computer system is due to a software issue. Provided the pcpu lockup of the computer system is due to the software issue, the processor determines which thread is a culprit thread responsible for the pcpu lockup of the computer system.

12 Claims, 38 Drawing Sheets

(56) References Cited

U.S. PATENT DOCUMENTS

| | | | |
|---|---|---|---|
| 9,021,312 B1 | 4/2015 | Saxena | |
| 9,529,662 B1 | 12/2016 | Wangkhem et al. | |
| 9,626,277 B2 | 4/2017 | Thangamani et al. | |
| 10,042,695 B1* | 8/2018 | Karppanen | G06F 16/986 |
| 10,191,837 B2 | 1/2019 | Gadi et al. | |
| 2002/0112200 A1 | 8/2002 | Hines | |
| 2003/0070120 A1 | 4/2003 | Michael et al. | |
| 2005/0120273 A1* | 6/2005 | Hudson | G06F 11/0748 |
| | | | 714/38.11 |
| 2006/0004840 A1 | 1/2006 | Senda | |
| 2006/0156077 A1 | 7/2006 | Altaf et al. | |
| 2006/0200701 A1 | 9/2006 | Callender | |
| 2006/0200702 A1* | 9/2006 | Canning | G06F 11/0715 |
| | | | 714/38.1 |
| 2007/0101324 A1* | 5/2007 | Lupu | G06F 9/524 |
| | | | 718/1 |
| 2007/0220513 A1* | 9/2007 | Hwang | G06F 9/524 |
| | | | 718/1 |
| 2007/0283338 A1 | 12/2007 | Gupta et al. | |
| 2008/0126301 A1 | 5/2008 | Bank et al. | |
| 2008/0320336 A1* | 12/2008 | Qadir | G06F 11/0715 |
| | | | 714/42 |
| 2009/0006883 A1 | 1/2009 | Zhang et al. | |
| 2010/0185905 A1 | 7/2010 | Brugler et al. | |
| 2011/0029819 A1 | 2/2011 | Mehta et al. | |
| 2011/0230358 A1 | 9/2011 | Rava | |
| 2012/0117491 A1 | 5/2012 | Arnold | |
| 2013/0061096 A1* | 3/2013 | McCoy | G06F 11/079 |
| | | | 714/45 |
| 2014/0026002 A1 | 1/2014 | Haines | |
| 2014/0181593 A1 | 6/2014 | Smith et al. | |
| 2014/0188829 A1 | 7/2014 | Ranganathan et al. | |
| 2014/0304551 A1 | 10/2014 | Nakai et al. | |
| 2015/0286519 A1 | 10/2015 | Huang et al. | |
| 2015/0317477 A1 | 11/2015 | Piper | |
| 2016/0055262 A1 | 2/2016 | Bhattacharjee et al. | |
| 2016/0085837 A1 | 3/2016 | Kotagiri et al. | |
| 2016/0098325 A1 | 4/2016 | Madou et al. | |
| 2016/0119572 A1 | 4/2016 | Slupik et al. | |
| 2016/0364317 A1 | 12/2016 | Rehman et al. | |
| 2017/0063762 A1 | 3/2017 | Machol et al. | |
| 2017/0235624 A1 | 8/2017 | Farinacci et al. | |
| 2017/0371731 A1 | 12/2017 | Khan et al. | |
| 2017/0371734 A1 | 12/2017 | Gadi et al. | |
| 2017/0371735 A1 | 12/2017 | Gadi et al. | |
| 2017/0371736 A1 | 12/2017 | Gadi et al. | |
| 2017/0371765 A1 | 12/2017 | Gadi et al. | |
| 2017/0371766 A1 | 12/2017 | Gadi et al. | |

OTHER PUBLICATIONS

Smith, "Automated Test Results Processing the Art of Automated Crash Dump & Log Analysis", Mangosoft Incorporated, Mar. 12, 2001, 14 pgs.

* cited by examiner

| Instruction Address | Function | Offset | Tag | Module/ Driver Name |
|---|---|---|---|---|
| 0x41801e7a8633 | LockCheckSelfDeadlockInt | 0x58 | V | vmkernel |
| 0x41801e7a9849 | MCS_LockWait | 0x142 | V | vmkernel |
| 0x41801e7a9ccc | vmk_SpinlockLock | 0x3d | V | vmkernel |
| 0x418029057f49 | X1a._sli_fp_intr_handler | 0xaf | D | lpfc |
| 0x41801e0322be | IRQBH | 0x2e7 | V | vmkernel |
| 0x41801e055fa2 | BH_DrainAndDisableInterrupts | 0xf3 | V | vmkernel |
| 0x41801e041134 | IDT_IntrHandler | 0x1af | V | vmkernel |
| 0x41801e03f262 | gate_entry | 0x64 | V | vmkernel |
| 0x41801e6388a | CpuSchedIdleLoopInt | 0x391 | V | vmkernel |
| 0x41801e631a0 | CpuSchedDispatch | 0x1630 | V | vmkernel |
| 0x41801e6287c | CpuSchedWait | 0x245 | V | vmkernel |
| 0x41801e6271b | CpuSched_VcpuHalt | 0x197 | V | vmkernel |
| 0x41801e94ca2 | VMMVMKCall_Call | 0x48c | V | vmkernel |

FIG. 4

| Instruction Address | Function | Offset | Tag | Module/Driver Name |
|---|---|---|---|---|
| 0x41801e7a8633 | LockCheckSelfDeadlockInt | 0x58 | V | vmkernel |
| 0x41801e7a9849 | MCS_LockWait | 0x142 | V | vmkernel |
| 0x41801e7a9ccc | vmk_SpinlockLock | 0x3d | V | vmkernel |
| 0x41802905749 | x1a_sli_fp_intr_handler | 0xaf | D | lpfc |
| 0x41801e0322be | IRQBH | 0x2e7 | V | vmkernel |
| 0x41801e055fa2 | BH_DrainAndDisableInterrupts | 0xf3 | V | vmkernel |
| 0x41801e041134 | IDT_IntrHandler | 0x1af | V | vmkernel |
| 0x41801e03f262 | gate_entry | 0x64 | V | vmkernel |
| 0x41801e6388a | CpuSchedIdleLoopInt | 0x391 | V | vmkernel |
| 0x41801e631a0 | CpuSchedDispatch | 0x1630 | V | vmkernel |
| 0x41801e6287c | CpuSchedWait | 0x245 | V | vmkernel |
| 0x41801e6271b | CpuSched_VcpuHalt | 0x197 | V | vmkernel |
| 0x41801e94ca2 | VMMVMKCall_Call | 0x48c | V | vmkernel |

Moot funcs

DMLV stack
Tag Seq: D1V2
Suspect: D (lpfc)

Essential stack
838

Benign Function Marker

FIG. 8

Permutations of tag sequence, to be considered

| Component | I | II | III | IV | V | VI | VII |
|---|---|---|---|---|---|---|---|
| N | D | M | L | V | V | V | V |
| N-1 | * | * | D | D | M | L | L |
| N_2 | * | * | * | * | * | V | D |

D  Driver
M  Module
V  VMkernel
L  VMKLinux

FIG. 9

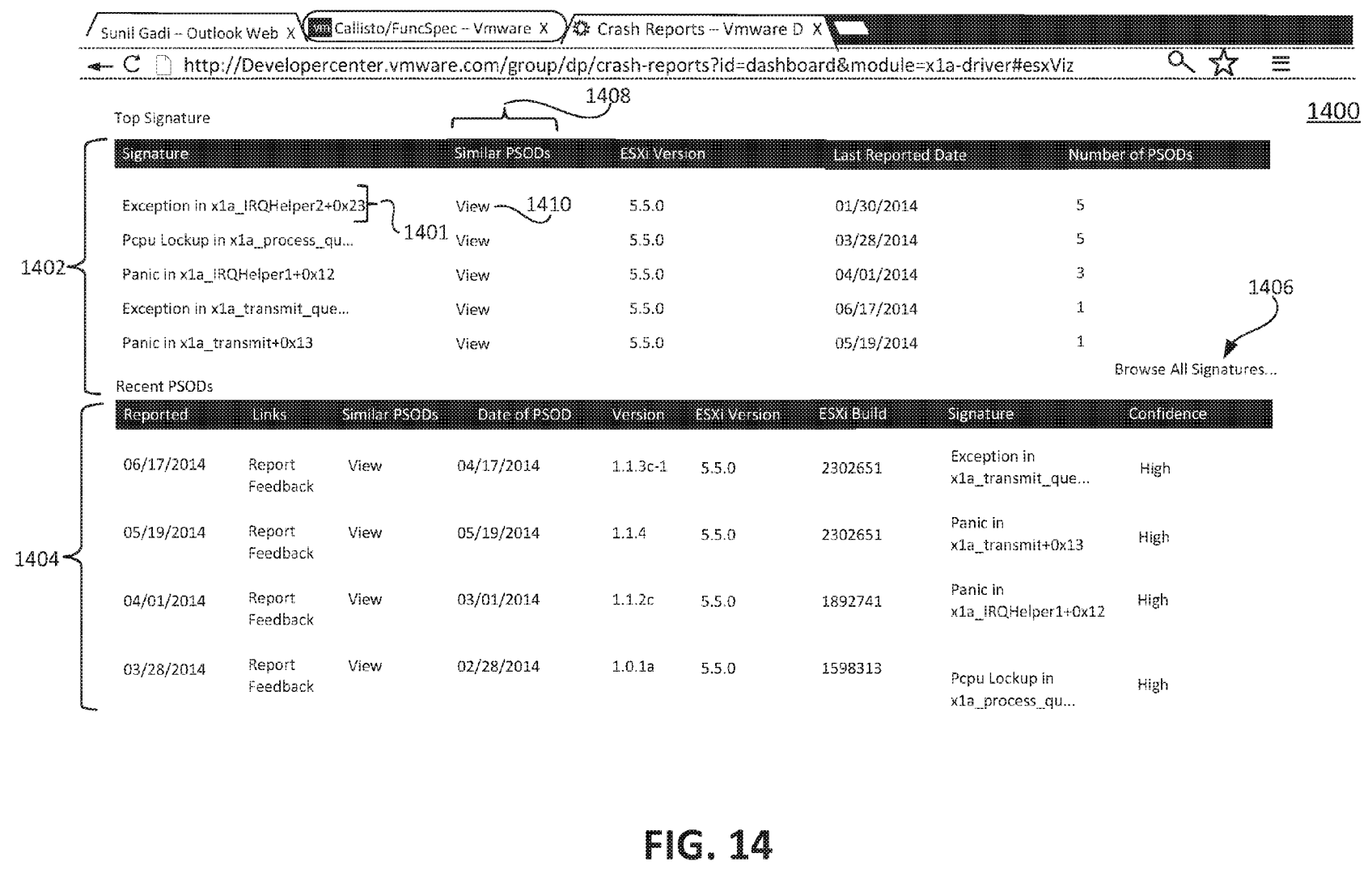

Top Signature

| Signature | Similar PSODs | ESXi Version | Last Reported Date | Number of PSODs |
|---|---|---|---|---|
| Exception in x1a_IRQHelper2+0x23 | View | 5.5.0 | 01/30/2014 | 5 |
| Pcpu Lockup in x1a_process_qu... | View | 5.5.0 | 03/28/2014 | 5 |
| Panic in x1a_IRQHelper1+0x12 | View | 5.5.0 | 04/01/2014 | 3 |
| Exception in x1a_transmit_que... | View | 5.5.0 | 06/17/2014 | 1 |
| Panic in x1a_transmit+0x13 | View | 5.5.0 | 05/19/2014 | 1 |

Browse All Signatures...

Recent PSODs

| Reported | Links | Similar PSODs | Date of PSOD | Version | ESXi Version | ESXi Build | Signature | Confidence |
|---|---|---|---|---|---|---|---|---|
| 06/17/2014 | Report Feedback | View | 04/17/2014 | 1.1.3c-1 | 5.5.0 | 2302651 | Exception in x1a_transmit_que... | High |
| 05/19/2014 | Report Feedback | View | 05/19/2014 | 1.1.4 | 5.5.0 | 2302651 | Panic in x1a_transmit+0x13 | High |
| 04/01/2014 | Report Feedback | View | 03/01/2014 | 1.1.2c | 5.5.0 | 1892741 | Panic in x1a_IRQHelper1+0x12 | High |
| 03/28/2014 | Report Feedback | View | 02/28/2014 | 1.0.1a | 5.5.0 | 1598313 | Pcpu Lockup in x1a_process_qu... | High |

FIG. 14

Developercenter.vmware.com/group/dp/crash-reports?id=Signatures&module=x1a-driver Home / My Home / My Reports / Crash Reports / Signatures    Search Vmware Developer Center... 🔍

Driver/Module: x1a-driver    ESXi Version: All  [View]

Show 10 ▼ entries    Search:

| Signature | Similar PSODs | ESXi Version | Last Reported Date | Number of PSODs |
|---|---|---|---|---|
| Exception in x1a_IRQHelper2+0x23 | View | 5.5.0 | 01/30/2014 | 5 |
| Pcpu Lockup in x1a_process_qu... | View | 5.5.0 | 03/28/2014 | 5 |
| Panic in x1a_IRQHelper1+0x12 | View | 5.5.0 | 04/01/2014 | 3 |
| Exception in x1a_transmit_que... | View | 5.5.0 | 06/17/2014 | 1 |
| Panic in x1a_transmit+0x13 | View | 5.5.0 | 05/19/2014 | 1 |

Showing 1 to 5 of 5 entries 1202    1502    1500

FIG. 15

Developercenter.vmware.com/group/dp/crash-reports?id=psods&module=x1a-driver

Home / My Home / My Reports / Crash Reports / Signatures

Search Vmware Developer Center... 🔍

Driver/Module: x1a-driver  ESXi Version: All  Start Date (Reported):  End Date (Reported):
View
1202                                1502  1602                   1604

Export CSV

Show 10 ▼ entries                                              Search:

1600

| Reported | Links | Similar PSODS | Date of PSOD | Version | ESXi Version | ESXi Build | Signature | Confidence |
|---|---|---|---|---|---|---|---|---|
| 05/17/2014 | Report 1606 Feedback | View | 04/17/2014 | 1.1.3c-1 | 5.5.0 | 2302651 | Exception in x1a_transmit_que... | High |
| 05/19/2014 | Report 1608 Feedback | View | 05/19/2014 | 1.1.4 | 5.5.0 | 2302651 | Panic in x1a_transmit+0x13 | High |
| 04/01/2014 | Report 1610 Feedback | View | 03/01/2014 | 1.1.2c | 5.5.0 | 1892741 | Panic in x1a_IRQHelper 1+0x12 | High |
| 03/28/2014 | Report 1612 Feedback | View | 02/28/2014 | 1.0.1c | 5.5.0 | 1598313 | Pcpu Lockup in x1a_process_qu... | High |
| 03/03/2014 | Report Feedback | View | 03/03/2014 | 1.1.3 | 5.5.0 | 1892741 | Panic in x1a_IRQHelper 1+0x12 | High |
| 03/02/2014 | Report Feedback | View | 03/02/2014 | 1.1.2c | 5.5.0 | 1892741 | Panic in x1a_IRQHelper 1+0x12 | High |
| 02/22/2014 | Report Feedback | View | 02/15/2014 | 1.0.1c | 5.5.0 | 1598313 | Pcpu Lockup in x1a_process_qu... | High |

FIG. 16

Developercenter.vmware.com/group/dp/crash-reports?id=similar&module=x1a-driver&signatureHash=ca872e4144eda636d794f4bb774e208

| Driver/Module Version | ESXi Build |

1700

Driver/Module Version 1.0.0x-2

Show 10 ▼ entries        Search:

| Reported | Links | Date of PSOD | Version | ESXi Version | ESXi Build | Confidence |
|---|---|---|---|---|---|---|
| 01/30/2014 | Report Feedback | 01/30/2014 | 1.0.0c-3 | 5.5.0 | 1598313 | High |
| 01/22/2014 | Report Feedback | 01/22/2014 | 1.0.0c-3 | 5.5.0 | 1598313 | High |
| 01/15/2014 | Report Feedback | 01/15/2014 | 1.0.0c-3 | 5.5.0 | 1474526 | High |
| 01/07/2014 | Report Feedback | 01/07/2014 | 1.0.0c-3 | 5.5.0 | 1598313 | High |
| 01/01/2014 | Report Feedback | 01/01/2014 | 1.0.0c-3 | 5.5.0 | 1474526 | High |

Showing 1 to 5 of 5 entries

Crash Reports -- Vmware D X

Developercenter.vmware.com/group/dp/crash-reports?id=dashboard&module=x1a-driver Top Signature

| Signature | Similar PSODs | ESXi Version | Last Reported Date | Number of PSODs |
|---|---|---|---|---|
| Exception in x1a_IRQHelper2+0x23 | View | 5.5.0 | 01/30/2014 | 5 |
| Pcpu Lockup in x1a_process_qu... | View | 5.5.0 | 03/28/2014 | 5 |
| Panic in x1a_IRQHelper1+0x12 | | | ?/2014 | 3 |
| Exception in x1a_transmit_que... | | | ?/2014 | 1 |
| Panic in x1a_transmit+0x13 | | | ?/2014 | 1 |

Exception:
x1a_IRQHelper2+0x23
x1a_IRQHelper1
x1a_IRQHandler
IDTD_Interrupt
IDT_HandleInterrupt
IDT_IntrHandler
gate_entry 2100
2102

Browse All Signatures...

Recent PSODs

| Reported | Links | Similar PS | | | Id | Signature | Confidence |
|---|---|---|---|---|---|---|---|
| 06/17/2014 | Report Feedback | View | | | ?1 | Exception in x1a_transmit_que... | High |
| 05/19/2014 | Report Feedback | View | 1.1.4 | 5.5.0 | 2302651 | Panic in x1a_transmit+0x13 | High |
| 04/01/2014 | Report Feedback | View | 1.1.2c | 5.5.0 | 1892741 | Panic in x1a_IRQHelper1+0x12 | High |
| 03/28/2014 | Report Feedback | View | 1.0.1a | 5.5.0 | 1598313 | Pcpu Lockup in x1a_process_qu... | High |

FIG. 21

Log msg format

[RDC log prefix key-val pairs] RDC log msg 1
[RDC log prefix key-val pairs] RDC log msg 2 "Found new core dump"
[RDC log prefix key-val pairs] RDC log msg 3 "calling App X..."
[RDC log prefix key-val pairs] [App X prefix key-val pairs] log msg 1
[RDC log prefix key-val pairs] [App X prefix key-val pairs] log msg 2
[RDC log prefix key-val pairs] [App X prefix key-val pairs] log msg 3 "Calling App Y"
[RDC log prefix key-val pairs] [App Y prefix key-val pairs] log msg 1
[RDC log prefix key-val pairs] [App Y prefix key-val pairs] log msg 2
[RDC log prefix key-val pairs] [App Y prefix key-val pairs] log msg 3 "Calling App Z"
[RDC log prefix key-val pairs] [App Z prefix key-val pairs] log msg 1
[RDC log prefix key-val pairs] [App Z prefix key-val pairs] log msg 2
[RDC log prefix key-val pairs] [App Z prefix key-val pairs] log msg 3 "return with success"
[RDC log prefix key-val pairs] RDC log msg 4 "Success. Job Done"

Log msg format

- RDC log msg
  - [RDC key=value,...] RDC verbose Msg
  - RDC key=value pairs
    - RDC_coreId=5743 ← 2602
    - RDC_jobId=7bc98 ← 2604
    - RDC_attempt=1 ← 2608
    - RDC_jobResult=success ← 2610
    - RDC_isErr=TRUE (Set to TRUE only if RDC caused the error. Not set for cascading errors) ← 2612
- An App log msg always prefix'ed by RDC
  - [RDC prefix key=value,...][App X key=value,...] App X verbose msg
  - RDC prefix will be present for all apps log msgs
    - [RDC_coreId=5743, RDC_jobId=7bc98, RDC_attempt=1]  ← 2614
  - App key=value pairs
    - App X_result=success/failure
    - App X_is Err=TRUE (set to TRUE only if App X caused the error. Not set for cascading errors)
      - E.g. if App X fails because of its internal issues it will put AppX_is Err=TRUE. But if App X fails while calling appY it won't put 'AppX_is Err' as part of its log message. In that case AppY is expected to set AppY_isErr=TRUE in its prefix.

FIG. 26

DETERMINATION OF A CULPRIT THREAD AFTER A PHYSICAL CENTRAL PROCESSING UNIT LOCKUP

CROSS-REFERENCE TO RELATED APPLICATIONS

This application claims priority to and benefit of U.S. Provisional Patent Application No. 62/353,721 filed on Jun. 23, 2016 entitled "AUTOMATED END-TO-END SYSTEM AND METHOD FOR ANALYSIS OF CUSTOMER SERVICE REQUESTS" by Sowgandh Sunil Gadi et al., and assigned to the assignee of the present application, which is incorporated herein by reference in its entirety.

This application is related to U.S. patent application Ser. No. 15/415,047 filed Jan. 25, 2017, entitled "AUTOMATED END-TO-END ANALYSIS OF CUSTOMER SERVICE REQUESTS" by Sowgandh Sunil Gadi et al., and assigned to the assignee of the present application, which is incorporated herein by reference in its entirety.

This application is related to U.S. patent application Ser. No. 15/415,089 filed Jan. 25, 2017, entitled "CULPRIT MODULE DETECTION AND SIGNATURE BACK TRACE GENERATION" by Ayoob Khan et al., and assigned to the assignee of the present application, which is incorporated herein by reference in its entirety.

This application is related to U.S. patent application Ser. No. 15/415,135 filed Jan. 25, 2017, entitled "GRAPHICAL USER INTERFACE FOR SOFTWARE CRASH ANALYSIS DATA" by Sowgandh Sunil Gadi et al., and assigned to the assignee of the present application, which is incorporated herein by reference in its entirety.

This application is related to U.S. patent application Ser. No. 15/415,178 filed Jan. 25, 2017, entitled "MONITORING OF AN AUTOMATED END-TO-END CRASH ANALYSIS SYSTEM" by Sowgandh Sunil Gadi et al., and assigned to the assignee of the present application, which is incorporated herein by reference in its entirety.

This application is related to U.S. patent application Ser. No. 15/415,235 filed Jan. 25, 2017, entitled "COMPUTER CRASH RISK ASSESSMENT" by Sowgandh Sunil Gadi et al., and assigned to the assignee of the present application, which is incorporated herein by reference in its entirety.

BACKGROUND ART

In the environment of computing, software products very often include the capability to accommodate third party "plug-ins". Third party plug-ins include, for example, storage drivers, networking drivers, and various other modules made by a third party (i.e., someone other than the party that developed the original software product). As a result, the end product used by customers is frequently comprised of the originally provided software product, e.g., an application, and any number of third party plug-ins. Should a customer experience a problem with the end product, the customer typically reports the problem to the party that developed the original software product. The source of the problem, however, may be one the many third party plug-ins, not the original software product. Thus, it is critical for software developers to be able to accurately determine the actual source of the problem.

As is known in the art, a crash or system crash refers to a situation in which a computer program such as, for example, an operating system or a software application ceases to function properly. When such a crash occurs, a purple screen of death (PSOD) containing a stack trace or listing of threads just prior to the crash is commonly generated. In some cases, depending upon the type operating system or computer platform, the display of the stack trace may have another color or may be referred to using a different name or acronym. Customers may provide the PSOD to the party that developed the original software product and expect a timely and accurate response informing the customer of the source of the crash. It is obvious that there are significant business ramifications associated with incorrectly blaming a party for causing a crash, or for being unable to accurately provide the customer with the source of the crash in a timely manner.

In conventional approaches, after a crash, the support team for the original software product is now faced with the pressure of determining the source of the crash. In the conventional art, in order to determine the source of the crash, the support team typically takes the entire stack trace received from the customer and then manually examines it and compares the entire stack trace to a database of previously received entire stack traces (often such databases are not even available) whose problems were previously determined. That is, in conventional approaches, the support team hopes find some similarity between the current stack trace and a prior stack trace whose problem was previously determined. In so doing, the support team hopes to be able to state, with some level of confidence, that similar stack traces have the same problem source. Unfortunately, such conventional approaches are error prone, tedious, time-consuming, and often fail to yield accurate information about the source of the crash. More specifically, similar stack traces often have very different sources for their corresponding crashes. Thus, conventional approaches for manually comparing stack traces are not acceptable for determining the source of a software crash.

BRIEF DESCRIPTION OF THE DRAWINGS

The accompanying drawings, which are incorporated in and form a part of this specification, illustrate embodiments of the present technology and, together with the description, serve to explain the principles of the present technology. The drawings referred to in this description should not be understood as being drawn to scale except if specifically noted.

FIG. 4 is a table of functions comprising a back trace in accordance with embodiments of the present invention.

FIG. 8 is a table of functions including an essential stack of functions in accordance with embodiments of the present invention.

FIG. 9 is chart of possible tag permutations for the present example computer system in accordance with embodiments of the present invention.

FIG. 14 is an example GUI of tables of crash report data in accordance with various embodiments of the present invention.

FIG. 15 is an example GUI listing signatures and the corresponding PSOD counts for a driver in accordance with various embodiments of the present invention.

FIG. 16 is an example GUI for selecting a start date and an end date for desired crash results in accordance with various embodiments of the present invention.

FIG. 18 is an example GUI which provides a table listing the data for individual crashes in accordance with various embodiments of the present invention.

FIG. 20 is an example GUI which provides a Crash Report Feedback feature in accordance with various embodiments of the present invention.

FIG. 21 is an example GUI which provides the complete signature back trace corresponding to a signature portion in accordance with various embodiments of the present invention.

FIG. 25 is a listing of various example log messages or logs having an example prefix in accordance with embodiments of the present invention.

FIG. 26 is a listing illustrating an example prefix format used in accordance with embodiments of the present invention.

DESCRIPTIONS OF EMBODIMENTS

Figure 1:
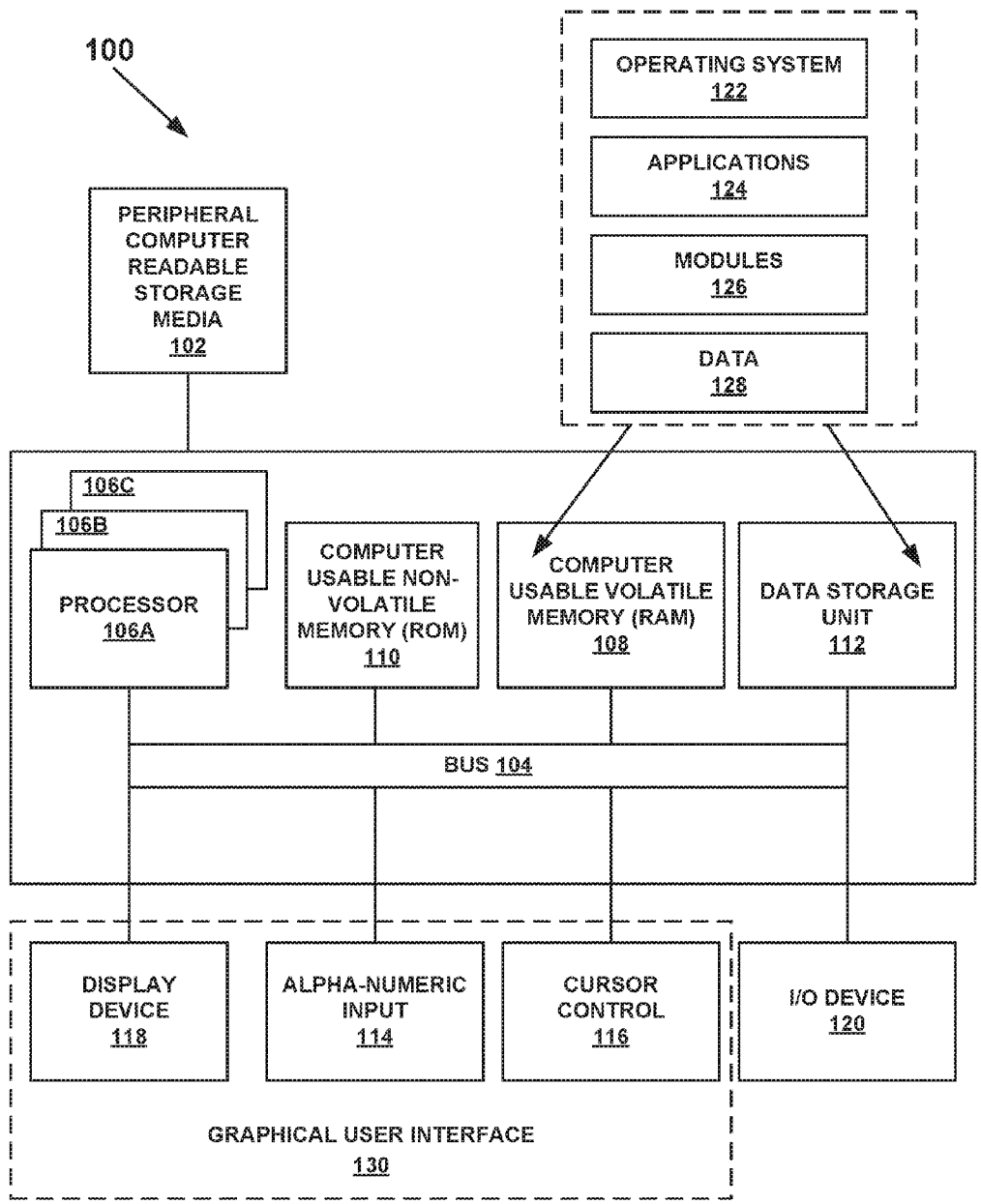
FIG. 1 shows an example computer system upon which embodiments of the present invention can be implemented.

Reference will now be made in detail to various embodiments of the present technology, examples of which are illustrated in the accompanying drawings. While the present technology will be described in conjunction with these embodiments, it will be understood that they are not intended to limit the present technology to these embodiments. On the contrary, the present technology is intended to cover alternatives, modifications and equivalents, which may be included within the spirit and scope of the present technology as defined by the appended claims. Furthermore, in the following description of the present technology, numerous specific details are set forth in order to provide a thorough understanding of the present technology. In other instances, well-known methods, procedures, components, and circuits have not been described in detail as not to unnecessarily obscure aspects of the present technology.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "displaying", "identifying", "generating", "deriving", "providing," "utilizing", "determining," or the like, refer to the actions and processes of an electronic computing device or system such as: a host processor, a processor, a memory, a virtual storage area network (VSAN), a virtualization management server or a virtual machine (VM), among others, of a virtualization infrastructure or a computer system of a distributed computing system, or the like, or a combination thereof. The electronic device manipulates and transforms data, represented as physical (electronic and/or magnetic) quantities within the electronic device's registers and memories, into other data similarly represented as physical quantities within the electronic device's memories or registers or other such information storage, transmission, processing, or display components.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the Figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example mobile electronic device described herein may include components other than those shown, including well-known components.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Example Computer System Environment

With reference now to FIG. 1, all or portions of some embodiments described herein are composed of computer-readable and computer-executable instructions that reside, for example, in computer-usable/computer-readable storage media of a computer system. That is, FIG. 1 illustrates one example of a type of computer (computer system 100) that can be used in accordance with or to implement various embodiments which are discussed herein. It is appreciated that computer system 100 of FIG. 1 is only an example and that embodiments as described herein can operate on or within a number of different computer systems including, but not limited to, general purpose networked computer systems, embedded computer systems, routers, switches, server devices, client devices, various intermediate devices/nodes, stand alone computer systems, media centers, handheld computer systems, multi-media devices, virtual machines, virtualization management servers, and the like. Computer system 100 of FIG. 1 is well adapted to having peripheral tangible computer-readable storage media 102 such as, for example, an electronic flash memory data storage device, a floppy disc, a compact disc, digital versatile disc, other disc based storage, universal serial bus "thumb" drive, removable memory card, and the like coupled thereto. The tangible computer-readable storage media is non-transitory in nature.

System 100 of FIG. 1 includes an address/data bus 104 for communicating information, and a processor 106A coupled with bus 104 for processing information and instructions. As depicted in FIG. 1, system 100 is also well suited to a multi-processor environment in which a plurality of processors 106A, 106B, and 106C are present. Conversely, system 100 is also well suited to having a single processor such as, for example, processor 106A. Processors 106A, 1066, and 106C may be any of various types of microprocessors. System 100 also includes data storage features such as a computer usable volatile memory 108, e.g., random access memory (RAM), coupled with bus 104 for storing information and instructions for processors 106A, 106B, and 106C. System 100 also includes computer usable non-volatile memory 110, e.g., read only memory (ROM), coupled with bus 104 for storing static information and instructions for processors 106A, 106B, and 106C. Also present in system 100 is a data storage unit 112 (e.g., a magnetic or optical disc and disc drive) coupled with bus 104 for storing information and instructions. System 100 also includes an alphanumeric input device 114 including alphanumeric and function keys coupled with bus 104 for communicating information and command selections to processor 106A or processors 106A, 106B, and 106C. System 100 also includes an cursor control device 116 coupled with bus 104 for communicating user input information and command selections to processor 106A or processors 106A, 106B, and 106C. In one embodiment, system 100 also includes a display device 118 coupled with bus 104 for displaying information.

Referring still to FIG. 1, display device 118 of FIG. 1 may be a liquid crystal device (LCD), light emitting diode display (LED) device, cathode ray tube (CRT), plasma display device, a touch screen device, or other display device suitable for creating graphic images and alphanumeric characters recognizable to a user. Cursor control device 116 allows the computer user to dynamically signal the movement of a visible symbol (cursor) on a display screen of display device 118 and indicate user selections of selectable items displayed on display device 118. Many implementations of cursor control device 116 are known in the art including a trackball, mouse, touch pad, touch screen, joystick or special keys on alphanumeric input device 114 capable of signaling movement of a given direction or manner of displacement. Alternatively, it will be appreciated that a cursor can be directed and/or activated via input from alphanumeric input device 114 using special keys and key sequence commands. System 100 is also well suited to having a cursor directed by other means such as, for example, voice commands. In various embodiments, alphanumeric input device 114, cursor control device 116, and display device 118, or any combination thereof (e.g., user interface selection devices), may collectively operate to provide a graphical user interface (GUI) 130 under the direction of a processor (e.g., processor 106A or processors 106A, 106B, and 106C). GUI 130 allows user to interact with system 100 through graphical representations presented on display device 118 by interacting with alpha-numeric input device 114 and/or cursor control device 116.

System 100 also includes an I/O device 120 for coupling system 100 with external entities. For example, in one embodiment, I/O device 120 is a modem for enabling wired or wireless communications between system 100 and an external network such as, but not limited to, the Internet.

Referring still to FIG. 1, various other components are depicted for system 100. Specifically, when present, an operating system 122, applications 124, modules 126, and data 128 are shown as typically residing in one or some combination of computer usable volatile memory 108 (e.g., RAM), computer usable non-volatile memory 110 (e.g., ROM), and data storage unit 112. In some embodiments, all or portions of various embodiments described herein are stored, for example, as an application 124 and/or module 126 in memory locations within RAM 108, computer-readable storage media within data storage unit 112, peripheral computer-readable storage media 102, and/or other tangible computer-readable storage media.

Figure 2:
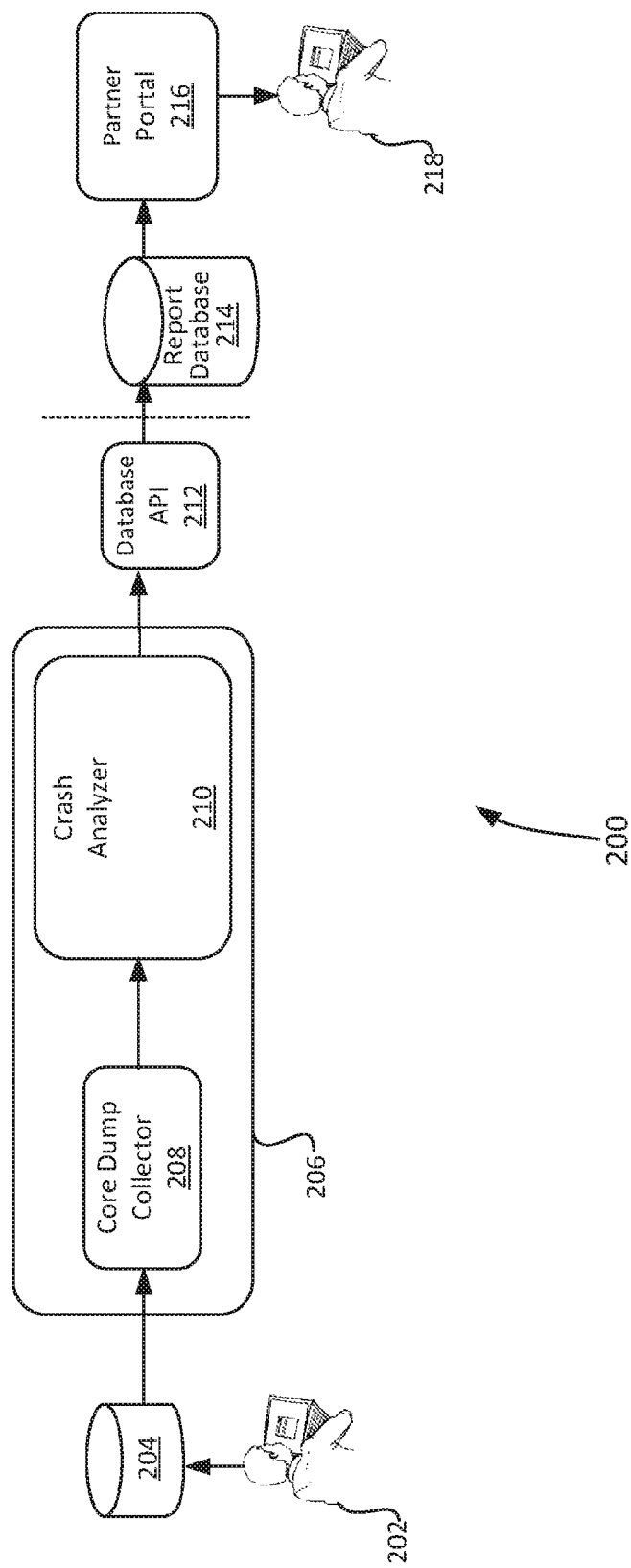
FIG. 2 is a diagram including the various components which comprise an automated end-to-end system for analysis of customer service requests in accordance with embodiments of the present invention.

Automated End-To-End System and Method for Analysis of Customer Service Requests First, a brief overview of the present Automated End-to-End System for Analysis of Customer Service Requests, as depicted in FIG. 2, is provided in the present paragraph. The various embodiments of the present invention provide an automated, end-to-end, system which automatically generates and provides crash report analytics. The various components of the present embodiments, will initially receive a crash report. Next, the components of the present embodiments automatically analyze the core dump of the crash report. Finally, the components of the present embodiments generate a graphical representation summarizing the results for all received crash reports. The below discussion provides a detailed description of various embodiments of the present invention. Additionally, a description of the automated end-to-end method for analysis of customer service requests is provided in conjunction with FIG. 5.

Importantly, for purposes of brevity and clarity, the following detailed description of the various embodiments of the present invention, will be described using an example in which the computer system generating the core dump or PSOD is a VMware ESXi™, enterprise-class, type-1 hypervisor developed by VMware, Inc. of Palo Alto, Calif. for deploying and serving virtual computers. Importantly, although the description and examples herein refer to embodiments of the present invention applied to the above computer system with, for example, its corresponding set of functions, it should be understood that the embodiments of the present invention are well suited to use with various other types of computer systems.

Figure 3:
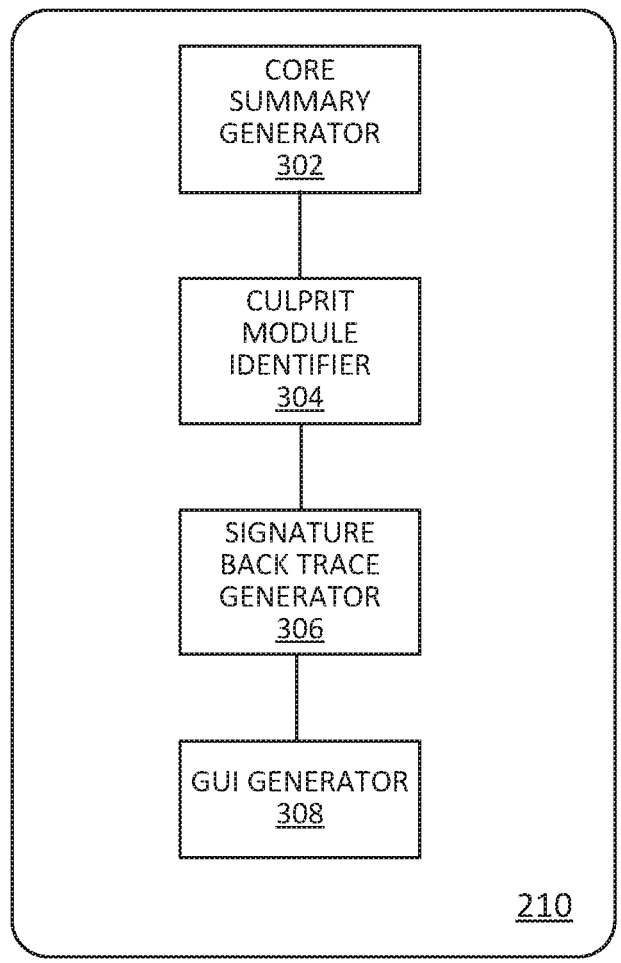
FIG. 3 is a diagram of the various components comprising crash analyzer 210 of FIG. 2, in accordance with embodiments of the present invention.

With reference now to FIG. 2, a diagram 200, including, among other items, the various components which comprise an automated end-to-end system for analysis of customer service requests, is shown. The present discussion will first identify the various components in diagram 200. The present discussion will then describe, in detail, the operation of the various components. As shown in FIG. 2, diagram 200 includes a customer 202 and a customer service request repository 204. FIG. 2 further includes an analysis system 206 which is comprised of the various components, which, in turn, comprise the present automated end-to-end system for analysis of core dumps. Specifically, analysis system 206 includes a core dump collector 208 and a crash analyzer 210. Various components comprising crash analyzer 210 are further discussed below. Referring still to FIG. 2, diagram 200 also includes database application interface (API) 212, a report database 214, and a partner portal 216 which is accessible by a partner 218. It should be understood that in various embodiments of the present invention, one or more of the components of FIG. 3 are embodied in a computer system such as, for example, computers system 100 of FIG. 1. As one example, in various embodiments of the present invention, the operations of crash analyzer 210 are executed using one of more of processors 106a, 106b, and 106c.

Referring still to FIG. 2, in typical operation, customer 202 experiences a computer crash. Once the crash occurs, customer 202 receives a PSOD on his computer display. When presented with the PSOD, customer 202 then generates a service request and uploads the service request, along with the contents of the PSOD (also referred to as a "core dump"), to service request repository 204. As is known in the art, a core dump is a binary file that contains a snapshot of system memory at the time of crash. Using various tools, one is able to extract a "back trace" from the core dump file. Some operating systems display the back trace on the monitor when the crash happens along with generation of the core dump file. For purposes of brevity and clarity the following discussion will describe the operation of the components of FIG. 2 in conjunction with a single core dump. It will be understood, that the embodiments of the present invention are similarly well suited to operation with a plurality of core dumps.

Core dump collector 208 of analysis system 206 receives the core dump from service request repository 204. In various embodiments of the present invention, core dump collector 208 automatically and periodically accesses service request repository 204 to check for core dumps. In various other embodiments, service request repository 204 periodically pushes core dumps to core dump collector 208. In one embodiment, core dump collector 208 performs a check to ensure that the core dump is not a duplicate using, for example, a secure hash algorithm. In various embodiments, core dump collector 208 ignores or discards duplicate core dumps. Core dump collector 208 then assigns various values to the unique core dump including, but not limited to, a location of dump, a timestamp of when the core dump was uploaded by core dump collector 208, an indication of success or failure as will be returned from crash analyzer 210, retry attempts, and the like. The present invention is also well suited to having various other values assigned to the core dump. Dump collector 208 then provides the unique core dump to crash analyzer 210. In various embodiments of the present invention, core dump collector 208 automatically provides the core dump to crash analyzer 210. In various other embodiments, crash analyzer 210 accesses core dump collector 208. Although certain components are depicted in FIG. 2, it should be understood that, for purposes of clarity and brevity, each of the components may themselves be comprised of numerous modules or macros which are not shown.

Referring now to FIG. 3, a detailed diagram including various components of crash analyzer 210 is shown. As shown in FIG. 3, crash analyzer 210 includes a core summary generator 302, a culprit module identifier 304, a signature back trace generator 306, and a GUI generator 308. Upon receiving a core dump, core summary generator 302 generates a core summary. In one embodiment, core summary generator 302 analyzes a core dump and generates a JavaScript Object Notation (JSON) object, and a core summary report in EXtensible Markup Language (XML) format. In such an embodiment, the JSON object contains several key value pairs (i.e., fields and their values). The core summary XML report contains various sections such as the back trace, system information, driver version and firmware information, driver heap memory information, driver scheduled jobs information, driver locks information etc. corresponding to the core dump. Although the above XML core summary report and JSON object pertain to the above-described computer system experiencing a crash, it should be understood that the embodiments of the present invention are well suited to use with various other types of computer systems. Specifically, different types of computer systems will have, for example, different types of crashes, with different types of alerts, and core dumps with different types of information in different formats. However, the inventive concepts of the various embodiments of the present invention are also applicable to the different types of computer systems and their respective types of crashes.

Referring still to core summary generator 302, in various embodiments of the present invention, core summary generator 302 is comprised of numerous modules, not shown. In such embodiments, each module performs an analysis of a specific component. For example, in one embodiment, a physical central processing unit (PCPU) lockup module performs a lockup analysis, an Interrupt module performs interrupt related analysis, a BackTrace module extracts the back trace, etc. Further, in various embodiments, a CoreSummary application loads the macro modules into a GNU debugger (GDB) for the macros to perform their analyses. Once the analyses by all of the macros are complete, core summary generator 302 collects the output, translates it, and generates the JSON object, and XML core summary report. Again, although the above described macros and resulting XML core summary report and JSON object pertain to the above-described computer system experiencing a crash, it should be understood that the embodiments of the present invention are well suited to use with various other types of computer systems. Specifically, different types of computer systems will have, for example, different methods for analyzing crash data. However, the inventive concepts of the various embodiments of the present invention are also applicable to the different types of computer systems and their respective types of crash data.

Referring briefly to FIG. 4, a back trace 400 or stack of functions of a culprit thread is shown. In the present application, the term "core dump" is used to represent information from a received PSOD, including the back trace or listing of functions. As stated above, a user typically delivers the PSOD or core dump to, for example, a service request repository. Typically, a core summary is derived, by core summary generator 302 of FIG. 3, from the core dump or PSOD. Back trace 400 or stack of functions corresponds to a thread (i.e. the "culprit thread") which the user believes is causing a software crash. It will be understood that the core dump or PSOD may include some additional information other than the back trace or stack of functions corresponding to the culprit thread. As such, in the present application, the terms "crash report", "core dump", "core summary", "back trace", "function stacks", "stack of functions", "PSOD", and the like, may be used interchangeably as they often are in the art. Further, in 400, that stack of functions is presented in the column entitled "function". Information provided in other columns is generated by crash analyzer 210.

Although shown in black and white in the present patent application, it will be understood that such back traces or function stacks are often presented to the user, on the user's display, in a color such as, for example, purple. Additionally, as these back traces are found in a core dump of a stack of functions resulting in a software crash, these back traces or core dumps are sometimes referred to as a purple screen of death (PSOD). It will be understood that is some cases, depending upon the type operating system or computer platform, the display of the PSOD may have another color or may be referred to using a different name or acronym. For purposes of clarity and brevity, examples used in the present application will refer to such core dumps or displays as PSODs. Furthermore, again for purposes of brevity and clarity, the following description of the various embodiments of the present invention, will be described using an example in which the computer system generating the core dump or PSOD is a VMware ESXi™, enterprise-class, type-1 hypervisor developed by VMware, Inc. of Palo Alto, Calif. for deploying and serving virtual computers. Importantly, although the description and examples herein refer to embodiments of the present invention applied to the above computer system with, for example, its corresponding set of functions, it should be understood that the embodiments of the present invention are well suited to use with various other types of computer systems. Specifically, different types of computer systems will have, for example, a different operating system and/or different types of function stacks or back traces. However, the inventive concepts of the various embodiments of the present invention are also applicable to the different types of computer systems and their respective types of functions.

Referring again to crash analyzer 210 of FIGS. 2 and 3, crash analyzer 210 employs culprit module identifier 304 and signature back trace generator 306 to analyze back trace 400 of FIG. 4. In brief, culprit module identifier 304 and signature back trace generator 306 automatically identify a culprit module and automatically generate a signature back trace corresponding to the software symptom of each received PSOD. Importantly, in various embodiments, should there be any failure during the operations of analysis system 206, the process will default to restart from the beginning. In so doing, analysis system 206 provides a robust fallback position for the received core dumps and helps to ensure that each core dump is properly analyzed. A detailed description of the operation of crash analyzer 210 including the operation of culprit module identifier 304 and signature back trace generator 306 is provided below. Similarly, a detailed description of the operation of GUI generator 308 is provided below.

Referring still to crash analyzer 210 of FIGS. 2 and 3, in one embodiment of the present invention, crash analyzer 210 validates the input from core dump collector 208. Crash analyzer 210 of the present embodiment then checks dependencies and calls the CoreSummary application described above. In the present embodiment, crash analyzer 210 then validates the JSON object and the XML core summary report generated by core summary generator 302 of FIG. 3. Further, if crash analyzer 210 finds that an error has happened during the analysis (described in detail below), crash analyzer 210 returns a FATAL error or a retry again (EAGAIN) error. Crash analyzer 212 and database API 212 may sometimes fail due to issues with external dependencies such as symbol server down, intermittent network issues, scheduled maintenance, and similar. In such instances crash analyzer 212 fails and returns the EAGAIN error to core dump collector 208. Upon receiving the EAGAIN error, in various embodiments of the present invention, core dump collector 208 will retry after a given configurable time and/or will execute a number of retry attempts. After all the retry attempts are exhausted, in various embodiments, core dump collector 208 will stop retrying. As stated above, although the crash analyzer operations pertain to the above-described computer system experiencing a crash, it should be understood that the embodiments of the present invention are well suited to use with various other types of computer systems. However, the inventive concepts of the various embodiments of the present invention are also applicable to the different types of computer systems and their respective types of crash data.

Referring still to FIG. 3, in the present embodiments, culprit module identifier 304 and signature back trace generator 306 perform a novel process for culprit module identification and signature back trace generation which is necessarily rooted in computer technology to overcome a problem specifically arising in the realm of the analysis of crash reports for computer systems. Thus, embodiments of the present analysis system 206 of FIG. 2 provide a heretofore unknown end-to-end system and method by which it is possible to, from a back trace derived from the PSOD, identify a culprit module and generate a signature back trace which corresponds to the software symptom of the received PSOD. Thus, embodiments of present analysis system 206 provide an end-to-end method and system which amounts to significantly more than merely comparing a back trace of one PSOD to a back trace of another PSOD using a computer. That is, the present embodiments provide significantly more than merely applying conventional processes on a computer. Further, in some embodiments of the present invention, the culprit module is accurately identified and the signature back trace is automatically generated in near real time. In addition to identifying the culprit module, by providing a signature back trace, culprit module identifier 304 and signature back trace generator 306 provide specific code-based information about the source of the reported crash. Again, a detailed description of the operations of culprit module identifier 304 and signature back trace generator 306 is provided below.

Referring still to FIG. 3, in the present end-to-end method performed by analysis system 206 of FIG. 2, the results from culprit module identifier 304 and signature back trace generator 306 are then provided to GUI generator 308. In various embodiments, GUI generator 308 generates graphical representations of the results received from culprit module identifier 304 and signature back trace generator 306. In embodiments of the present invention, GUI generator 308 generates novel graphical representations which were previously not possible using conventional manual back trace comparisons. The graphical representations of GUI generator 308 provide analytics and new found insight for customer support teams. These analytics and new found insight all enable the support team to provide verifying data along with the support team's determination of the problem source (i.e., the culprit module) for a reported crash. Again, a detailed description of the operation of GUI generator 308 is provided below.

With reference again to FIG. 2, the graphical representations of the results received from culprit module identifier 304 and signature back trace 306, are forwarded from analysis system 206 to a database API 212. Database API 212 ensures that the graphical representations are in the proper state to be stored in report database 214. More specifically, in various embodiments of the present invention, crash analyzer 210 outputs xml data and JSON data of an individual crash to the report database 214 through database API 212. Over time, the database accumulates data of several thousands of crashes. As will be described below in detail, the final GUI presentation will "bucket" the various crashes and a web server, not shown, of partner portal 216 will generate the corresponding charts, graphs, etc. In one embodiment of the present invention pertaining to the above described example computer system, database API 212 receives the previously mentioned JSON object and XML core summary report from crash analyzer 210. In one such embodiment, database API 212 performs a schema validation of the JSON object and performs a schema validation of the XML core summary report. If everything is found to be fine, database API 212 writes the JSON object and the XML core summary report to report database 214. Although the above operations of database API 212 pertain to the above-described computer system experiencing a crash, it should be understood that the embodiments of the present invention are well suited to use with various other types of computer systems. Specifically, different types of computer systems will have, for example, different types of APIs and may utilize databases requiring information in different formats.

However, the inventive concepts of the various embodiments of the present invention are also applicable to the different types of computer systems and their respective types of APIs and databases.

In one embodiment of the present invention pertaining to the above described example computer system, Partner portal 216 accesses report database 214 and via, for example, a website enables a partner 218 to access the graphical representations stored in report database 214. In so doing, partner 218 is able to access, for example, the graphical representations of the results derived by crash analyzer 210 of analysis system 206. In one embodiment, partner portal 216 further includes a messaging component, not shown, for communicating crash results or other information with desired parties.

Figure 5:
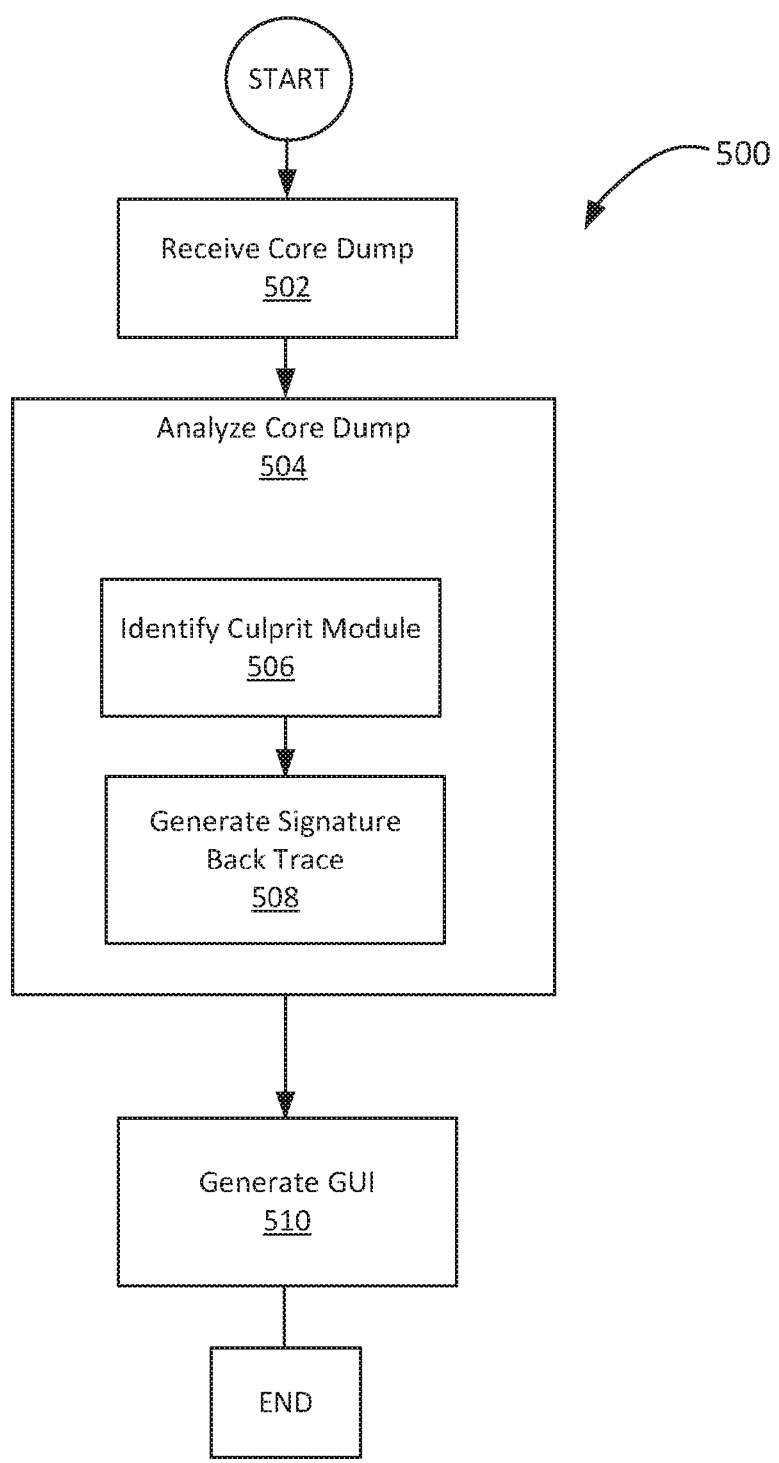
FIG. 5 is a flowchart of various processes performed in an automated end-to-end method for analysis of customer service requests in accordance with embodiments of the present invention.

Referring now to FIG. 5, a flowchart 500 is provided which shows various processes performed in accordance with embodiments of the present automated end-to-end method for analysis of customer service requests. At 502, the present embodiment of the automated end-to-end method for analysis of customer service requests begins by receiving a core dump.

At 504 of flowchart 500 of FIG. 5, the core dump received at 502 is analyzed. In the present automated end-to-end method for analysis of customer service requests, the analysis includes 506 and 508.

At 506, the present automated end-to-end method for analysis of customer service requests initially analyzes the core dump by identifying the culprit module.

At 508, the present automated end-to-end method for analysis of customer service requests continues with the analysis of the core dump by generating a signature back trace corresponding to the core dump received at 502. Importantly, a detailed description of the analysis of the core dump including the identification of culprit module and the generation of a signature back trace provided below.

At 510, after the identification of culprit module at 506 and the generation of a signature back trace at 508, a GUI is generated to graphically represent the results of 506 and 508.

Thus, the present embodiments provide an automated end-to-end system and method for analysis for customer service requests.

Culprit Module Detection and Signature Back Trace Generation Process

A brief overview of the present Culprit Module Detection and Signature Back Trace Generation Process, of, for example, FIGS. 6-11, is provided in the present paragraph. As is known in the art, a crash or system crash refers to a situation in which a computer program such as, for example, an operating system or a software application ceases to function properly. Using a back trace derived from a received PSOD, embodiments in accordance with the present invention automatically determine which module/driver (referred to as the "culprit module") is responsible for causing a particular crash depicted in the PSOD. Furthermore, embodiments in accordance with the present invention will automatically generate a representative signature back trace which corresponds to the software symptom of the received PSOD. The below discussion provides a detailed description of various embodiments of the present invention.

Figure 6:
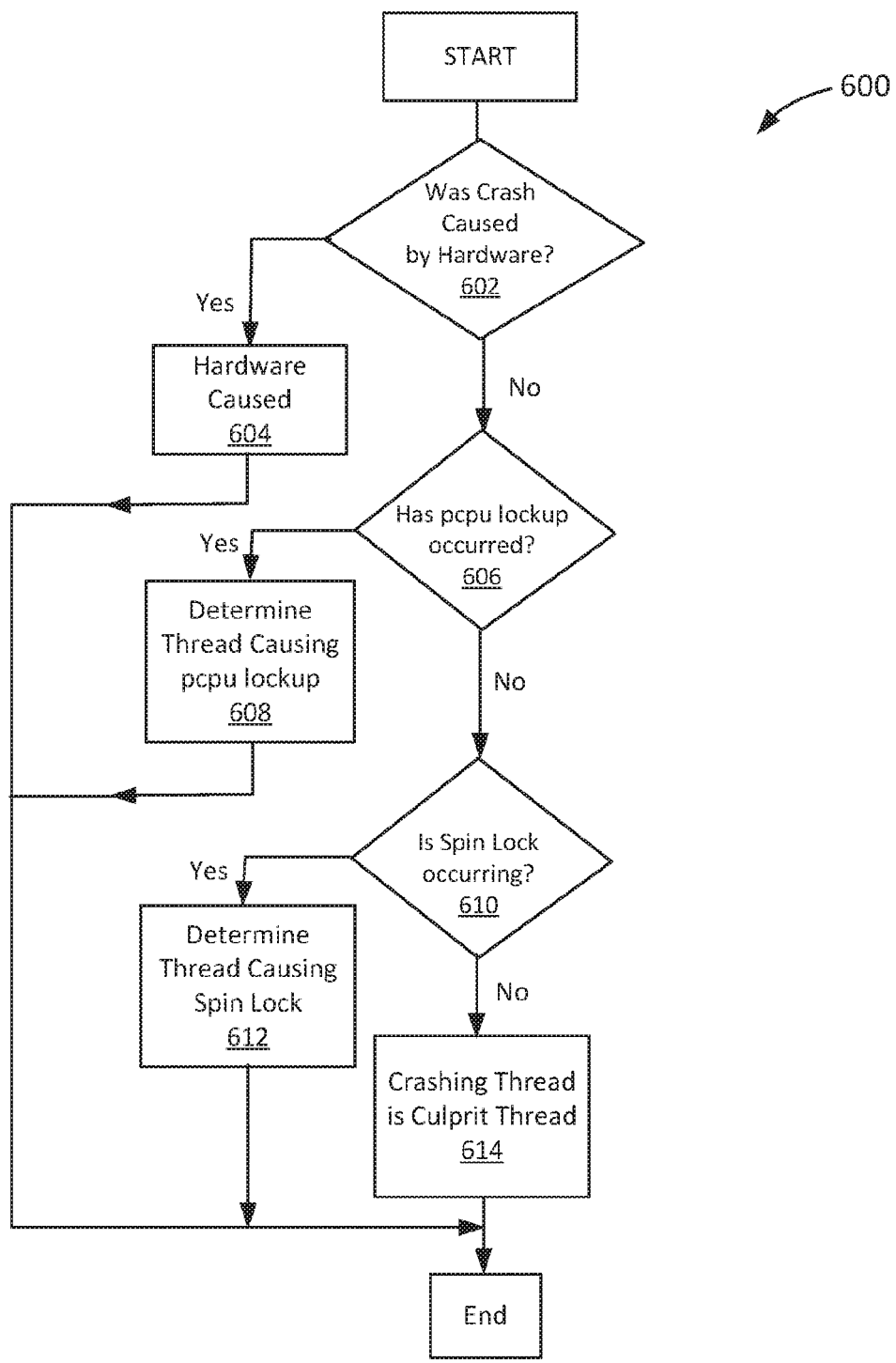
FIG. 6 is a flowchart of various processes performed to determine a culprit thread in accordance with embodiments of the present invention.
Figure 7:
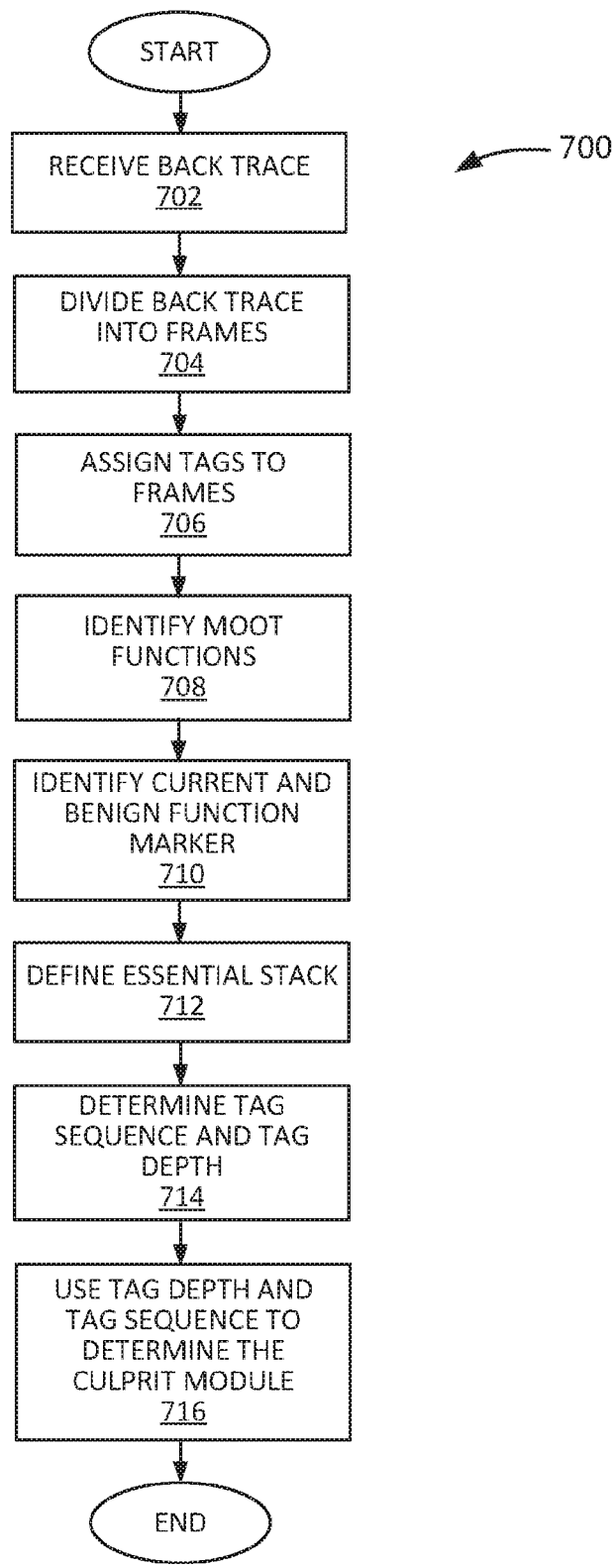
FIG. 7 is a flowchart of various processes performed to identify a culprit module in accordance with embodiments of the present invention.
Figure 10:
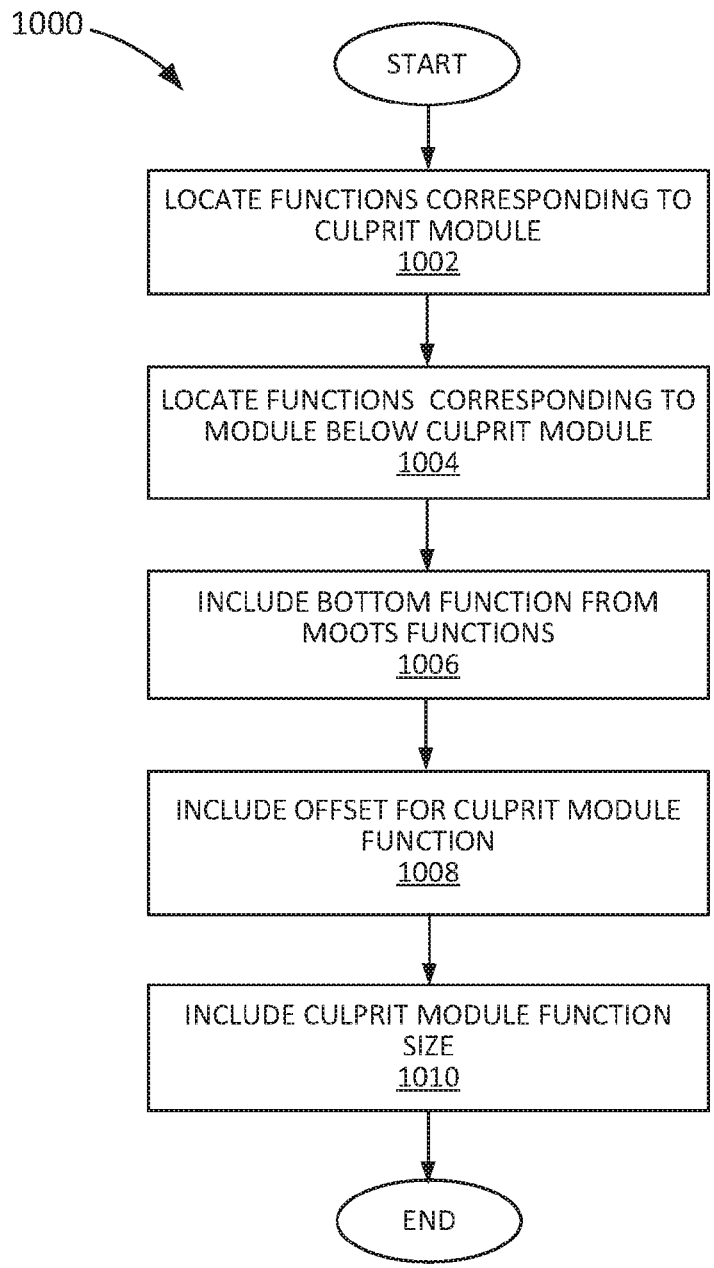
FIG. 10 is a flowchart of various processes performed to generate a signature back trace in accordance with embodiments of the present invention.

FIGS. 6, 7 and 10 are flow diagrams of an example method for culprit module detection and generating a signature back trace, according to various embodiments. Procedures of this method will be described with reference to elements and/or components of, for example, FIGS. 1-11. It is appreciated that in some embodiments, the procedures may be performed in a different order than described, that some of the described procedures may not be performed, and/or that one or more additional procedures to those described may be performed. Flow diagram 600 includes some procedures that, in various embodiments, are carried out by one or more processors under the control of computer-readable and computer-executable instructions that are stored on non-transitory computer-readable storage media. It is further appreciated that one or more procedures described in the flow diagrams may be implemented in hardware, or a combination of hardware with firmware and/or software, such as is shown, for example, in FIG. 1. More specifically, various embodiments of the present invention, as described in detail below, are performed by crash analyzer 210 of FIGS. 2 and 3. In other approaches, the various embodiments of the present invention are performed on a crash analyzer which operates outside of an end-to-end system and method.

Referring again to FIG. 6, in one embodiment, as shown at 602, the present invention initially determines whether a reported crash was caused by hardware. In one embodiment, the present embodiment looks for a Machine Check Exception (MCE), a System Management Interrupt (SMI), or any other operation indicating that the crash was hardware related. If such an indication is located, at 604, the present embodiment determines that the crash corresponding to the core dump was caused by hardware. At 602, if the crash was not caused by hardware, the present embodiment, must then determine what software and, more specifically, which thread or "world", in which the crash is occurring. That is, embodiments in accordance with the present invention must determine which thread is the culprit thread. If the crash is caused by hardware, embodiments of the present invention indicate that the cause of the PSOD is hardware-based. Further, a detailed description of the process used to determine whether a reported a physical central processing unit (PCPU) lockup crash was caused by hardware is provided below in conjunction with the discussion of FIGS. 36-37.

At 606, to determine which thread is the culprit thread, the present embodiment then determines whether a physical central processing unit (pcpu) lockup or "hang" has occurred. For clarification, a pcpu lockup occurs when one or more threads run in kernel/privileged context for a longer period without yielding the CPU (central processing unit) to the scheduler and/or not serving interrupts (for a longer period of time). This may be due to interdependencies between these threads, but often one thread is causing other threads to lockup. Importantly, a pcpu lockup can occur in one thread although another thread is responsible for the pcpu lockup. That is, a first thread may be found to be looping or otherwise in a pcpu lockup. Upon closer inspection, it is sometimes determined that a second thread is causing the first thread to experience the pcpu lockup. As an example, a first thread may be awaiting a lock that is being improperly held by a second thread. Thus, the first thread experiences the pcpu lockup, but the second thread, which improperly holding the lock, is causing the pcpu lockup of the first thread. In such situations, it is important to identify the second thread (not the first thread) as the culprit thread which corresponds to the pcpu lockup and corresponding software crash. Thus, in embodiments of the present invention, if it is determined at 606 that a pcpu lockup has occurred, a further determination is made, at 608, to identify which thread is responsible for the pcpu lockup condition. If a pcpu lockup is not present, embodiments in accordance with the present invention determine, at 610, whether another type of deadlock is responsible for the software crash. A detailed description of the process used to determine which thread is the culprit thread causing a pcpu lockup is provided below in conjunction with the discussion of FIGS. 36-37. It should be noted that in the present computer system can generate a PSOD due to any of several types of crashes. The types of crashes include, for example, Exceptions, Intentional crashes, Panics, and Lockups. Although the above types of crashes pertain to the present computer system, the embodiments of the present invention are well suited to use with various other types of computer systems. Specifically, different types of computer systems will have, for example, different types of crashes. However, the inventive concepts of the various embodiments of the present invention are also applicable to the different types of computer systems and their respective types of crashes.

In one embodiment, at 610, the present invention then determines if a spin lock count exceeded is occurring and is causing the software crash. Like 606 above, at 610, embodiments of the present invention determine if a spin lock count exceeded condition exists. For clarification, a spin lock count exceeded condition occurs, for example, when thread A is trying to hold a lock but is unable because the lock is held by another thread, thread B, for longer period. Thread A will continue to spin waiting for the lock to be released and after a certain time it will give up causing the "Spin lock count exceeded" condition and corresponding PSOD. In this example, the culprit world is thread B. This is a very simple manifestation but it can happen in several complex ways where multiple threads are involved. It should be noted that a deadlock is just one scenario which can cause a "Spin lock count exceeded" condition. In fact, deadlocks are quite rare. It will be understood that there are various other scenarios which can cause "Spin lock count exceeded" condition. As shown at 610, if a spin lock count exceeded condition exists, embodiments in accordance with the present invention determine, at 612, which thread is responsible for the spin lock count exceeded. In so doing, embodiments in accordance with the present invention can accurately identify the culprit thread responsible for the spin lock count exceeded. Thus, at 612, when a spin lock occurs, embodiments of the present invention accurately identify the culprit thread responsible for the software crash.

As shown at 614 of FIG. 6, if no spin lock count exceeded is identified at 610, embodiments of the present invention make the determination that the thread which is crashing is the culprit thread.

Referring now to FIG. 7, a flowchart 700 of processes performed in accordance with embodiments of the present invention is shown. At 702 of FIG. 7, once the culprit thread is identified as described in conjunction with 602 through 614 of FIG. 6, embodiments in accordance with the present invention then obtain the back trace or stack of functions corresponding to the culprit thread. Referring briefly to FIG. 4, a back trace 400 of an example culprit thread is shown. The below discussion will describe how embodiments in accordance with the present invention use back trace 400 of the culprit thread extracted from a PSOD or core dump to identify which module or driver (referred to as the "culprit module") is causing the crash. Additionally, the below discussion will describe how embodiments in accordance with the present invention use back trace 400 of the culprit thread to determine which module is the culprit module, and to then generate a "signature" back trace corresponding to the software symptom of the received PSOD or core dump.

Referring again to 702 of FIG. 7, embodiments of the present invention receive back trace 400 of FIG. 4 for the culprit thread identified at 600 above. Typically, back trace 400 will begin with the thread in which the crash occurred. As described above, although back trace 400 typically has the thread in which the crash occurred listed at the top, it is possible that another thread is actually responsible for the crash. It should be noted that the back trace 400 is only used herein for purposes of explaining the various embodiments of the present invention and is not intended to limit the present invention to a particular type of PSOD, core dump, or a specific back trace. Embodiments of the present invention are well suited to use with any of numerous PSODs or corresponding numerous back traces. Moreover, as will be described below in detail, a significant benefit of the various embodiments of the present invention is the capability to automatically identify a culprit module and automatically generate a signature back trace corresponding to the software symptom of each PSOD received. Further, embodiments of the present invention are able to accomplish the aforementioned tasks regardless of the number of PSODs received and with accurate and repeatable results.

Importantly, the embodiments of the present invention, as will be described below, provide an approach for culprit module detection and signature back trace generation which differs significantly from the conventional processes used to review PSOD crash reports. In conventional approaches, after a crash, the entire stack trace is manually examined and compared to prior entire stack traces to hopefully find some similarity. Such conventional approaches are error prone, tedious, time-consuming, and often fail to yield accurate information about the source of the crash. Instead, the present embodiments, as will be described and explained below in detail, provide a previously unknown procedure for utilizing "tag sequence" and "tag depth", in combination with a newly derived listing of "tag sequence permutations" to provide a consistently accurate and repeatable determination of a culprit module and the generation of a signature back trace for a received PSOD. Thus, embodiments of the present invention provide a PSOD crash report analysis methodology which extends well beyond what was previously done by hand.

As will be described in detail, the various embodiments of the present invention do not merely implement conventional crash report analysis processes on a computer. Instead, the various embodiments of the present invention, in part, provide a previously unknown procedure for utilizing "tag sequence" and "tag depth", in combination with a newly derived listing of "tag sequence permutations" to provide a consistently accurate and repeatable determination of a culprit module and the generation of a signature back trace for a received PSOD. Hence, embodiments of the present invention provide a novel process for culprit module detection and signature back trace generation which is necessarily rooted in computer technology to overcome a problem specifically arising in the realm of the analysis of crash reports for computer systems.

At 704 of FIG. 7, embodiments of the present invention divide back trace 400 of FIG. 4 of the culprit thread into frames. FIG. 8 shows back trace 400 with various frames 802-826. In the present embodiment, each of frames 802-826 pertains to a function. The present invention is also well suited to embodiments in which the back trace 400 is separated into frames that are based upon features other than the functions.

At 706 of FIG. 7, embodiments in accordance with the present invention then determine the module or driver associated with each of frames 802-826 of back trace 400 of FIG. 8. In one embodiment, tags are assigned to the various modules as follows: D=Driver; M=Module; V=VMkernel; and L=VMKLinux. As shown in FIG. 8, the tag assignment is shown in the Tag column 834 of back trace 400. Further, as shown in FIG. 8, back trace 400 also includes an Instruction Address column 828, a Function column 830, and Offset column 832, and Module/Driver Name column 836. Although such tags and modules and such a back trace format are recited in the present embodiment, the present invention is well suited to using other tags for each module and to using back traces organized differently than back trace 400. Similarly, the present invention is also well suited to use with various other modules or module types. That is, the tags and modules recited herein are representative of one embodiment of the present invention applied to a particular computer system (as recited above), and it should be understood that the embodiments of the present invention are well suited to use with various other computer systems. Specifically, different types of systems with, for example, different operating systems, different modules, different drivers, or differing kernel types may utilize different tags or type of tags, but the inventive concepts of the various embodiments of the present invention are applicable to the different types of computer systems.

At 708, embodiments in accordance with the present invention examine frames 802-826 of back trace 400 of FIG. 8 to identify functions which are known to be almost certainly not responsible for the crash. That is, at 708 of FIG. 7, the various embodiments identify "moot" functions in back trace 400. In one embodiment, such moot functions are, for example, helper function sequences, application program interface (API) functions to the kernel, driver calls, or various other functions whose probability to cause a crash is negligible. As shown in FIG. 8, in back trace 400, frames 802, 804 and 806 happen to include functions which are known to be highly unlikely to cause a crash. As such, in the example back trace 400 of FIG. 8, frames 802, 804 and 806 are deemed to include moot functions. Specifically, in the present embodiment, back trace 400 contains frames 802, 804 and 806 which include functions pertaining to a spin lock. It is known that, in the present computer system, the functions of frames 802, 804 and 806 rarely, if ever, cause a crash. Hence, frames 802, 804 and 806 are deemed as containing moot functions. Once again, the specific moot functions recited herein pertain to embodiments of the present invention applied to a particular computer system, as described above, with a particular set of functions. It should be understood that the present invention is well suited to use with various other types of computer systems. Specifically, different types of computer systems with, for example, different types of functions and back traces may find that different types of functions qualify as moot functions, but the inventive concepts of the various embodiments of the present invention are applicable to the different types of computer systems and their respective types of functions.

Referring now to 710 of FIG. 7, the various embodiments of the present invention identify the particular frame in back trace 400 of FIG. 8 which defines the current context. As an example, assume that a central processing unit (CPU) is executing a thread. The CPU then receives an interrupt. The CPU will then begin executing the interrupt handler function. Once the CPU begins executing the interrupt handle function, it is understood that the context is now based on the interrupt. As such, any crash that then occurs would be related to the current context (i.e. the interrupt) rather than any prior context or previous functions. As shown in back trace 400, starting at frame 808 and working down back trace 400, it is determined that frame 812 contains an interrupt function, BH_DrainAndDisableInterrupts. Hence, in the present embodiment, the current context is "interrupt". At 710 Of FIG. 7, upon determining the current context, the present embodiments define the function that marks the start of the current context as a benign function marker. That is, all functions located below the function which defines the current context will not be involved in the current context. As such, the functions located below the function which defines the current context will not be responsible for the crash. Said differently, the crash can only be caused by those functions pertaining to the current context. Thus, embodiments of the present invention define those functions located below the function that marks the start of the current context as benign functions. Hence, as stated above, embodiments of the present invention define the function which marks the start of the current context as a benign function marker. In the present example, function BH_DrainAndDisableInterrupts of frame 812 is defined as the benign function marker. In the present embodiment, an interrupt function was defined as the context. It should be noted that several other contexts are possible, and that the number and type of possible contexts are based on the various functions associated with the particular computer system being evaluated. Further, different types of computer systems with, for example, different types of functions and back traces may have different possible contexts. That said, the inventive concepts of the various embodiments of the present invention are applicable to the different types of computer systems and their respective types of functions and their corresponding contexts.

At 712 of FIG. 7, using the results from 702-710 above, the present embodiments define an essential stack. More specifically, in the present embodiment, the essential stack is defined as the frame containing the benign function marker and all frames there above. In the present example, the essential stack of back trace 400 is comprised of frame 812 and all frames there above. Hence, the essential stack is comprised of frames 802-812. Referring now to FIG. 8, the back trace 400 is shown having essential stack 838.

Referring now to 714 of FIG. 7, the present embodiments determine a tag sequence and a tag depth associated with essential stack 838 of FIG. 8 generated at 712 of FIG. 7 above. In one embodiment, the present invention generates the tag sequence by accessing essential stack 838 of FIG. 8. Next, embodiments of the present invention ignore the moot functions of frames 802-806, and only consider the sequence of tags found in remaining frames 808-812 of essential stack 838. That is, when frames 802-806 containing moot functions are removed from essential stack 838, only frames 808, 810, and 812 remain. In examining the remaining frames, embodiments in accordance with the present invention find that frame 808 has a tag of D, frame 810 has a tag of V, and frame 812 has a tag of V. Thus, for the present example, embodiments in accordance with the present invention find a sequence of tags, referred to as a "tag sequence", of D-V-V corresponding to back trace 400 and essential stack 838. Embodiments in accordance with the present invention further define this tag sequence in terms of its tag depth. That is, the present embodiments note that, in the tag sequence D-V-V, the tag of D occurs once (referred to as a depth of 1 for tag D), and the tag of V occurs twice (referred to as a depth of 2 for tag V). Thus, in the present embodiments, the tag depth and sequence for essential stack 838 is defined as D1V2.

At 716 of FIG. 7, the embodiments of the present invention utilize the tag depth and sequence, generated at 714, to determine the culprit module. Specifically, referring now to FIG. 9, a chart 900 (and corresponding legend 902) of possible tag sequence permutations is provided. Embodiments of the present invention utilize the tag depth and sequence, D1V2, derived at 714 of FIG. 7 above, along with chart 900 of FIG. 9 to determine the culprit module. This operation is described below in detail. Embodiments of the present invention generate the content of chart 900 (i.e. the list of permutations I-VII) based upon the tag sequences which are permitted to occur in the operating system of the present example (described above). Importantly, the list of permutations I-VII, derived by the present embodiments and recited in chart 900, pertains to embodiments of the present invention applied to a particular computer system with a particular operating system (as described above) and a corresponding set of functions. It should be understood that the embodiments of the present invention are well suited to use with various other types of computer systems. Specifically, different types of computer systems with, for example, different types of operating systems may find that different tag sequences are permitted, but the inventive concepts of the various embodiments of the present invention are applicable to the different types of computer systems and their respective permitted tag sequences.

As shown in FIG. 9, chart 900, of the present embodiments, includes a first Component column having three substantive rows listed as N, N-1, and N-2. The component N refers to the first tag type (and corresponding module) of the tag sequence, the component N-1 refers to the second tag type (and corresponding module) of the tag sequence, and the component N-2 refers to the third tag type (and corresponding module) of the tag sequence. As discussed above, for the present example, embodiments of the present invention derived a tag depth and sequence of D1V2 at 714 of FIG. 7. Hence, in the present example, permutation I is used to determine the culprit module. That is, in the present example, with a tag depth and sequence of D1V2, the first tag type is D and the second tag type is V. Hence, the component N for the tag sequence of the present example is D, and the component N-1 for the tag sequence of the present example is V. For purposes of clarity, we will briefly ignore the depth values. The tag depth values, and how they are utilized by the embodiments of the present invention, will be described below in detail. The present embodiments compare the tag sequence DV to chart 900 of FIG. 9. Of the seven allowed permutations in chart 900 for the present example, only permutation I begins with a D (i.e., has D as component N). Thus, only permutation I has a tag sequence which matches the tag sequence DV of the present example. Importantly, in permutation I, only the first tag type (i.e., component N) of the tag sequence is considered. That is, permutation I pertains to allowed tag sequences which begin with a D regardless of the tag types, if any, which follow the D. So, permutation I, of the present embodiments, pertains to any tag sequence starting with a D regardless of any second tag type (component N-1) and regardless of any third tag type (component N-2) which may (or may not) be present in the tag sequence.

Referring still 716 of FIG. 7 and also to chart 900 of FIG. 9, each of seven allowable permutations of tag sequences determined by embodiments of the present invention for the computer system of the present example is listed. Embodiments of the present invention utilize chart 900 and, for some of the seven permutations, embodiments of the present invention also utilize the tag depth to determine the culprit module. The following discussion will describe, in detail, how embodiments of the present invention utilize chart 900 and, in certain cases, the tag depth, to determine the culprit module. As shown in chart 900, permutation I pertains to a tag sequence (determined at 714 of FIG. 7 above) which begins with a D (i.e., a driver or, more specifically, xla). Embodiments of the present invention have determined that, for any tag sequence which begins with a D, the culprit module is the first module in the tag sequence (i.e., xla), regardless of which tags (and corresponding modules) follow the D in the tag sequence. Further, for tag sequences which pertain to permutation I, the present embodiments do not consider tag depth in the determination of the culprit module. Similarly, as shown in chart 900, permutation II pertains to a tag sequence (determined at 714 of FIG. 7 above) which begins with an M (i.e., a module). Embodiments of the present invention have determined that for any tag sequence which begins with an M, the culprit module is the first module in the tag sequence (i.e., a module), regardless of which tags (and corresponding modules) follow the M in the tag sequence. Further, for tag sequences which pertain to permutation II, the present embodiments do not consider tag depth in the determination of the culprit module. Embodiments of the present invention utilize the below if-then statements when the tag sequence (derived at 714 of FIG. 7 above) pertains to either permutation I or permutation II.

1. Permutation I:
2. Permutation II:
3. Default:
4. Culprit=Component N

Referring still to 716 of FIG. 7, as shown in chart 900 of FIG. 9, permutation III pertains to a tag sequence which begins with an L (i.e., VMKLinux) and which is followed by a D (i.e., a driver). So, permutation III, of the present embodiments, pertains to any tag sequence starting with an L (component N) followed by a D (component N-1) regardless of any third tag type (component N-2) which may (or may not) be present in the tag sequence. Embodiments of the present invention have determined that for any tag sequence which begins with an L (component N) and is followed by a D (component N-1), the determination of the culprit module is based upon the tag depth of the first module in the tag sequence (component N). More specifically, embodiments of the present invention compare the depth of component N to a predetermined value of 2. If the depth of component N is less than or equal to the value of 2, then the culprit module is component N-1. If the depth of component N is not less than or equal to the value of 2, then the culprit module is component N (referred to as the default component in the present embodiment). In this embodiment of the present invention, the predetermined value of 2 is referred to as the VMKLinux_API_DEPTH. In the embodiments of the present invention, the VMKLinux_API_DEPTH value is configurable, and the value of 2, as used in the present embodiment, has been determined to be the most appropriate value after extensive empirical analysis of many thousands of PSODs. Embodiments of the present invention utilize the below if-then statements when the tag sequence (as derived at 714 of FIG. 7 above) pertains to permutation III.

5. Permutation III:
   a. If (Depth(component_N)<=VMKLINUX_API_DEPTH)
   b. Culprit=Component N-1
   c. else
   d. goto Default Importantly, the value of 2 for VMKLinux_API_DEPTH derived by the present embodiments and recited above, pertains to embodiments of the present invention applied to a particular computer system with a particular operating system (as described above) and a corresponding set of functions. It should be understood that the embodiments of the present invention are well suited to use with various other types of computer systems. Specifically, different types of computer systems with, for example, different types of operating systems may find that different configurable parameters with different values are needed, but the inventive concepts of the various embodiments of the present invention are applicable to the different types of computer systems and their respective permitted tag sequences.

With reference still to 716 of FIG. 7, as shown in chart 900 of FIG. 9, permutations IV, V, and VI pertain to tag sequences which begin with a V (i.e., VMkernel) and which are followed by at least one other module. Specifically, permutation IV pertains to a tag sequence which begins with a V (i.e., VMkernel) and which is followed by a D (i.e., a driver). Permutation V pertains to a tag sequence which begins with a V (i.e., VMkernel) and which is followed by an M (i.e., a module). Permutation VI pertains to a tag sequence which begins with a V (i.e., VMkernel) which is followed by an L (i.e., VMKLinux) and which is followed by another V (i.e., VMkernel). Furthermore, permutation IV, of the present embodiments, pertains to any tag sequence starting with a V (component N) followed by a D (component N-1) regardless of any third tag type (component N-2) which may (or may not) be present in the tag sequence. Permutation V, of the present embodiments, pertains to any tag sequence starting with a V (component N) followed by an M (component N-1) regardless of any third tag type (component N-2) which may (or may not) be present in the tag sequence. Permutation VI, of the present embodiments, pertains to a tag sequence starting with a V (component N) followed by an L (component N-1) and then followed by another V (component N-2). Embodiments of the present invention have determined that for each of permutation IV, permutation V, and permutation VI, the determination of the culprit module is based upon the tag depth of the first module in the tag sequence (component N). This means that for permutations IV, V, and VI, the embodiments of the present invention determine the culprit module based upon the tag depth of the first module in the tag sequence (i.e., VMKLinux) also known as component N. More specifically, embodiments of the present invention compare the depth of component N to a predetermined value of 2. If the depth of component N is less than or equal to the value of 2, then the culprit module is component N-1. If the depth of component N is not less than or equal to the value of 2, then the culprit module is component N (referred to as the default component in the present embodiment). In this embodiment of the present invention, the predetermined value of 2 is referred to as the VMkernel_API_DEPTH. As with above embodiments of the present invention, the VMkernel_API_DEPTH value is configurable, and the value of 2, as used in the present embodiment, has been determined to be the most appropriate value after extensive empirical analysis of many thousands of PSODs and their corresponding back traces. Embodiments of the present invention utilize the below if-then statements when the tag sequence (as derived at 714 of FIG. 7 above) pertains to permutation IV, V, or V.

6. Permutation IV:
7. Permutation V:
8. Permutation VI:

a. If (Depth(component_N)<=VMKERNEL_API_DEPTH)
    b. Culprit=Component N-1
    c. else
    d. goto Default Similar to, the value of 2 for VMKLinux_API_DEPTH discussed above, the value of 2 for VMkernel_API_DEPTH derived by the present embodiments and recited above, pertains to embodiments of the present invention applied to a particular computer system with a particular operating system (as described above) and a corresponding set of functions. It should be understood that the embodiments of the present invention are well suited to use with various other types of computer systems. Specifically, different types of computer systems with, for example, different types of operating systems may find that different configurable parameters with different values are needed, but the inventive concepts of the various embodiments of the present invention are applicable to the different types of computer systems and their respective permitted tag sequences.

Referring still to 716 of FIG. 7, Permutation VII pertains to a tag sequence which begins with a V (i.e., VMkernel) followed by an L (i.e., VMKLinux) and which is then followed by a D (i.e., driver). Thus, permutation VII, of the present embodiments, pertains to a tag sequence starting with a V (component N) followed by an L (component N-1) and then followed by a D (component N-2). Embodiments of the present invention have determined that, for permutation VII, the determination of the culprit module is based upon the tag depth of the first and second modules in the tag sequence (i.e., components N and N-1). This means that, for permutation VII, the embodiments of the present invention determine the culprit module based upon the tag depth of the first and second modules in the tag sequence (i.e., VMkernel and VMKLinux). More specifically, embodiments of the present invention first compare the depth of component N to a predetermined value of 2 and also compare the depth of component N-1 to a predetermined value of 2. If the depth of component N is less than or equal to the value of 2, and the depth of component N-1 is less than or equal to the value of 2, then the culprit module is component N-2. If the depth of component N and component N-1 are not both less than or equal to the value of 2, then the present embodiments perform another comparison. Specifically, in the second comparison, embodiments of the present invention compare the depth of component N to a predetermined value of 2. If the depth of component N is less than or equal to the value of 2, then the culprit module is component N-1. If the depth of component N is not less than or equal to the value of 2, then the culprit module is component N (referred to as the default component in the present embodiment). In this embodiment of the present invention, the predetermined value of 2 is used for both the VMkernel_API_DEPTH value and the VMkernel_API_DEPTH value. As stated above, the value for both VMkernel_API_DEPTH and VMkernel_API_DEPTH is configurable, and the value of 2, as used in the present embodiment, has been determined to be the most appropriate value after extensive empirical analysis of many thousands of PSODs. Further, through detailed analysis, embodiments of the present invention have been able to quantitatively determine that a value of 2 for both VMkernel_API_DEPTH and VMkernel_API_DEPTH provides a high confidence of correctly determining the culprit module. Moreover, through similar detailed analysis, embodiments of the present invention have been able to quantitatively determine that using values other than 2 for both VMkernel_API_DEPTH and VMkernel_API_DEPTH does not provide a high confidence of correctly determining the culprit module. Embodiments of the present invention utilize the below if-then statements when the tag sequence (as derived at 714 of FIG. 7 above) pertains to permutation VII.

9. Permutation VII:
   a. If [Depth(component N)<=VMKERNEL_API_DEPTH) and
   b. Depth(Component N-1)<=VMKLINUX_API_DEPTH)]
   c. Culprit=Component N-2
   d. else if [Depth(Component_N)<=VMKERNEL_API_DEPTH]
   e. Culprit=Component N-1
   f. else
   g. goto Default Again, the value of 2 for VMkernel_API_DEPTH and for VMKLinux_API_DEPTH as discussed above, is derived by the present embodiments and pertains to embodiments of the present invention applied to a particular computer system with a particular operating system (as described above) and a corresponding set of functions. It should be understood that the embodiments of the present invention are well suited to use with various other types of computer systems. Specifically, different types of computer systems with, for example, different types of operating systems may find that different configurable parameters with different values are needed, but the inventive concepts of the various embodiments of the present invention are applicable to the different types of computer systems and their respective permitted tag sequences. Thus, embodiments of the present invention amount to significantly more than merely manually comparing the back trace of one PSOD to the back trace of another PSOD using a computer. Instead, embodiments of the present invention specifically recite a novel process for culprit module detection which is necessarily rooted in computer technology to overcome a problem specifically arising in the realm of the analysis of crash reports for computer systems.

With reference now to FIG. 10 a flowchart 1000 of processes for generating a signature back trace is shown. After determining the culprit module at FIG. 7, as shown in 1000 of FIG. 10, the present embodiments generate a signature back trace corresponding to the culprit module. As stated above, in the present embodiments, the signature back trace will correspond to the software symptom of the received PSOD. The following discussion will now describe, in detail, the present embodiments for generating the signature back trace. Referring to the present example, embodiments of the present invention previously derived a tag sequence and tag depth of D1V2 as described in detail at 714 of FIG. 7 above. Embodiments of the present invention then utilized the derived chart 900 of FIG. 9 to determine that, for the present example, the driver, xla, was the culprit module. Referring now to 1002 of FIG. 10, the present embodiments access essential stack 838 of FIG. 8 generated above at 712 of FIG. 7. At 1002 of FIG. 10, the present embodiments then locate functions, in essential stack 838, corresponding to the culprit module, xla. In the present example, the function xla_sli_fp_intr_handler is the only function which corresponds to the culprit module, xla. Thus, the present embodiments include the function xla_sli_fp_intr_handler as one portion of the signature back trace. Although only a single function, xla_sli_fp_intr_handler, corresponds to culprit module, xla, in the present example, embodiments of the present invention are also well suited to instances in which the culprit module has more than one corresponding function.

Referring now to 1004 of FIG. 10, embodiments of the present invention locate the functions, in essential stack 838 of FIG. 8, corresponding to the module located below the culprit module. In essential stack 838 of the present example, module, V, (i.e., VMkernel), is located below the culprit module, xla. Functions IRQBH and BH_DrainAndDisableInterrupts are the only functions, in essential stack 838, which correspond to the module, VMkernel. As a result, embodiments of the present invention include functions IRQBH and BH_DrainAndDisableInterrupts as another portion of the signature back trace. In the present example, two functions, IRQBH and BH_DrainAndDisableInterrupts, correspond to the module (VMkernel) located below culprit module, xla. Embodiments of the present invention, however, are also well suited to instances in which the module located below the culprit module has more or less than two corresponding functions.

With reference next to 1006 of FIG. 10, the present embodiment then locates, in essential stack 838 of FIG. 8, the bottom frame from the sequence of frames containing moot functions. In the present example, and as described in detail above, embodiments in accordance with the present invention determined that frames 802, 804 and 806 were deemed as containing moot functions. Frame 806 is the bottom frame in the sequence of frames containing moot functions. Further, frame 806 contains the moot function vmk_SpinlockLock. Thus, the present embodiments include the function vmk_SpinlockLock as yet another portion of the signature back trace. Hence, in the present example, embodiments of the present invention generate a signature back trace which includes the functions vmk_SpinlockLock, xla_sli_fp_intr_handler, IRQBH, and BH_DrainAndDisableInterrupts.

Referring now to FIG. 1008 of FIG. 10, embodiments in accordance with the present invention add the offset of the culprit module, xla, to the function, xla_sli_fp_intr_handler, which corresponds to the culprit module. As shown in frame 808 of FIG. 8, the offset for the function, xla_sli_fp_intr_handler, is 0xaf. Thus, for the present example, the embodiments of the present invention append the offset, 0xaf, to the function xla_sli_fp_intr_handler. As a result, in the present example, embodiments of the present invention the signature back trace includes xla_sli_fp_intr_handler+0xaf. By including the offset, embodiments of the present invention accurately pinpoint the exact assembly instruction that was executing when the present computer system experienced the crash. In the present embodiment, the offset is included only in the top function pertaining to the culprit module, xla. In the present embodiment, including offsets from any functions below the top function pertaining to the culprit module, xla, is determined to be redundant, so such offsets are not included. Additionally, it is understood that there is a subset of crashes (referred to as lockups) that happen due to pcpu lockup. In those crashes, the present computer system will generate a PSOD when the execution control is looping through some set of instructions in a function or functions corresponding to the culprit module, xla. As a result, it is possible to have two different PSODs (of a pcpu lockup type) with different offsets in the functions corresponding to the culprit module, xla. However, these different PSODs could be due to the same bug and have the same root cause. As a result, for any PSODs of a lockup type or a spin lock count exceeded type, the present embodiments do not include or append the offset corresponding to the top function corresponding to the culprit module, xla. Thus, embodiments of the present invention provide a heretofore unknown process by which it possible to receive a PSOD, and from a back trace derived from the PSOD, identify a culprit module, and generate a signature back trace which corresponds to the software symptom of the received PSOD.

Figure 11:
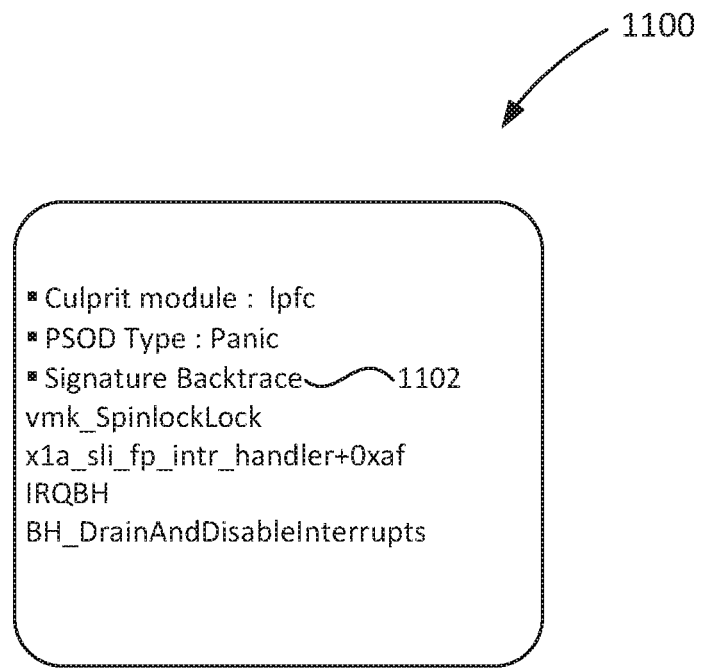
FIG. 11 is a diagram including a signature back trace generated in accordance with embodiments of the present invention.

Referring now to FIG. 11, diagram 1100 shows the signature back trace 1102 generated by the embodiments of the present invention for the present example. Additionally, in diagram 1100, embodiments of the present invention also include a listing of the Culprit module, xla, and the PSOD crash type, Panic, for the present example. In one embodiment, depicted at 1010 of FIG. 10, the present invention will also include the size of the top function of the culprit module in the signature back trace. Importantly, 1002-1008 of FIG. 10 above, describe a particular approach in accordance with the present embodiments for generating the signature back trace. Thus, the various embodiments of the present invention provide a novel process for generating a signature back trace which corresponds to the software symptom of each PSOD received. More specifically, embodiments of the present invention generate an identifying signature from the back trace which uniquely pertains to the software symptom of the received PSOD. In so doing, different PSODs which have core dumps or back traces which appear to be quite different, may ultimately be found, by the present embodiments, to have the same or similar signature back trace. As such, the two PSODs (even with different back traces) can be assumed to have the same software problem. Hence, the embodiments of the present invention greatly extend beyond conventional methods of simply manually comparing entire back traces.

It should be understood that the embodiments of the present invention are well suited to other approaches for generating the signature back trace with embodiments that vary in some way from the present embodiment. As one example, in some embodiments of the present invention, the signature back trace has a limit on the maximum number of functions permitted. As yet another example, in some embodiments of the present invention, the signature back trace may include more than just the last of the moot functions. Specifically, the various embodiments of the present invention may differ in their respective implementation details, but the underlying inventive concepts of the various embodiments of the present invention will remain consistent.

Thus, embodiments in accordance with the present invention are able to automatically identify a culprit module and automatically generate a signature back trace corresponding to the software symptom of each received PSOD. In some embodiments of the present invention, the culprit module is accurately identified and the signature back trace is generated in near real time. Hence, the present embodiments provide a significant advantage over conventional approaches which can take many days and which may still not provide the correct source for the crash. As stated above, in some embodiments, the present Culprit Module Detection and Signature Back Trace Generation Process is implemented as part of an end-to-end system and method as is described, for example, in FIG. 2. In one such embodiment, the Culprit Module Detection and Signature Back Trace Generation Process are performed by crash analyzer 210 of FIGS. 2 and 3. In one such embodiment, crash analyzer 210 accesses a back trace (e.g. back trace 400 of FIG. 4) generated from a corresponding core dump found, for example in dump collector 208, crash analyzer 210 then performs the present Culprit Module Detection and Signature Back Trace Generation Process processes for the core dump or PSOD, and provides the results to GUI generator 308 of FIG. 3 for generating a graphical representation of the results (a detailed description of the operation of GUI generator 308 is provided below). In other embodiments, crash analyzer 210 operates outside of an end-to-end system and method. Whether operating in or outside of an end-to-end system and method, the various embodiments of the present invention are able to: automatically receive and analyze a PSOD; detect a culprit module; and generate a signature back trace which uniquely pertains to the software symptom of the received PSOD, all in near real time.

Hence, the embodiments of the present invention greatly extend beyond conventional methods of simply comparing entire core dumps or back traces. Moreover, embodiments of the present invention amount to significantly more than merely using a computer to compare a back trace of one PSOD to the back trace of another PSOD. Instead, embodiments of the present invention specifically recite a novel process for culprit module detection and generation of a signature back trace which is necessarily rooted in computer technology to overcome a problem specifically arising in the realm of the analysis of crash reports for computer systems.

Graphical User Interface for Software Crash Analysis Data

First, a brief overview of the present Graphical User Interface (GUI) for Software Crash Analysis Data is provided in the present paragraph. Embodiments of the present GUI provide a graphical representation and/or a categorization of novel data derived from the present crash analysis systems and methods described above. In some embodiments, the present GUI is provided on a portal which can be accessed by various parties. In so doing, the present GUI enables a party, who experiences a computer crash, to obtain insight and information about the crash which was previously not possible. The below discussion provides a detailed description of various embodiments of the present invention.

It should be appreciated that GUIs may be designed to provide a particular interactive experience based on the type of information presented and/or received through the GUI. Moreover, a GUI may include one or more different type of interactive elements for receiving information. For example, the interactive elements may include, without limitation: buttons, widgets, controls, text boxes, radio buttons, tri-state boxes, list boxes, numerical input boxes, tool bars, sliders, spinners, drop-down lists, accordion lists, menus, menu bars, tool bars, icons, scroll bars, labels, tooltips, balloon help, status bars, progress bars, etc. The types of interactive elements included in a GUI are typically design decisions, where a GUI designer might attempt to provide particular elements to present and/or receive particular types of information. For example, a simple GUI may include a drop-down list, where a user would select an item from the drop down list. Moreover, it should be appreciated that an aspect of GUI design is to provide feedback to the user. For example, if the user inputs invalid information, or is limited in the information they may be input, it might be desirable to explain this to the user. This information may be explained explicitly, e.g., via a message, or implicitly, e.g., disallowing the input.

Also, in various embodiments, the present GUI will be accessed by a party using, for example, display device 118, alpha-numeric input 114, and cursor control 116 (and various other components) of FIG. 1. Further, in various embodiments, the present GUI will be accessed by a party such as partner 218 via partner portal 216 and report database 214 all of FIG. 2. Further, in various embodiments of the present invention, GUI generator 308 of crash analyzer 210 (all of FIG. 3) generates a GUI which is a graphical representation of analysis results derived by crash analysis system 206 of FIG. 2.

As described in great detail above, various embodiments of the present invention provide a novel process for generating a signature back trace which corresponds to a software symptom of a received PSOD. More specifically, embodiments of the present invention generate an identifying signature from the back trace which uniquely pertains to the software symptom of the received PSOD. In so doing, different PSODs which have core dumps or back traces which appear to be quite different, may ultimately be found, by the present embodiments, to have the same or similar signature back trace. As such, the two PSODs (even with different back traces) can be assumed to have the same software problem. As a result, PSODs with the same signature back trace can be aggregated, "bucketed", or placed in the same "bin" for purposes of data analysis. As will be described below in detail, various embodiments of the present invention generate a GUI which graphically represents the crash analysis results derived as described above.

As was stated above, many of the previous examples pertain to performing the present crash analysis on a single core dump or back trace. However, a significant benefit of the various embodiments of the present invention is the capability to automatically identify a culprit module and automatically generate a signature back trace corresponding to the software symptom of each PSOD received. Further, embodiments of the present invention are able to accomplish the aforementioned tasks regardless of the number of PSODs received and with accurate and repeatable results. In some embodiments, the present invention analyzes the received PSODs and generates the present GUI for the crash analysis results all in near real time.

Figure 12:
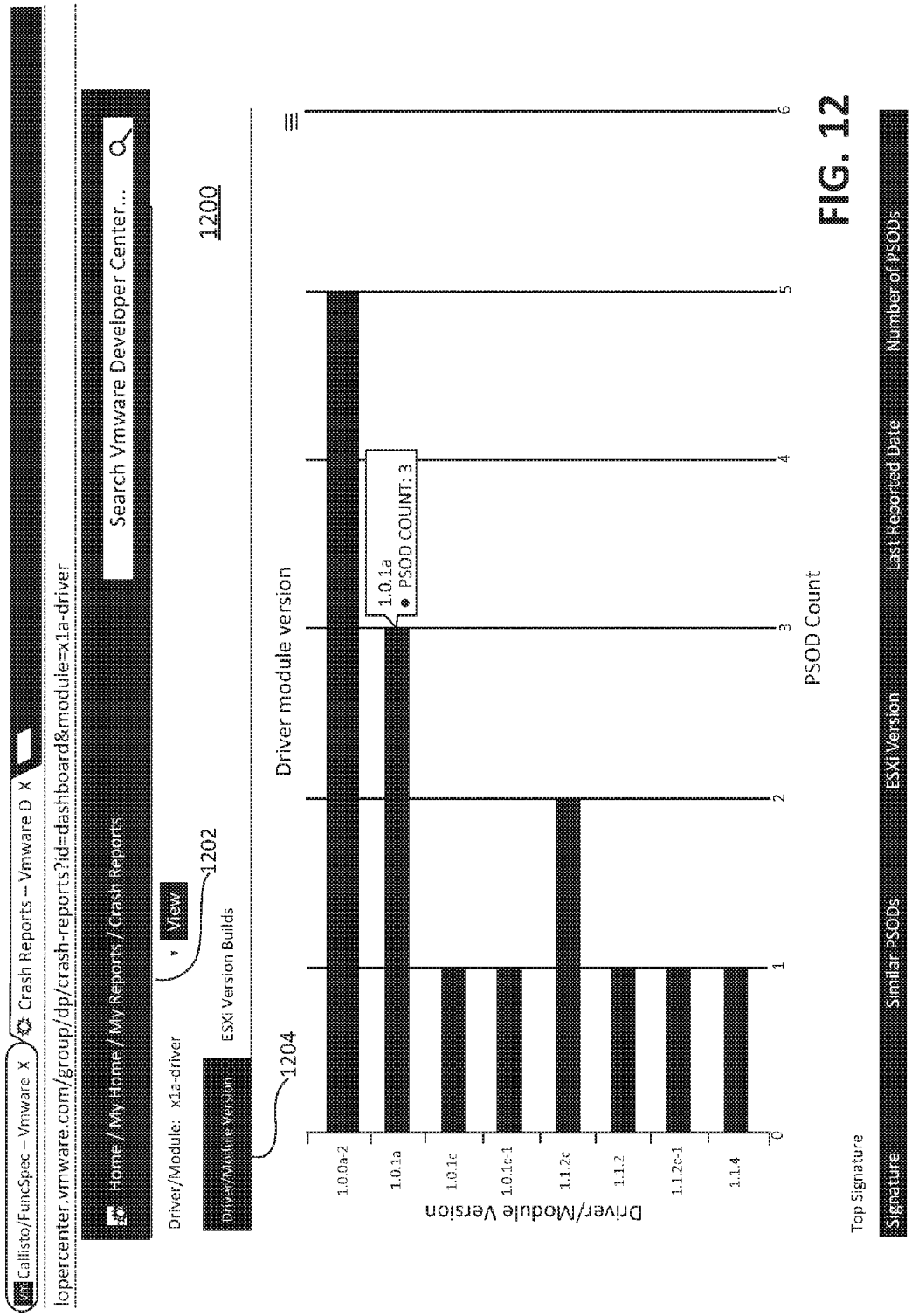
FIG. 12 is an example view of a GUI of computer system crash results in accordance with various embodiments of the present invention.

With reference now to FIG. 12, an example view of a GUI 1200 is shown, in accordance with various embodiments of the present invention. It should be appreciated that GUI 1200 (and all other GUIs described below) may be included as a visual component of a larger GUI (e.g., as a widget, or an embedded GUI), and is not limited to the illustrated embodiment. GUI 1200 is a dashboard page which includes a component access control feature via pull down window 1202. As such, in one embodiment, a party accessing GUI 1200 is able to select only those components (e.g., drivers, modules, etc) pertaining to that party. It should be appreciated that other types of selectable control may be utilized for component access control via pull down window 1202, including, but not limited to, a check box, a button, a radio button, an option button, or another visual control.

Referring still to FIG. 12, GUI 1200 provides a breakdown of crashes analyzed by embodiments of the present invention. More specifically, GUI 1200 provides a histogram which graphically represents the PSOD count for various versions of the component selected at pull down window 1202. The type of breakdown depicted in GUI 1200 is indicated by highlighted box 1204. Thus, in the present embodiment, as PSODs are received, the above described crash analysis is performed for each PSOD, and PSODs are then bucketed according to the results of the crash analysis. In GUI 1200, the PSODs are bucketed according to the version of the driver on which the crash occurred.

Figure 13:
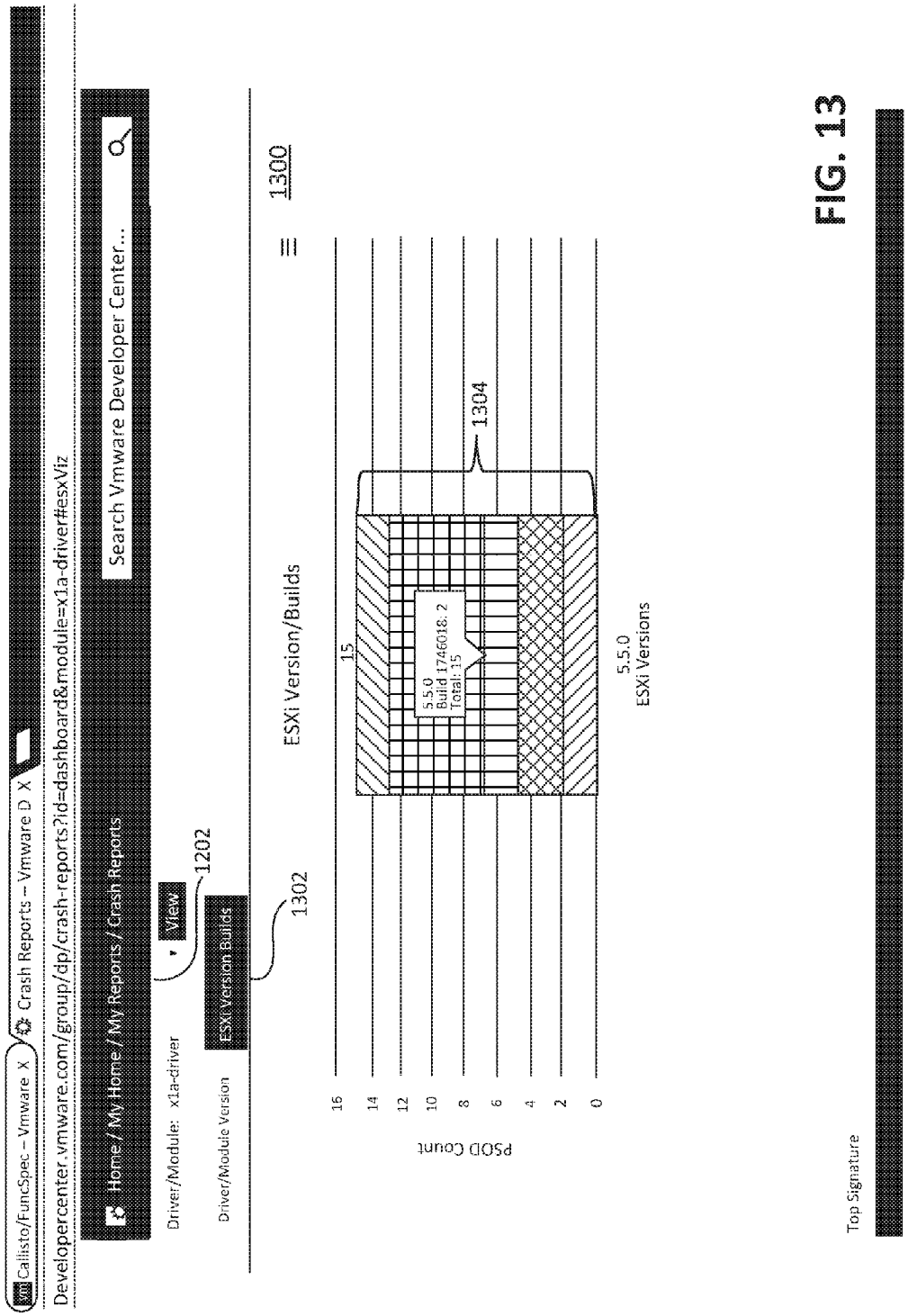
FIG. 13 is an example GUI of a dashboard page including component access control via a pull down window in accordance with various embodiments of the present invention.

Referring now to FIG. 13, GUI 1300 is a dashboard page which also includes component access control via pull down window 1202. As described above, a party accessing GUI 1300 is able to select only those components (e.g., drivers, modules, etc) pertaining to that party.

Referring still to FIG. 13, GUI 1300 provides a breakdown of crashes analyzed by embodiments of the present invention. More specifically, GUI 1300 provides a stack 1304 which graphically represents the PSOD count for various computer system builds and versions corresponding to the component selected at pull down window 1202. The type of breakdown depicted in GUI 1300 is indicated by highlighted box 1302. Thus, in the present embodiment, as PSODs are received, the above described crash analysis is performed for each PSOD, and PSODs are then bucketed according to the results of the crash analysis. In GUI 1300, the PSODs are bucketed according to the ESXi™ build and version for the system on which the crash occurred. Again for purposes of brevity and clarity, the following description of the various embodiments of the present invention, will be described using an example in which the computer system generating the core dump or PSOD is a VMware ESXi™, enterprise-class, type-1 hypervisor developed by VMware, Inc. of Palo Alto, Calif. for deploying and serving virtual computers. Importantly, although the description and examples herein refer to embodiments of the present invention applied to the above computer system with, for example, its corresponding crash data, it should be understood that the embodiments of the present invention are well suited to use with various other types of computer systems. Specifically, different types of computer systems will have, for example, a different operating system and/or different types of crash analysis data. However, the inventive concepts of the various embodiments of the present invention are also applicable to the different types of computer systems and their respective crash analysis data.

Referring still to FIG. 13, in the present embodiment, GUI 1300 depicts the various build and corresponding PSOD counts in stack 1304 using different colors to represent the various builds and versions. In the GUI 1300, a white background is used and various colors comprise stack 1304. It should be appreciated that other visual distinctions are available, including but not limited to shadings, textures, or other visual distinctions, and that these visual distinctions are typically design decisions.

Referring now to FIG. 14, another GUI 1400 is provided. In one embodiment, GUI 1300 and 1400 are provided as scrollable GUIs residing vertically adjacent to each other. Thus, in such an embodiment, a party viewing GUI 1300 can simply scroll down and access GUI 1400 and vice versa. GUI 1400 is comprised of two tables, 1402 and 1404. Table 1402 contains a listing of the signatures corresponding to the greatest number of PSODs (i.e., PSOD counts). In one embodiment GUI 1400 will list the entire signature back trace (e.g., signature back trace 1102 of FIG. 11) generated as described above. In other embodiments, such as is shown the present embodiment, GUI 1400 lists only some portion of the signature back trace having the highest corresponding number of PSOD counts. In various embodiments, GUI 1400 is also configured such that a user can select a particular portion of a signature (e.g. signature portion 1401 of 1400). In such an embodiment, the complete signature back trace corresponding to signature portion 1401 is provided in a separate GUI. When signature portion 1401 is selected, separate GUI 2100 of FIG. 21, below, is generated listing the complete signature back trace 2102 corresponding to signature portion 1401. In the embodiment of FIG. 14, table 1402 lists, at most, the top five signatures. Table 1402 of GUI 1400 is, however, well suited to displaying a greater or lesser number of top signatures. Further, in various embodiments of the present invention, all columns in of all tables (e.g. GUIs 1400, 1500, 1600 and 1800) are sortable. The ability to sort the various GUIs includes columns with dates like "Date of Psod", "Last reported date", "first reported date" etc. By sorting "first reported date", a user can see the latest reported signatures or the oldest reported signatures. By sorting the "Last reported date", the user can see signatures that are recently being seen by the customers. Further, at bottom of 1404 there is a link "browse all PSODs" that will take a user to FIG. 16.

Referring still to FIG. 14, table 1404 contains a listing of the PSODs and the corresponding information, according to how recently the PSOD was reported. As with table 1402, in one embodiment table 1404 will list the entire signature back trace, and in other embodiments, such as is shown the present embodiment, table 1404 of GUI 1400 lists only some portion of the signature back trace. Thus, in GUI 1400, table 1402 provides a graphical representation of bucketed PSODs. Table 1404 of GUI 1400 provides a graphical representation of the occurrence of various signatures in near real time. Moreover, FIG. 1404 contains a "Similar PSODs" column. This is just the 'converse' of "Similar PSODs" column 1408. Both the links land in the same page (i.e. FIG. 1700) that contains list of all PSODs with same signature. Here is the difference: 1408 takes a user from a signature to 1700. That is, given a signature it takes a user to a page that contains all the PSODs with the same signature. 1404 takes a user from a PSOD to the page that contains its similar PSODs. So, if a user wants to know if there are other PSODs similar to a PSOD in table 1404, the user can click "view" and find out.

Referring still to FIG. 14, GUI 1400 also includes a "Browse all Signatures" selection 1406 at the bottom of table 1402. The same "Browse all Signatures" selection is also available (although not shown in FIG. 14) at the bottom of table 1404. The "Browse all Signatures" selection 1406 allows a user to select a GUI 1500 of FIG. 15.

With reference now to FIG. 15, a GUI 1500 is shown which lists all known signatures and the corresponding PSOD count for the driver selected at pull down window 1202. Also, in GUI 1500, a pull down window 1502 is available for a user to select a particular ESXi™ build version in combination with the selection made via pull down window 1202.

Referring next to FIG. 16, a GUI 1600 is shown which includes a pull down calendar window 1602 for selecting a start date and pull down calendar window 1604 for selecting an end date. In so doing, GUI 1600 enables a user to define a date range for reported PSODs. GUI 1600 displays data for individual crashes that have occurred. Additionally, GUI 1600 includes selectable report links (see, e.g., 1606 and 1608). By selecting, for example, report link 1606, the present embodiments provide the user with a GUI having additional information (e.g. the PSOD screen, system information, the back trace) corresponding to the selected crash. By providing such a GUI, the present embodiments assist a party with resolving a crash. Further, the report links opens a report that contains more in-depth details of the selected crash including information such as, but not limited to, driver heap usage, driver jobs, driver interrupt status, driver logs, frame variables and their values, etc. along with back trace, system configuration, PSOD screen. This report helps the support team to root cause the issue.

Referring again to FIG. 14, GUI 1400 includes another mechanism for providing additional information regarding a crash. GUI 1400 includes, at 1408, a column entitled Similar PSODs. In that column, embodiments of the present invention provide a selectable view link (typically shown as 1410). When view link 1410 is selected, the present embodiments display a GUI 1700 of FIG. 17 which contains data for all PSODs having the same signature.

Figure 17:
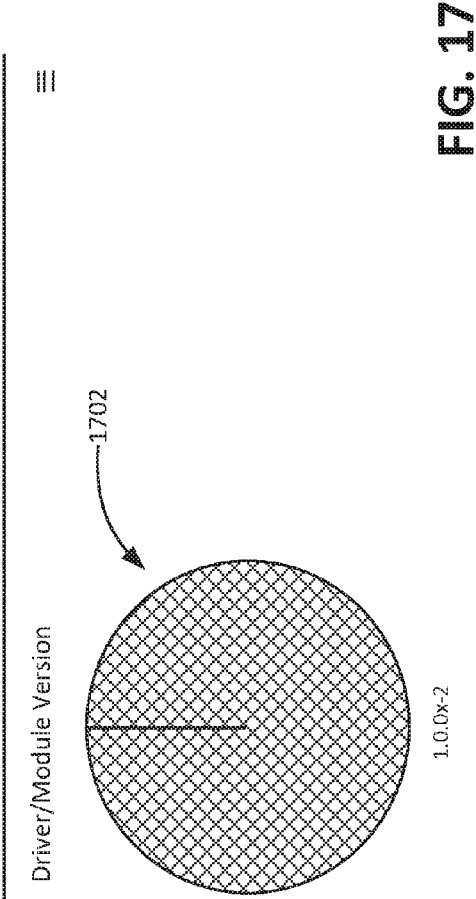
FIG. 17 is an example GUI which provides a graphic visualization representing crash data in accordance with various embodiments of the present invention.

With reference to FIGS. 17 and 18, GUI 1700 of the present embodiment is in a scrollable format. FIG. 17 contains the top portion of GUI 1700, and FIG. 18 contains the bottom portion of GUI 1700. The top portion of GUI 1700 in FIG. 17 provides a graphic visualization 1702 representing the crash data. The bottom portion of GUI 1700, in FIG. 18, provides a table 1802 listing the data for the individual crashes.

GUIs 1400 and 1700 of FIGS. 14 and 17, respectively, provide important and beneficial information, which was previously unavailable, to users of the present embodiments. Specifically, with GUI 1400 of FIG. 14, a user is able to immediately observe, for example, that one particular signature is occurring far more frequently than other signatures. GUI 1700 of FIG. 17 then allows the user to "drill down" and determine the particular driver version on which the signature most frequently occurs. Thus, GUIs 1400 and 1700 of the present embodiments now allow a user to prioritize their approach to a particular crash in an informed manner.

Figure 19:
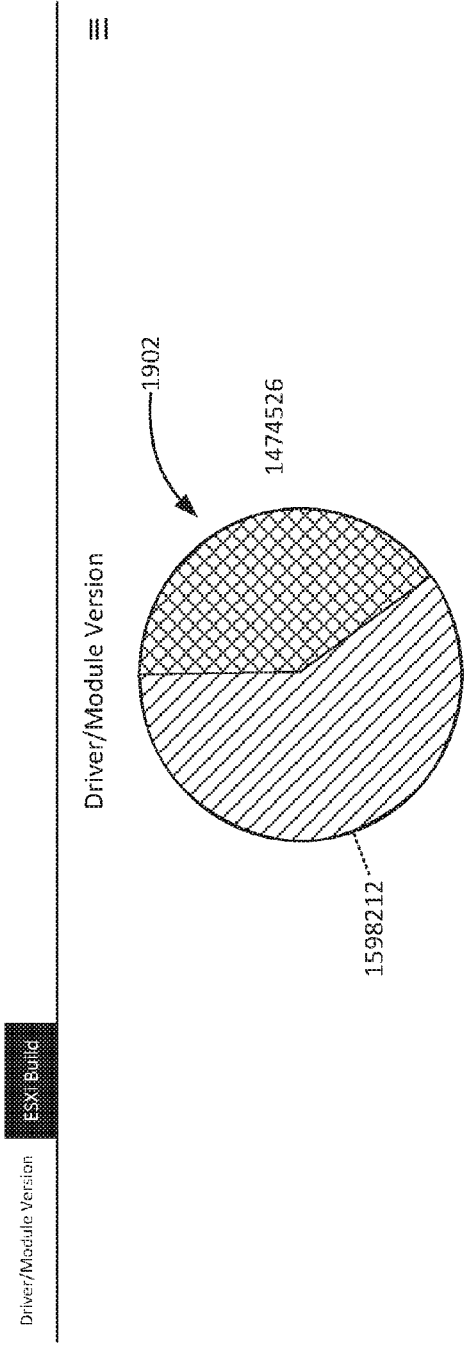
FIG. 19 is an example GUI which provides a graphic visualization representing crash data in accordance with various embodiments of the present invention.

Referring now to FIG. 19, GUI 1900 of the present embodiment is in a scrollable format. The top portion of GUI 1900 provides a graphic visualization 1902 representing the crash data. More specifically, GUI 1900 provides a graphic visualization 1902 of the signatures corresponding to a particular ESXi™ build version. The bottom portion of GUI 1900, not shown, provides the same table 1802, of FIG. 18, listing the data for the individual crashes. Again, GUIs 1400 and 1900 of FIGS. 14 and 19, respectively, provide important and beneficial information, which was previously unavailable, to users of the present embodiments. As stated above, with GUI 1400 of FIG. 14, a user is able to immediately observe, for example, that one particular signature is occurring far more frequently than other signatures. GUI 1900 of FIG. 19 then allows the user to "drill down" and determine the particular ESXi™ build version on which the signature most frequently occurs. Thus, GUIs 1400 and 1900 of the present embodiments now allow a user to prioritize their approach to a particular crash in an informed manner. Pie charts 1702, 1902 are just few of the many possible. The various embodiments of the present invention are well suited to GUIs including pie charts by firmware version, server model, etc. This is an important feature which helps user see what is common across the PSODs of a given signature. For example, the user is able to determine if the PSOD is happening with same ESXi™ build version or same driver version or same firmware version or same server models, and so on.

Figure 20:
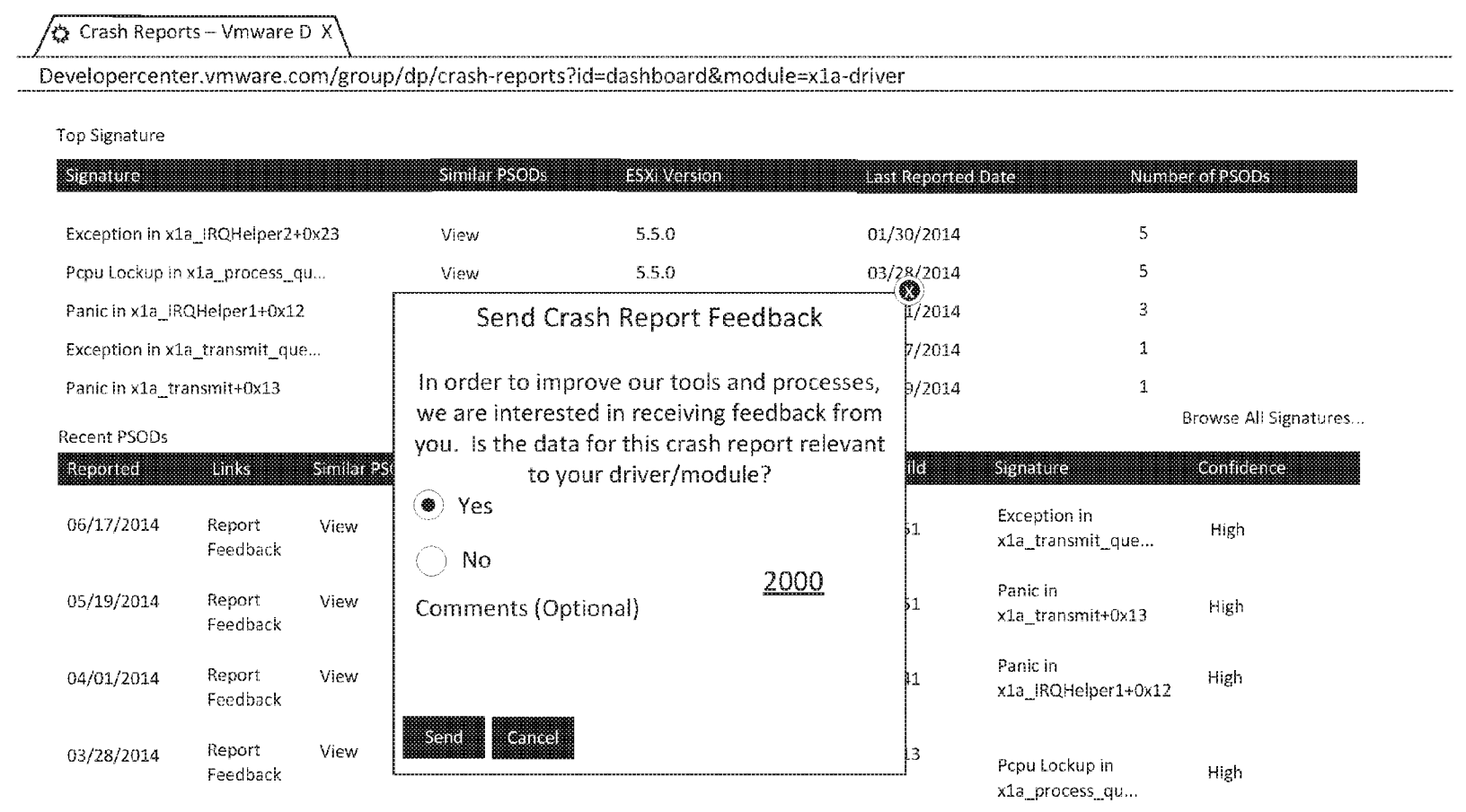

Referring again to FIG. 16, GUI 1600 further includes a selectable Feedback link typically shown as 1610 and 1612. In various embodiments, when, for example, Feedback link 1610 is selected, a Crash Report Feedback GUI 2000 of FIG. 20 is generated. GUI 2000, of the present embodiments, allows a user to send input or comments regarding the user's experience. Also, the feedback forum helps partner to provide feedback on a per core dump basis. They can report any errors with the data provided on that specific crash report etc. In so doing, GUI 1600 helps to enable improvements to the overall crash analysis system.

Figure 22:
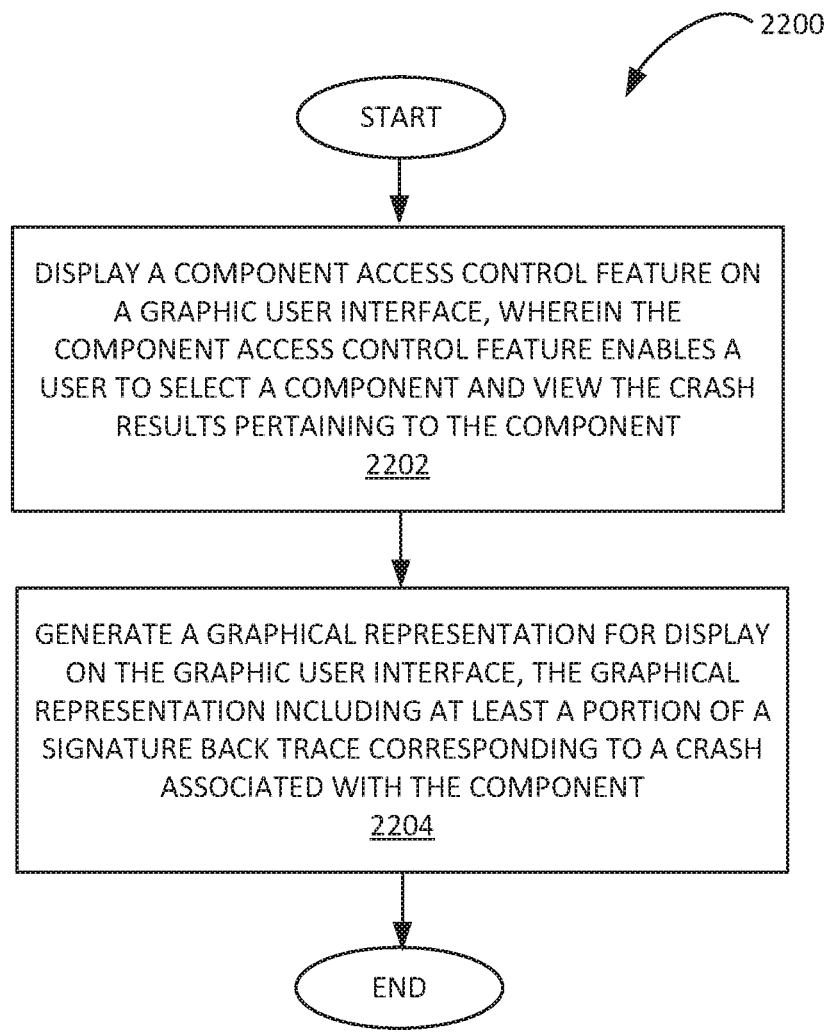
FIG. 22 is a flowchart of various processes performed to provide crash results for a computer system on a graphical user interface in accordance with embodiments of the present invention.

Referring now to FIG. 22, a flow chart 2200 is provided of an example method for providing crash results for a computer system on a graphical user interface, according to various embodiments of the present invention. Procedures of this method are performed in conjunction with the various elements and/or components of FIGS. 1-21. It is appreciated that in some embodiments, the procedures may be performed in a different order than described, that some of the described procedures may not be performed, and/or that one or more additional procedures to those described may be performed. Flow diagram 2200 includes some procedures that, in various embodiments, are carried out by one or more processors under the control of computer-readable and computer-executable instructions that are stored on non-transitory computer-readable storage media. It is further appreciated that one or more procedures described in flow diagram 2200 may be implemented in hardware, or a combination of hardware with firmware and/or software.

At 2202 embodiments in accordance with the present invention display a component access control feature (see e.g., pull down window 1202 of FIG. 12) on a graphic user interface. As is described in detail above, the component access control feature enable a user to select a component and view the crash results pertaining to the component. Again, the details of the various components and processes for performing 2200 are provided above.

At 2204, embodiments in accordance with the present invention generate a graphical representation for display on the graphic user interface. In one embodiment of the present invention, the graphical representation includes at least a portion of a signature back trace corresponding to a crash associated with the component selected above at 2200. Once more, the details of the various components and processes for performing 2204 are provided above.

Importantly, the embodiments of the present invention, provide GUI which significantly extends what was previously possible. The GUIs of the present embodiments provide accurate information, in novel visualizations, about the source of software crashes. Moreover, the present GUIs graphically represent data which was derived from a previously unknown procedure, to provide beneficial information related to a computer crash. Thus, embodiments of the present GUI provide a PSOD crash report analysis methodology which extends well beyond what was previously done by hand.

Monitoring of Automated End-To-End System

First, a brief overview of the present system and method for monitoring of an automated end-to-end system is provided in the present paragraph. Embodiments of the present invention augment the various logs, which are generated as part of the above described automated end-to-end system, with a prefix containing identification information. The prefix enables those monitoring the automated end-to-end system to readily determine the specific component responsible for an error, and to more quickly determine the cause of the error. The below discussion provides a detailed description of various embodiments of the present invention.

Figure 23:
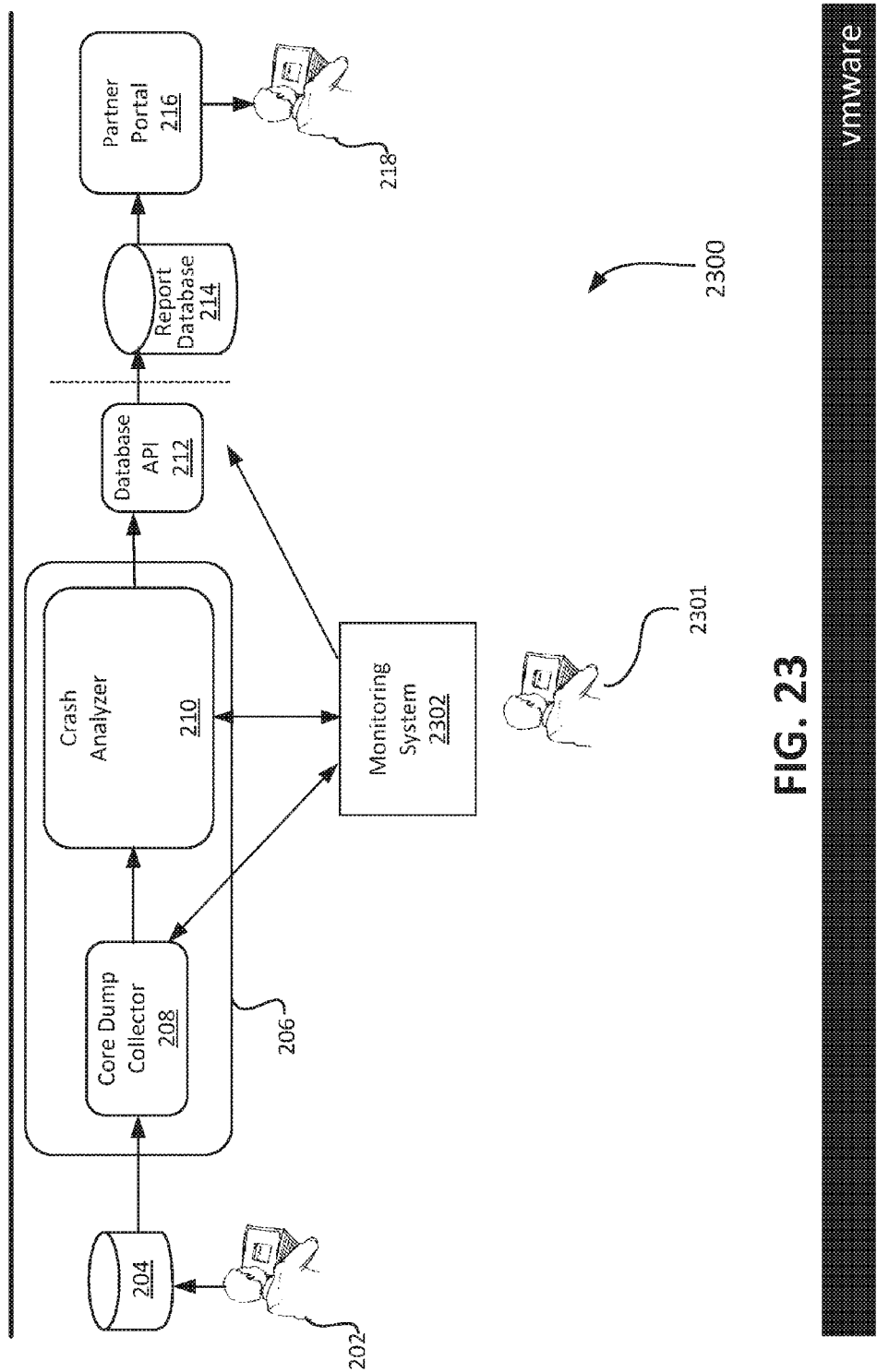
FIG. 23 is a diagram including an automated end-to-end system and a monitoring system in accordance with embodiments of the present invention.

As was described in detail above, the present automated end-to-end analysis system 200 described, for example, in conjunction with the discussion of FIG. 2, includes crash analysis system 206. Further, as was described in detail above, crash analysis system 206 is comprised of various components. The following description pertains to a method and system for monitoring the performance of crash analysis system 206. Referring now to FIG. 23, a diagram 2300 is shown illustrating the present monitoring system 2302 communicatively coupled with crash analysis system 206.

In the present embodiments, an administrator 2301 is tasked with ensuring that crash analysis system 206 remains operational. As the usage of crash analysis system 206 increases, the tasks of the administrator 2301 become even more important. That is, as crash analysis system 206 increases in use, the number of core dumps handled by crash analysis system 206 also increases. Should crash analysis system 206 fail, a significant number of customer service request remain un-serviced, or may even be lost. Further, as the number of core dumps handled by crash analysis system 206 increases, the number of logs generated by crash analysis system 206 may increase by more than a hundred times the number of core dumps. That is, for each core dump handled, crash analysis system 206 may generate hundreds of logs. As a result, should an error occur in crash analysis system 206, conventional methods for simply reviewing the error logs and then manually attempting to determine which component caused the error are no longer feasible. Importantly, an administrator using conventional approaches simply lacks the time to analyze each error log when numerous core dumps are being handled. Also, conventionally, error logs are manually examined to attempt to determine which particular application, macro, or component is responsible for the failure. In some cases, the "cost" associated with manually determining an error actually exceeds the "benefit" derived from determining the cause of the error.

Referring again to FIG. 23, as was described in detail above, core dump collector 208 of crash analysis system 206 receives the core dump from service request repository 204. Dump collector 208 then provides the unique core dump to crash analyzer 210. Crash analyzer 210 analyzes the core dump, generates crash report data, and then generates a graphic user interface including a graphic representation of the crash report data. In embodiments of the present invention, monitoring system 2302 monitors crash analysis system 206 and then generate operations results pertaining to crash analysis system 206. In various embodiments, monitoring system 2302 also generates a graphic user interface for display on a computer, wherein the graphic user interface includes a graphical representation of the operation results data for crash analysis system 206. A detailed discussion of the operation of monitoring system 2310 is provided below. Additionally, the embodiments of the present invention, provide a monitoring system 2302 which significantly extends what was previously possible. The present embodiments of monitoring system 2302 provide accurate information, in novel visualizations, about errors in crash analysis system 206. Moreover, present monitoring system 2302 generates data to provide beneficial information related to a failure within crash analysis system 206. Thus, embodiments of present monitoring system 2302 provide a monitoring methodology which extends well beyond what was previously done by hand.

Also, although certain components are depicted in, for example, crash analysis system 206 and monitoring system 2302, it should be understood that, for purposes of clarity and brevity, each of the components may themselves be comprised of numerous modules or macros which are not shown. In operation, each of the various components, or its sub-components (e.g., modules or macros) of crash analysis system 206 will generate logs as the core dump is being analyzed and is proceeding through crash analysis system 206. In the present embodiments, monitoring system 2302 collects the logs (generated by crash analysis system 206) and analyzes the logs to generate the operation results for crash analysis system 206.

Figure 24:
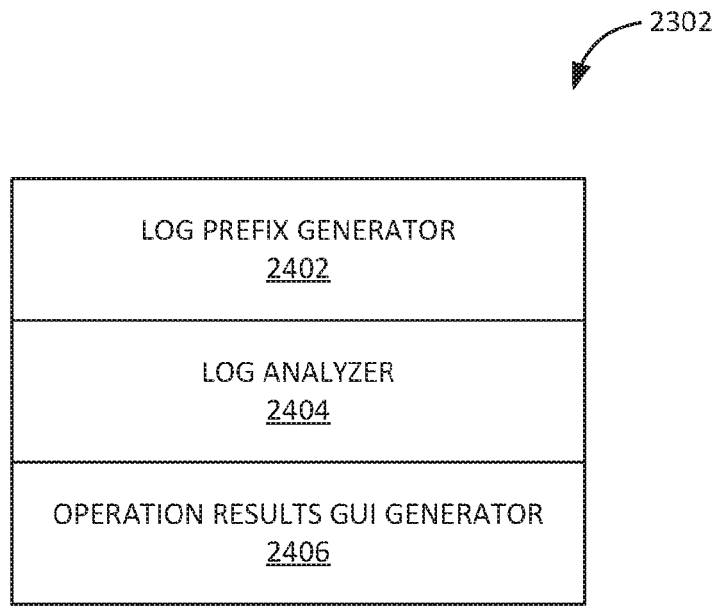
FIG. 24 is a schematic diagram of components comprising a monitoring system in accordance with embodiments of the present invention.

Referring now to FIG. 24, a schematic diagram of various components comprising monitoring system 2302 is shown, in accordance with embodiments of the present invention.

Monitoring system 2302 includes a log prefix generator 2402. In embodiments of the present invention, log prefix generator 2402 adds a prefix to the log messages or "logs" generated by crash analysis system 206. In FIG. 24, log prefix generator is depicted as integrated with log analyzer 2404 and operation results GUI generator 2406. It should be noted that such a depiction is intended merely to show the various components of monitoring system 2302, and is not intended to limit the location of log prefix generator 2402 or log analyzer 2404 and operation results GUI generator 2406. In various embodiments of the present invention, log prefix generator 2402 is implemented, for example, within core dump collector 208.

Referring still to FIG. 24, log prefix generator 2402 appends or attaches a prefix to the various log messages generated by crash analysis system 206. The prefix contains identifying information for the various log messages. In one embodiment of the present invention, the identifying information identifies the core dump being analyzed by crash analysis system 206 when the log messages are generated. In various other embodiments, the identifying information in the log prefix includes but is not limited to said log messages, identifying the job being performed by crash analysis system 206, indicating a success or failure of an analysis being performed by crash analysis system 206, or indicating an error source within the analysis being performed by crash analysis system 206. Additionally, embodiments of the present invention are also well suited to having the prefix comprise any combination of two or more of the above described types of identifying information. By adding a prefix to the logs generated by crash analysis system 206, embodiments of the present invention allow the log messages to be categorized and analyzed in a manner that was not previously possible. The novel categorization and analysis realized by embodiments of the present invention is described below in detail.

With reference to FIG. 25, in accordance with embodiments of the present invention, a listing 2500 of various example log messages or logs having an example prefix, "log prefix", is provided. Thus, as a core dump progresses through the various components (including subcomponent, modules, and macros, etc.) of crash analysis system 206, prefix log generator 2402 will attach a prefix to the log messages generated by crash analysis system 206. For illustration purposes only, in the example listing 2500 of FIG. 25, as components App X, App Y and App Z generate their various logs, each of the logs contains the prefix generated by prefix generator 2402 of FIG. 24.

Referring now to FIG. 26, an example listing 2600 illustrating a prefix format used in various embodiments of the present invention is shown. In the embodiment of FIG. 26, prefix generator 2402 of FIG. 24 will generate a prefix which includes several key/value pairs. In the embodiment of FIG. 26, the prefix includes a core dump id and value 2602, a job id and value 2604, an attempt # and value 2608, a job result and value 2610, and an error source and value 2612. At 2614, a string comprising the entire prefix for the present example is shown. Although such a prefix is shown in the example of FIG. 26, it should be understood that, in various embodiments of the present invention, prefix generator 2402 is well suited to generating a prefix with a different amount and/or different types of key/value pairs or even with different information entirely. Also, for purposes of brevity and clarity, the present description of monitoring system 2302 and corresponding prefixes, pertains to an example in which monitoring system 2302 monitors a crash analysis system 206 analyzing is core dump or PSOD is received from a VMware ESXi™, enterprise-class, type-1 hypervisor developed by VMware, Inc. of Palo Alto, Calif. Importantly, although the description and examples herein refer to such embodiments of the present invention monitoring crash analysis of the above described core dumps, it should be understood that the embodiments of the present invention are well suited to monitoring crash analysis performed on other types of core dumps. However, the inventive concepts of the various embodiments of the present invention are also applicable to the monitoring of different types of crash analysis systems which, in turn, are analyzing various other types of crash data.

Referring again to FIG. 24, log analyzer 2404 then receives the various log messages generated by crash analysis system 206 of FIG. 23. Log analyzer 2404 of FIG. 24 then proceeds to categorize and analyze the received log messages to generate operation results for crash analyzer system 206. In one embodiment, log analyzer 2404 uses the prefix attached to the log messages to group and bin those log messages pertaining to a failure within crash analysis system 206. More specifically, because the prefixes generated by prefix generator 2402 indicate the component at which a crash analysis failed, log analyzer 2404 can generate operation results which ultimately determine which of the failures occurred on each of the various components. Thus, in the present embodiments, log analyzer 2404 is now able to generate operation results which determine that a particular analysis failed, and moreover, the operation results from log analyzer 2404 can also indicate the particular component at which the failure occurred. Thus, embodiments of the present invention now provide an analysis capability that wasn't possible in conventional approaches. Further, log analyzer 2404 is able to make determinations regarding other characteristics of crash analysis system 206 where such determinations were not previously possible.

Figure 27:
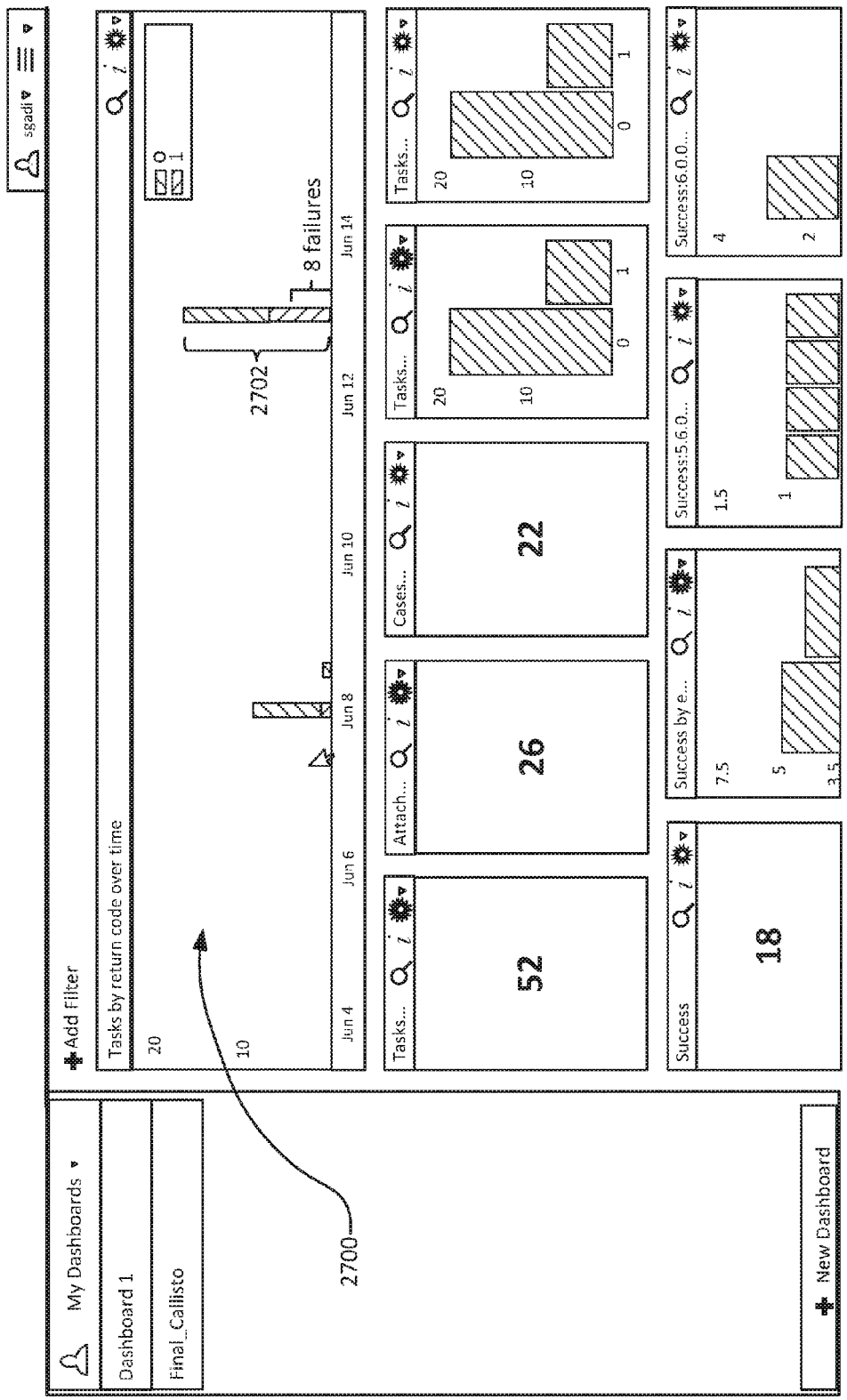
FIG. 27 is an example GUI including a graphical representation of example operation results received from a log analyzer in accordance with embodiments of the present invention.
Figure 28:
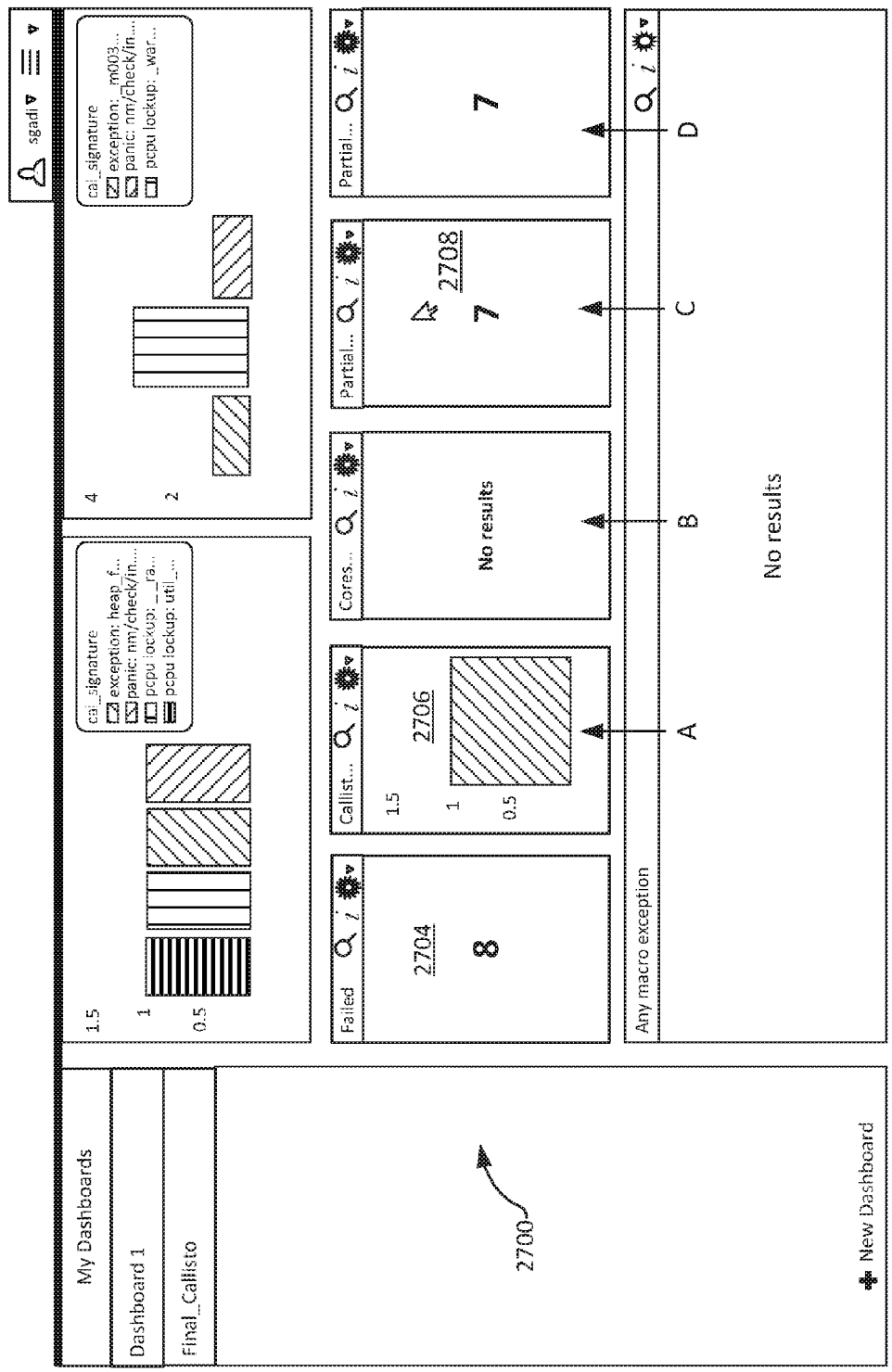
FIG. 28 is an example GUI including charts corresponding to example operation results received from a log analyzer in accordance with embodiments of the present invention.

With reference now to FIGS. 27 and 28, GUI 2700 of the present embodiment is in a scrollable format. FIG. 27 contains the top portion of GUI 2700, and FIG. 28 contains the bottom portion of GUI 2700. The top portion of GUI 2700 in FIG. 27 includes a graphical representation of example operation results received from log analyzer 2402. The bottom portion of GUI 2700, located on FIG. 28 includes additional charts corresponding to the example operation results. In the present embodiment, operation results GUI generator 2406 generates GUI 2700. As shown in GUI 2700, operation results GUI generator 2406 generated a graphical representation comprising several histograms and charts. It should be understood that FIGS. 27 and 28 contain only example data and graphical representations to illustrate the functionality of monitoring system 2302 and operation results GUI generator 2406 of FIG. 24. In GUI 2700 on FIG. 27, a histogram 2702 of example data is provided which indicates that on a particular date, monitoring system 2302 monitored a crash analysis system and found that there were eight failures within the crash analysis system.

Figure 29:
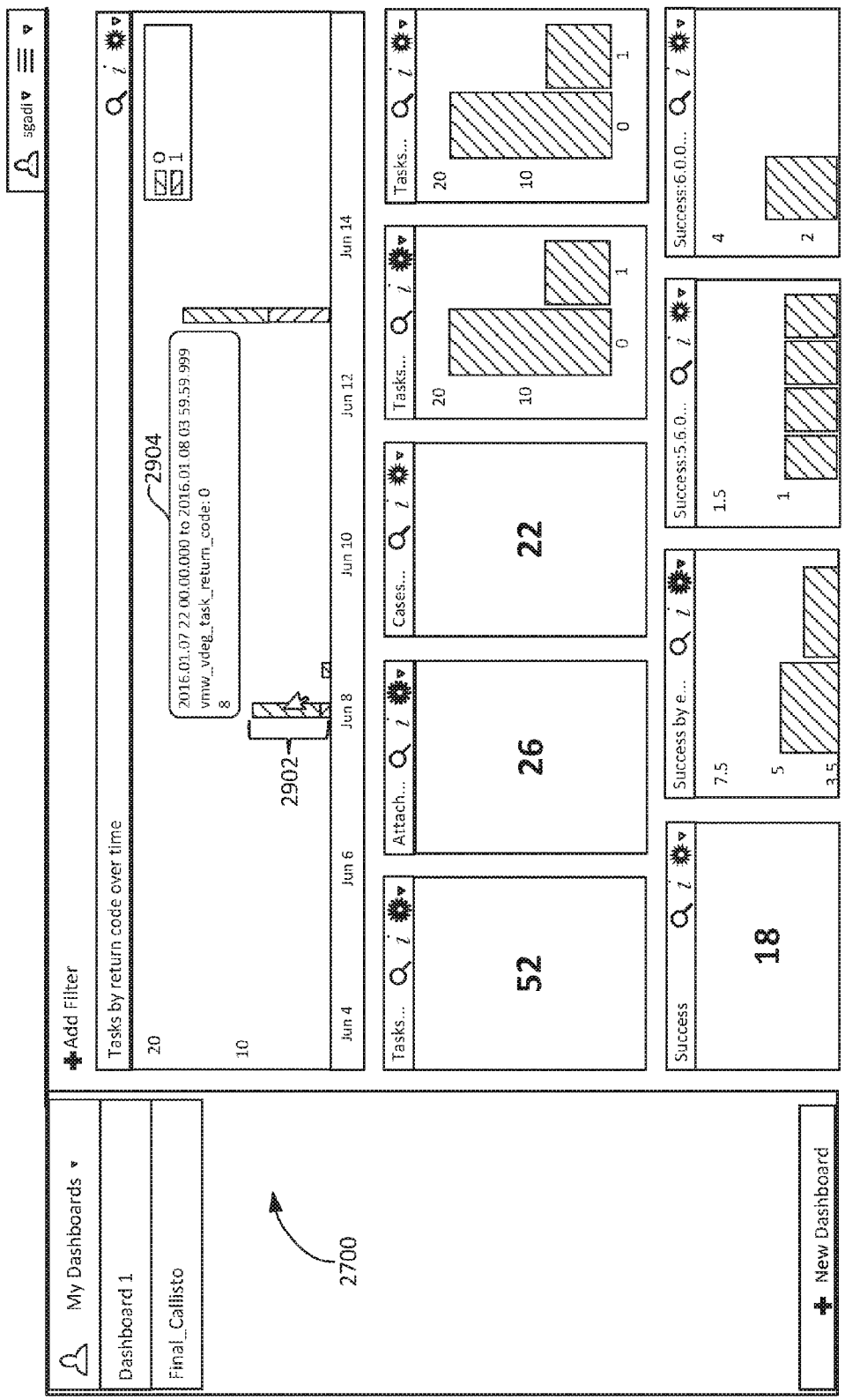
FIG. 29 is an example GUI listing additional log message information in accordance with embodiments of the present invention.
Figure 30:
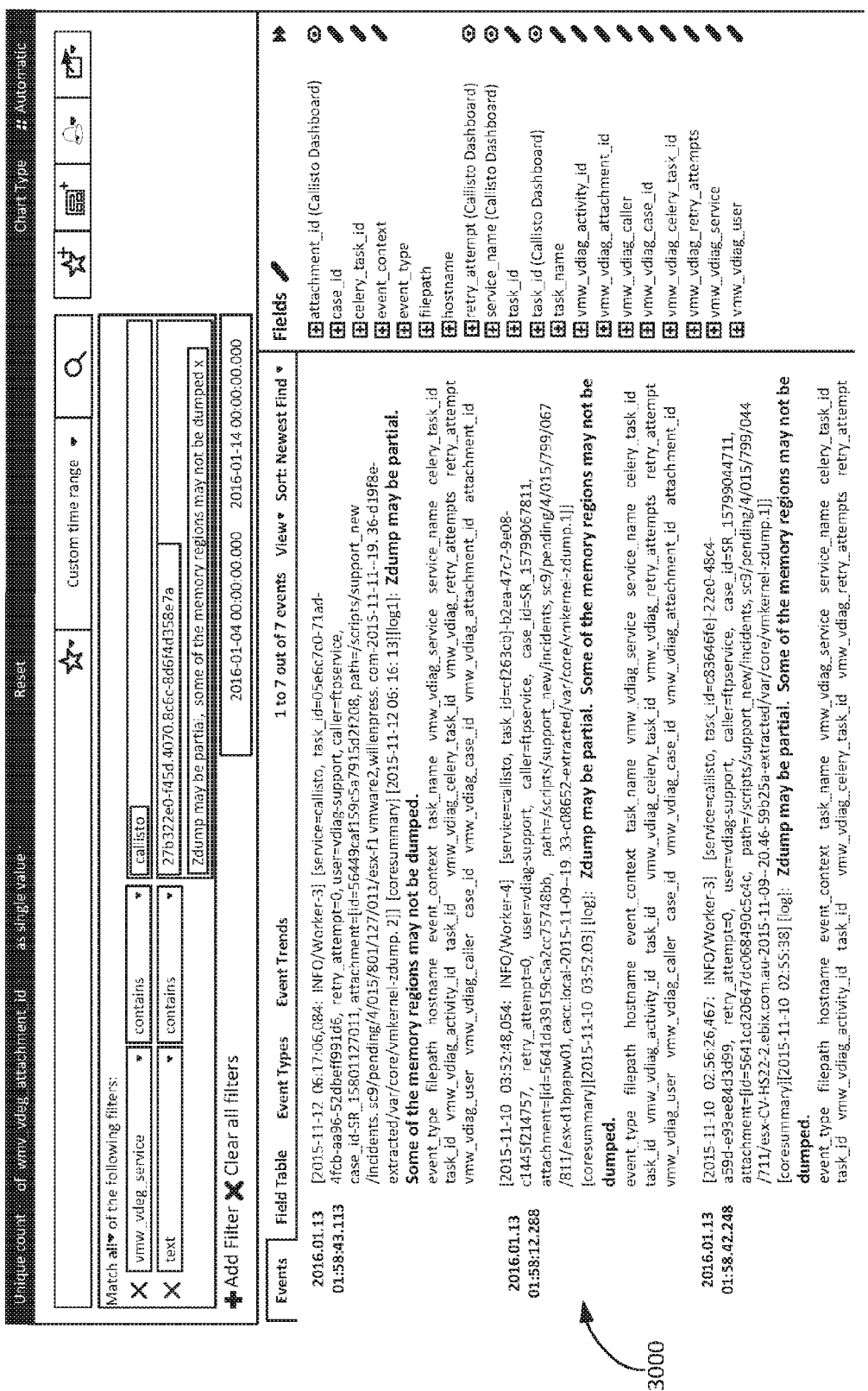
FIG. 30 is an example GUI comprising complete log files in accordance with embodiments of the present invention.

Referring now to FIG. 28, GUI 2700 further provides a graphical representation of four example components, A, B, C and D which comprise the example crash analysis system. As shown at 2704 of GUI 2700 on FIG. 28, for the eight failures described above, one the failures was due to component A as indicated at 2706. None of the failures was due to component B or component D. As indicated at 2708, the remaining seven of the eight failures was due to component C. Thus, monitoring system 2302 of FIG. 23 is able to provide information, and GUIs, regarding the operation of a crash analysis system. Additionally, by attaching prefixes to the various logs generated by a crash analysis system, monitoring system 2302 of the present embodiments provides information and GUIs, about the operation results, which were previously not possible. Referring briefly to FIG. 29, in various embodiments, GUI 2700 is also configured such that a user can select a particular portion of a graphical representation (e.g. histogram 2902 of 2700). In such an embodiment, additional information corresponding to histogram 2902 is provided in a separate GUI. For example, when histogram 2902 is selected, separate GUI 2904 of FIG. 29, is generated listing additional log message information corresponding to histogram 2902. Further, in various embodiments, GUI 2904 is also configured such that a user can select a particular portion thereon. In such an embodiment, additional information corresponding to histogram GUI 2904 is provided in yet a separate GUI. For example, if GUI 2904 is selected, a separate GUI 3000 of FIG. 30 comprising complete log files are provided corresponding to the item selected in GUI 2904. Thus, GUIs provided by operation results GUI generator 2406 of FIG. 24 allow the user to "drill down" and gain additional information and insight regarding the operation results derived by monitoring system 2302 of the present embodiments.

Figure 31:
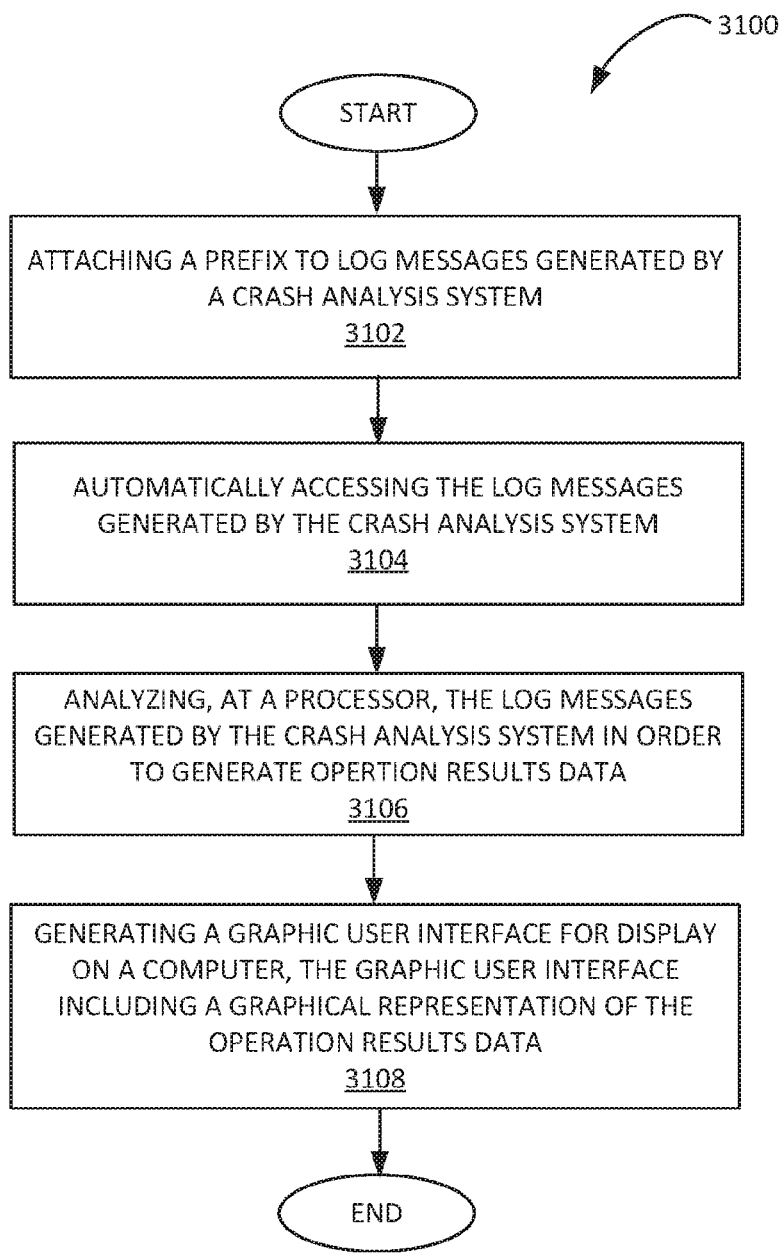
FIG. 31 is a flowchart of various processes performed to monitor a crash analysis system in accordance with embodiments of the present invention.

Referring now to FIG. 31, a flow chart 3100 is provided of an example method for monitoring a crash analysis system, according to various embodiments of the present invention. Procedures of this method are performed in conjunction with the various elements and/or components of FIGS. 1-30. It is appreciated that in some embodiments, the procedures may be performed in a different order than described, that some of the described procedures may not be performed, and/or that one or more additional procedures to those described may be performed. Flow chart 3100 includes some procedures that, in various embodiments, are carried out by one or more processors under the control of computer-readable and computer-executable instructions that are stored on non-transitory computer-readable storage media. It is further appreciated that one or more procedures described in flow chart 3100 may be implemented in hardware, or a combination of hardware with firmware and/or software.

At 3102, embodiments in accordance with the present invention attach a prefix to log messages generated by crash analysis system 206.

At 3104, embodiments in accordance with the present invention automatically access the log messages generated by crash analysis system 206.

At 3106 embodiments in accordance with the present invention analyze, at a processor (e.g. one or more of processors 106A, 106B and 106C of FIG. 1), the log messages generated by crash analysis 206 system in order to generate operation results data.

At 3108 embodiments in accordance with the present invention generate a graphic user interface for display on a computer, the graphic user interface include a graphical representation of the operation results data derived at 3106.

Once more, the details of the various components and processes for performing 3100 of FIG. 31 are provided above.

Hence, the embodiments of the present invention greatly extend beyond conventional methods of simply manually examining log messages. Moreover, embodiments of the present invention amount to significantly more than merely using a computer to examine conventional log messages. Instead, embodiments of the present invention specifically recite a novel process, rooted in computer technology, for appending a prefix to a log message and generating operation results to overcome a problem specifically arising in the realm of monitoring computer systems.

Computer Crash Risk Assessment

First, a brief overview of the present Computer Crash Risk Assessment invention is provided in the present paragraph. Embodiments of the present invention utilize results obtained from the above described crash analysis system to determine the likelihood that a computer system will experience a particular crash in the future. In some embodiments, the present invention provides information, regarding the likelihood of the future computer system crash, on a portal which can be accessed by various parties. In other embodiments, the present invention proactively notifies a customer of the likelihood of the customers computer to experience the future computer system crash. In so doing, the present embodiments enable a customer to take preemptive action to avoid the future computer system crash. The below discussion provides a detailed description of various embodiments of the present invention.

Figure 32:
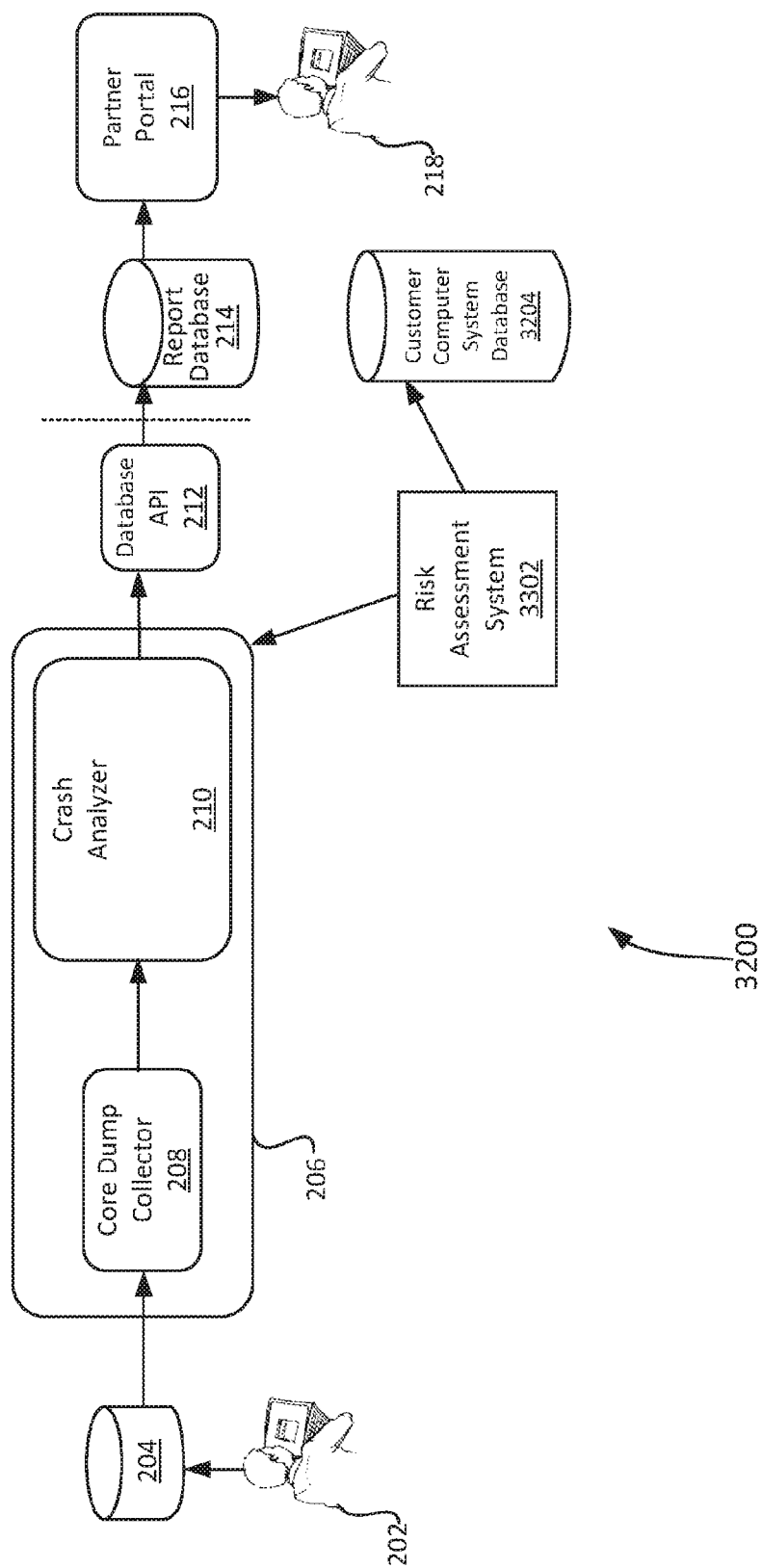
FIG. 32 is a diagram including an automated end-to-end system and a risk assessment system in accordance with embodiments of the present invention.

As was described in detail above, the present automated end-to-end analysis system 200 (described, for example, in conjunction with the discussion of FIG. 2) includes crash analysis system 206. The following description pertains to a method and system for using results obtained from crash analysis system 206 to determine the likelihood that a particular computer system will experience a crash in the future. Referring now to FIG. 32, a diagram 3200 is shown illustrating an embodiment of the present risk assessment system communicatively coupled with crash analysis system 206.

In the present embodiments, risk assessment system 3202 and its corresponding processes enables, for example, a support person to determine the likelihood that a particular computer system will experience a crash in the future. In the following discussion, the potential crash which may occur on a computer system in the future, is referred to as a "future crash".

Referring again to FIG. 32, as was described in detail above, core dump collector 208 of crash analysis system 206 receives the core dump from service request repository 204. Dump collector 208 then provides the unique core dump to crash analyzer 210. Crash analyzer 210 analyzes the core dump, generates crash report data (also referred to as crash results), and then generates a graphic user interface including a graphic representation of the crash report data. In embodiments of the present invention, risk assessment system 3202 receives the data or crash results from crash analysis system 206. Risk assessment system 3202 analyzes the crash results (as will be described below in detail) to determine the likelihood that a particular computer system will experience a future crash. Risk assessment system 3202 then provides information regarding the likelihood of the future crash occurring on the particular computer system to a user of the particular computer system. In various embodiments, risk assessment system 3202 also generates a graphic user interface for display on a computer, wherein the graphic user interface includes a graphical representation of the information regarding the likelihood of the future crash occurring on the particular computer system. FIG. 32 further includes a customer computer system database 3204. A detailed discussion of the operation of risk assessment system 3202 and the various components of FIG. 32 is provided below.

Importantly, the embodiments of the present invention, provide a risk assessment system 3202 which significantly extends what was previously possible. Various embodiments of risk assessment system alert a user, regarding the likelihood of the future crash occurring on a particular computer system. Moreover, present risk assessment system 3202 enables the user to take preemptive action to avoid the future crash. This is in contrast to conventional approaches for crash handling which simply wait for a computer crash to occur before addressing the crash. Thus, embodiments of present risk assessment system 3202 provide an assessment methodology which extends well beyond what was previously known.

Also, although certain components are depicted in, for example, crash analysis system 206 and risk assessment system 3202, it should be understood that, for purposes of clarity and brevity, each of the components may themselves be comprised of numerous modules or macros which are not shown.

Figure 33:
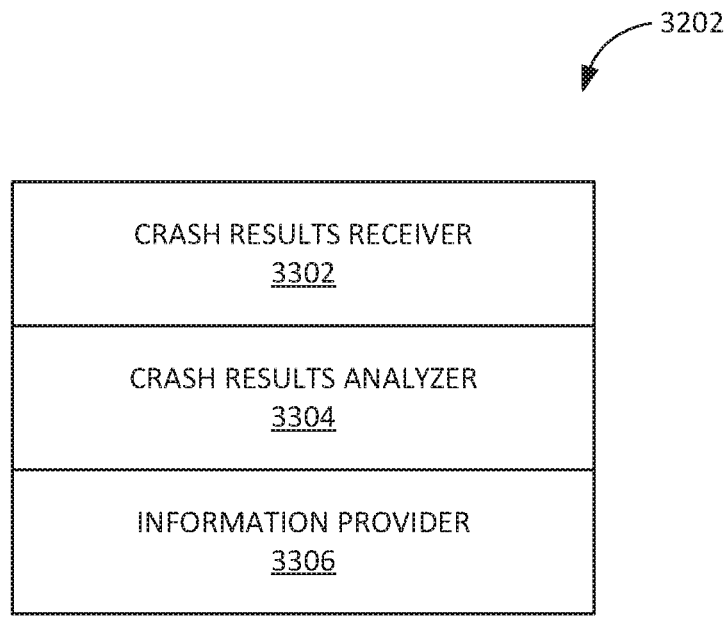
FIG. 33 is a schematic diagram of components comprising a risk assessment system in accordance with embodiments of the present invention.

Referring now to FIG. 33, a schematic diagram of various components comprising risk assessment system 3202 is shown, in accordance with embodiments of the present invention. Risk assessment system 3202 includes a crash results receiver 3302. In embodiments of the present invention, crash results receiver 3302 receives the crash results directly from crash analysis system 206. It should be understood that the various embodiments of the present invention are also well suited to having crash results receiver 3302 receive the crash results from, for example, crash analyzer 210. Similarly, the various embodiments of the present invention are also well suited to having crash results receiver 3302 receive the crash results from, for example, report database 214 or from elsewhere within system 3200.

In FIG. 33, crash results receiver 3302 is depicted as integrated with crash results analyzer 3304 and information provider 3306. It should be noted that such a depiction is intended merely to show the various components of risk assessment system 3202, and is not intended to limit the location of crash results receiver 3302, crash results analyzer 3304 or information provider 3306. In various embodiments of the present invention, one or more of crash results receiver 3302, crash results analyzer 3304 and information provider 3306 is implemented, for example, other than integrated as shown in FIG. 33.

Referring still to FIG. 33, crash results analyzer 3304 receives the crash results from crash results receiver 3302, and then analyzes the crash results. In various embodiments of the present invention some or all of the necessary analysis of the crash results may have previously been completed by other components within system 3200 of FIG. 32. Ultimately, analysis of the crash results is required for risk assessment system 3202 to complete its tasks. For purposes of the below discussion, it is assumed that crash results analyzer 3304 performs the necessary analysis on the crash results.

With reference still to FIG. 33, crash results analyzer 3304 utilizes the crash results to determine the likelihood that a particular computer system will experience a future crash. For purposes of the present discussion, consider the following example. In the present example, in one embodiment, crash results analyzer 3304 determines that a significant number of the crashes found in the crash results (generated by crash analysis system 206 of FIG. 32 and received by crash results receiver 3302) are shown to correspond to version 1.1 of Driver D. Moreover, in the present example, crash results analyzer 3304 determines that version 1.1 of Driver D is almost always the culprit module when utilized with the ABC operating system. Conversely, in the present example, crash results analyzer 3304 then determines that no crashes correspond to version 2.2 of Driver D, even when version 2.2 of Driver D is utilized with the ABC operating system. In such an example, crash results analyzer 3304 is able to determine that there is a probable or "High" likelihood of a future crash for a computer system which is using version 1.1 of Driver D in conjunction with the ABC operating system. In the same example, crash results analyzer 3304 is able to determine that there is an occasional or "Medium" likelihood of a future crash for a computer system which is using version 1.1 of Driver D but which is not using the ABC operating system. Finally, in the present example, crash results analyzer 3304 is able to determine that there is an isolated or "Low" likelihood of a future crash for a computer system which is using version 2.2 of Driver D regardless of the operating system. Thus, as shown in the example above, in various embodiments, crash results analyzer 3304 is able to apply ranking to the likelihood of the future crash occurring on a particular computer system. Although the present example used the "High", "Medium" or "Low" ranking format, the various embodiments of the present invention are well suited to using various other types and quantities of ranking formats. In some embodiments, the present invention will return a message indicating that there is insufficient data to calculate the likelihood of a crash.

Figure 34:
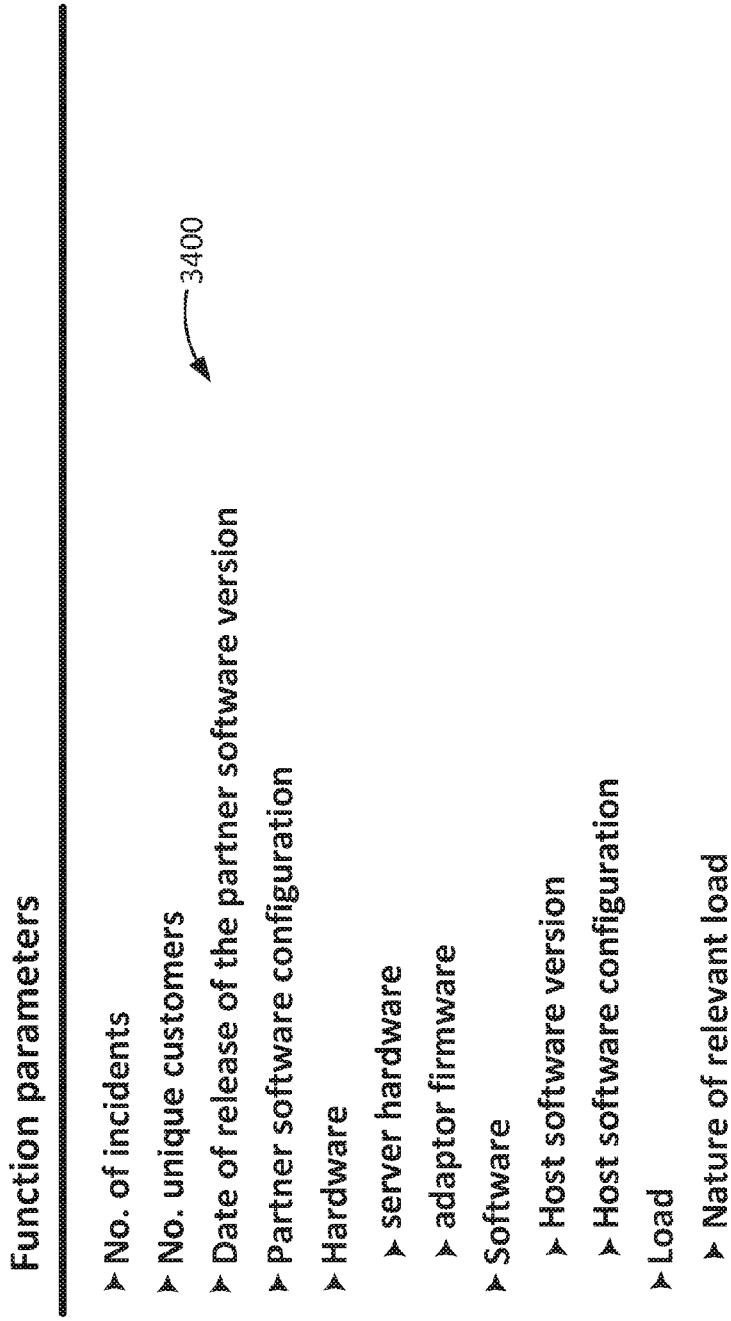
FIG. 34 is a listing of various example parameters utilized by a risk assessment system in accordance with embodiments of the present invention.

In the above example, crash results analyzer 3304 utilized the type of driver and the type of operating system determine the likelihood of a future crash for a computer system. It should be noted that in the various embodiments of the present invention, crash results analyzer 3304 is well suited to using other information (or function parameters) to determine the likelihood of a future crash for a computer system. With reference next to FIG. 34, in accordance with embodiments of the present invention, a listing 3400 of various function parameters is provided. In the various embodiments of the present invention, crash results analyzer 3304 is able to consider any or all of the listed parameter when determining the likelihood of a future crash for a computer system. Also, it should be understood that the list of parameters in 3400 of FIG. 34 is not intended to be exhaustive of the parameters which can be considered by crash results analyzer 3304 when determining the likelihood of a future crash for a computer system.

Additionally, embodiments of the present invention are also well suited to having crash results analyzer 3304 utilize any one or more of the parameters listed in FIG. 34 when analyzing the crash results to determine the likelihood of the future crash for a particular computer system. Similarly, embodiments of the present invention are also well suited to having crash results analyzer 3304 utilize any combination of two or more of the parameters listed in FIG. 34 when analyzing the crash results to determine the likelihood of the future crash for a particular computer system. Several of the more common parameters considered by crash results analyzer 3304 when determining the likelihood of a future crash for a computer system include, but are not limited to, a particular instance of software, a particular instance of hardware, a particular combination software and hardware, and a particular computational load experienced by a computer system.

Referring still to FIG. 34, in one embodiment of the present invention, risk assessment system 3202 is communicatively coupled with customer computer system database 3204. Customer computer system database 3204, of the present embodiment, contains a listing of the various computer systems (and the corresponding parameters for the computer systems) for customers of interest. In one such embodiment, crash results analyzer 3304 accesses customer computer system database 3204. In such an embodiment, crash results analyzer 3304 determines the likelihood of a future crash for a computer system, and then crash results analyzer 3304 accesses customer computer system database 3204. In so doing, crash results analyzer 3304 is able to "pair" the determined likelihood for a future crash with the computer systems found in customer computer system database 3204.

Using the example of above, crash results analyzer 3304 would access customer computer system database 3204 to determine which customers have a computer system which uses version 1.1 of Driver D in conjunction with the ABC operating system. Crash results analyzer 3304 would then identify those customers as having a "High" likelihood of experiencing a future crash. Similarly, crash results analyzer 3304 will access customer computer system database 3204 to determine which customers have a computer system which uses version 1.1 of Driver D without the ABC operating system. Crash results analyzer 3304 would then identify those customers as having a "Medium" likelihood of experiencing a future crash. Finally, crash results analyzer 3304 would access customer computer system database 3204 to determine which customers have a computer system which uses version 2.2 of Driver D. Crash results analyzer 3304 would then identify those customers as having a "Low" likelihood of experiencing a future crash. In the present embodiments numerous permutations are possible based on the content of customer computer system database 3204 and the determinations made by crash results analyzer 3304. Ultimately, the information determined by crash results analyzer 3304 regarding the likelihood of a future crash is received by information provider 3306.

Referring again to FIG. 33, risk assessment system 3202 further comprises an information provider 3306. In the present embodiments, information provider 3306 provides the information determined by crash results analyzer 3304 to computer system users. In one embodiment, information provider 3306 provides the information, regarding the likelihood of a future crash, on a portal accessible by to users of the computer systems of interest. In one such embodiment, information provider 3306 utilizes partner portal 216 of FIG. 32 to provide the information to the users of the computer systems of interest. In such an embodiment, users are made aware of the likelihood of a future crash on their computer systems only if the user accesses partner portal 216. Thus, such an approach can be described as a "passive" approach. In various other embodiments of the present invention, partner portal 216 is for third party software companies only. Further, in another embodiment, risk assessment system 3202 provides a stand-alone service which customers call to determine if a given driver version is at risk or not. For example, a customer is setting a new data center of 100 machines. At that time the data center administrator has to pick the driver version, etc which will be deployed on all those 100 machines. Using embodiments in accordance with the present invention, the data center administrator can call the service and enquire if his/her choice of driver version is at risk or not.

Referring still to FIG. 33, in another embodiment of the present invention, information provider 3306 utilizes a messaging platform, not shown, to send a message to a user of a computer system. In such an embodiment, information provider 3306 sends a message to the user containing the information regarding the likelihood of the future crash occurring on the user's computer system. In such an embodiment, users are made aware of the likelihood of a future crash on their computer systems regardless of whether the user initiates access to partner portal 216. Thus, such an approach can be described as an "active" approach. The present embodiments are well suited to either the passive or the active approach. Moreover, embodiments of the present invention are also well suited to using one approach (e.g., the active approach) when the likelihood of future crash is "High", and another approach (e.g., the passive approach) when the likelihood of a future crash is "Low".

With reference still to FIG. 33, in various embodiments of the present invention, information provider 3306 may generate GUI including a graphical representation of the information regarding the likelihood of a future crash. In such an embodiment, information provider 3306 would generate and provide the GUI for display in a manner as was described above in conjunction with discussion of FIGS. 12-22. Generally, in such embodiments, the GUIs provide a graphical representation and/or a categorization of novel data derived from the present risk assessment system 3202. In some embodiments, the present GUI is provided, for example, on partner portal 216 which can be accessed by various parties. In so doing, the present GUI enables a party to obtain insight and information about the likelihood of a future crash in a manner that was not previously possible. It should be appreciated that GUIs may be designed to provide a particular interactive experience based on the type of information presented and/or received through the GUI. Moreover, a GUI may include one or more different type of interactive elements for receiving information. For example, the interactive elements may include, without limitation: buttons, widgets, controls, text boxes, radio buttons, tri-state boxes, list boxes, numerical input boxes, tool bars, sliders, spinners, drop-down lists, accordion lists, menus, menu bars, tool bars, icons, scroll bars, labels, tooltips, balloon help, status bars, progress bars, etc. The types of interactive elements included in a GUI are typically design decisions, where a GUI designer might attempt to provide particular elements to present and/or receive particular types of information. For example, a simple GUI may include a drop-down list, where a user would select an item from the drop down list. Moreover, it should be appreciated that an aspect of GUI design is to provide feedback to the user. For example, if the user inputs invalid information, or is limited in the information they may be input, it might be desirable to explain this to the user. This information may be explained explicitly, e.g., via a message, or implicitly, e.g., disallowing the input.

Figure 35:
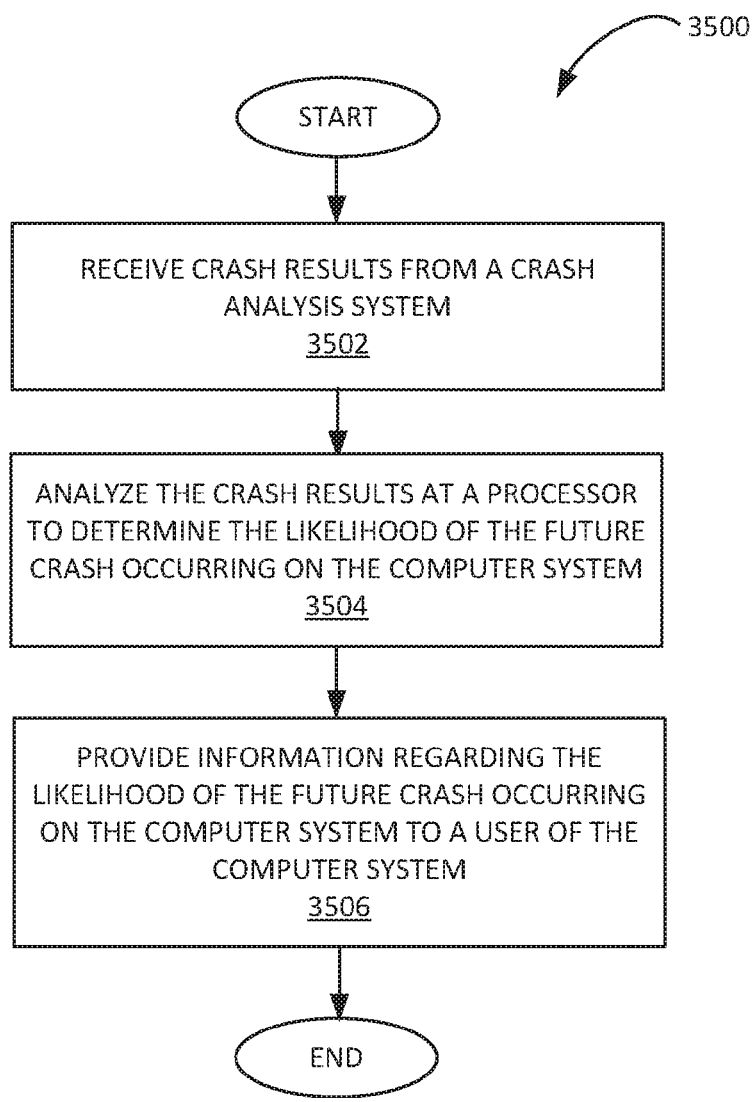
FIG. 35 is a flowchart of various processes performed to monitor a crash analysis system in accordance with embodiments of the present invention.

Referring now to FIG. 35, a flow chart 3500 is provided of an example method for assessing the risk that a future crash will occur on a computer system, according to various embodiments of the present invention. Procedures of this method are performed in conjunction with the various elements and/or components of FIGS. 1-34. It is appreciated that in some embodiments, the procedures may be performed in a different order than described, that some of the described procedures may not be performed, and/or that one or more additional procedures to those described may be performed. Flow chart 3500 includes some procedures that, in various embodiments, are carried out by one or more processors under the control of computer-readable and computer-executable instructions that are stored on non-transitory computer-readable storage media. It is further appreciated that one or more procedures described in flow chart 3500 may be implemented in hardware, or a combination of hardware with firmware and/or software.

At 3502, embodiments in accordance with the present invention receive crash results from crash analysis system 206 of FIG. 32.

At 3504, embodiments in accordance with the present invention analyze the crash results, at a processor (e.g. one or more of processors 106A, 106B and 106C of FIG. 1), to determine the likelihood of a future crash occurring on a particular computer system.

At 3506, embodiments in accordance with the present invention provide information regarding the likelihood of the future crash occurring on the particular computer system to a user of the particular computer system analyze.

Hence, the embodiments of the present invention greatly extend beyond conventional methods of simply waiting for a computer crash to occur before attempting to deal with the problem. Moreover, embodiments of the present invention amount to significantly more than merely using a computer to perform conventional crash handling. Instead, embodiments of the present invention specifically recite a novel process, necessarily rooted in computer technology, for determining the likelihood that a computer system will experience a particular crash in the future. In various embodiments, the present invention provides information, regarding the likelihood of the future computer system crash, to a user of the computer system. In so doing, the present embodiments enable a customer to take preemptive action to avoid the future computer system crash. Thus, embodiments of the present invention teach novel approaches for using a computer to overcome a problem specifically arising in the realm of computer system crash analysis.

Once more, the details of the various components and processes for performing 3500 of FIG. 35 are provided above.

Figure 36:
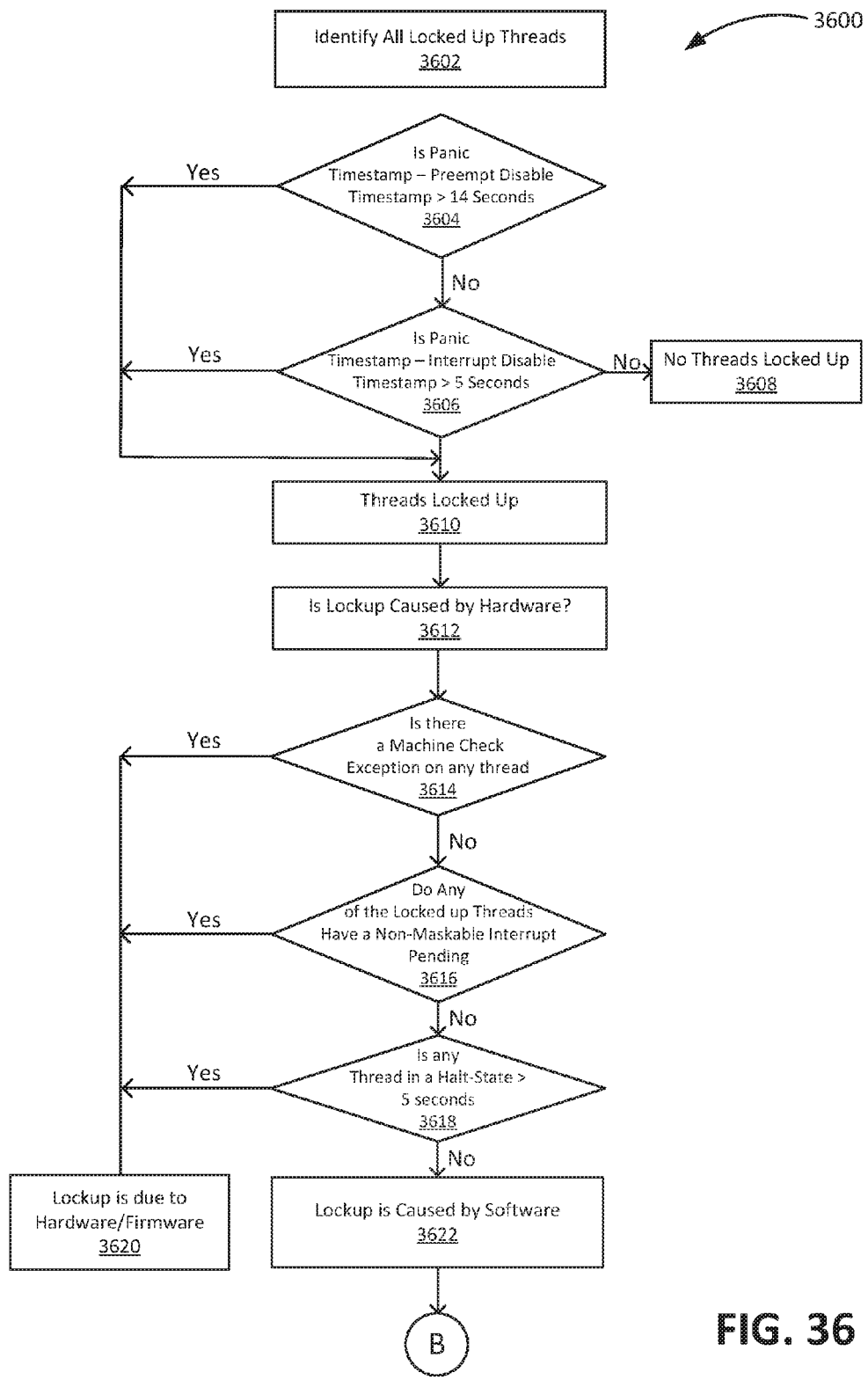
FIG. 36 is a flowchart of various processes performed to determine a culprit thread in a physical central processing unit (pcpu) lockup in accordance with embodiments of the present invention.
Figure 36:
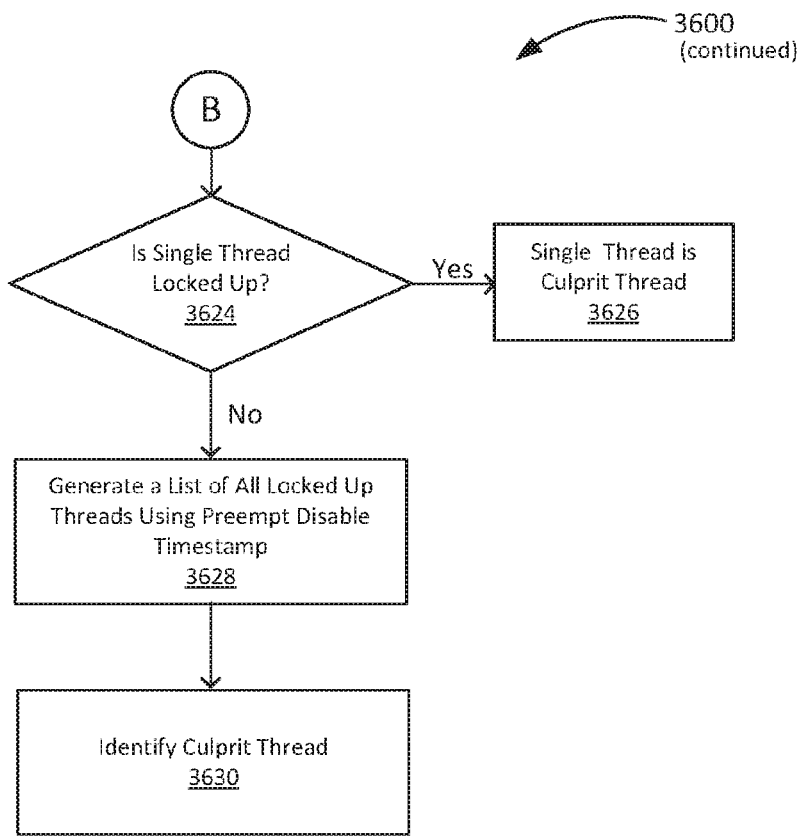

Determination of a Culprit Thread after a Physical Central Processing Unit Lockup FIG. 36 is a flow diagram of an example Method for Determination of a Culprit Thread after a Physical Central Processing Unit (pcpu) Lockup, according to various embodiments. As is described in detail above, in various embodiments of the present invention, a back trace (generated from a core dump) is ultimately used to determine a culprit thread corresponding to a computer crash. However, in certain instances, for example, when a pcpu lock up occurs, a back trace generated from a received core dump may only reveal a victim thread and may not reveal the culprit thread. Thus, as will be described in detail below, embodiments of the present invention will address the situation wherein a pcpu lockup is suspected to be the cause of a computer crash. As stated previously, a pcpu lockup occurs when one or more threads run in kernel/privileged context for a longer period of time without yielding the CPU (central processing unit) to the scheduler and/or not serving interrupts (for a longer period of time). This may be due to interdependencies between these threads, but often one thread is causing other threads to lockup. Importantly, a pcpu lockup can occur in one thread although another thread is actually responsible for the pcpu lockup. That is, a first thread may be found to be looping or otherwise in a pcpu lockup. Upon closer inspection, it is sometimes determined that a second thread is actually causing the first thread to experience the pcpu lockup. As an example, a first thread has disabled interrupts and may be awaiting a lock that is being improperly held by a second thread. As a result, the first thread experiences the pcpu lockup, but the second thread, which improperly holding the lock, is actually causing the pcpu lockup of the first thread. In such situations, it is important to identify the second thread (not the first thread) as the culprit thread which corresponds to the pcpu lockup and corresponding software crash. As one example, an internal system "heartbeat" may not be received from a CPU for a period of time which exceeds the system parameters. In one common system parameter, if a particular CPU does not provide a heartbeat for a period of time exceeding, for example, 14 seconds, that particular CPU is deemed to be locked up. When the CPU is deemed to be locked up, a crash occurs and a core dump is generated in the manner described above in detail.

Procedures of this method will be described with reference to elements and/or components of, for example, FIGS. 1-11. It is appreciated that in some embodiments, the procedures may be performed in a different order than described, that some of the described procedures may not be performed, and/or that one or more additional procedures to those described may be performed. Flow diagram 3600 includes some procedures that, in various embodiments, are carried out by one or more processors under the control of computer-readable and computer-executable instructions that are stored on non-transitory computer-readable storage media. It is further appreciated that one or more procedures described in the flow diagrams may be implemented in hardware, or a combination of hardware with firmware and/or software, such as is shown, for example, in FIG. 1. More specifically, various embodiments of the present invention, as described in detail below, are performed by crash analyzer 210 of FIGS. 2 and 3. In other approaches, the various embodiments of the present invention are performed on a crash analyzer which operates outside of an end-to-end system and method.

Figure 37:
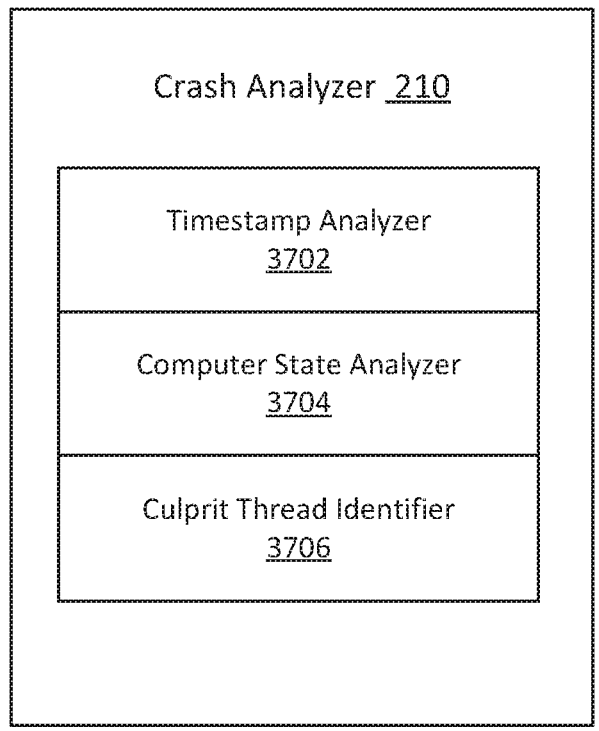
FIG. 37 is a schematic diagram of various components comprising crash analyzer 210 in accordance with embodiments of the present invention.

A brief overview of the present Method for Determination of a Culprit Thread after a Physical Central Processing Unit (pcpu) Lockup, of, for example, FIGS. 36-37, is provided in the present paragraph. As is known in the art, a crash or system crash refers to a situation in which a computer program such as, for example, an operating system or a software application ceases to function properly. Using a received PSOD, embodiments in accordance with the present invention automatically determine if the crash was due to a pcpu lockup. If the computer crash was caused by a pcpu lockup, embodiments in accordance with the present invention will automatically determine which thread (referred to as the "culprit thread") is responsible for causing the particular pcpu-based crash depicted in the PSOD. The below discussion provides a detailed description of various embodiments of the present invention.

FIG. 36 is a flow diagram of an example Method for Determination of a Culprit Thread after a Physical Central Processing Unit (pcpu) Lockup, according to various embodiments. Procedures of this method will be described with reference to elements and/or components of, for example, FIGS. 1-11. It is appreciated that in some embodiments, the procedures may be performed in a different order than described, that some of the described procedures may not be performed, and/or that one or more additional procedures to those described may be performed.

Referring again to FIG. 36, in one embodiment, after a crash of the computer system occurs, a core dump is received by, for example, crash analyzer 210 of FIGS. 2 and 3. At 3602, embodiments in accordance with the present invention identify all of the threads (in the received core dump) which are locked up. It should be noted that the terms "hung", "hang up", "hang", and the like are sometimes used to synonymously with the term "locked up". It should further be noted that, in some instances, there may be hundreds or thousands of running threads in a core dump depending upon the number of pcpu lockups. As will be described below, the present embodiment specifically determines which of the running threads of the core dump are locked up using the processes disclosed at 3604 and 3606 of FIG. 36.

At 3604, the present embodiment examines the timestamps associated with each thread of the received core dump and compares the panic timestamp for each thread with the preempt disable timestamp for the same thread. It should be noted that the panic timestamp is common across all threads in a core dump (i.e. across all threads) whereas the preempt disable time stamp is per thread. If the difference between the panic timestamp and the preempt disable timestamp for a thread is greater than 14 seconds, the present embodiment determines that the thread is in a locked up state as indicated by 3610. If the difference between the panic timestamp and the preempt disable timestamp for a thread is not greater than 14 seconds, than the present embodiment proceeds to 3606.

Referring now to 3606, the present embodiment then examines the timestamps associated with each received thread and compares the panic timestamp for each received thread with the interrupt disable timestamp for the same thread. It should be noted that the panic timestamp is common across all threads in a core dump (i.e. across all threads) whereas the interrupt disable time stamp is per thread. If the difference between the panic timestamp and the interrupt disable timestamp for a thread is greater than 5 seconds, the present embodiment determines that the thread is in a locked up state as indicated by 3610. If the difference between the panic timestamp and the interrupt disable timestamp for a thread is not greater than 5 seconds, than the present embodiment determines that the thread is not is a locked up state (that is, there is no "hang" for that thread) as shown at 3608. Thus, at the completion of 3606, the present embodiment will have which of the threads (from the core dump) are in a locked up state. In one embodiment, the present invention compiles a listing of the threads which are locked up. Importantly, although the description and examples herein refer to specific time differences between the panic timestamp and the preempt disable timestamp and the interrupt disable timestamp, the present invention is well suited to utilizing a different time differences and even different types of timestamps. Also, for purposes of brevity and clarity, the present description of 3604 and 3606 of FIG. 36 pertains to an example in which crash analysis system 206 is analyzing a core dump or PSOD received from a VMware ESXi™, enterprise-class, type-1 hypervisor developed by VMware, Inc. of Palo Alto, Calif. Importantly it should be understood that the embodiments of the present invention are well suited to having the processes of FIG. 36 performed on other types of core dumps. However, the inventive concepts of the various embodiments of the present invention are still applicable to various other types of crash analysis systems which, in turn, are analyzing various other types of crash data.

At 3612, one embodiment of the present invention then determines if the lock up of the thread/threads was caused by hardware and/or firmware. The present embodiment specifically determines whether the lock up was caused by hardware and/or firmware using the processes disclosed at 3614, 3616 and 3618 of FIG. 36.

At 3614, upon receiving an indication that a crash has occurred, one embodiment of the present invention determines if a Machine Check Exception (MCE) has occurred on any of the locked up threads at the time of the computer crash. If a MCE has occurred on any of the locked up threads at the time of the computer crash, the present embodiment makes a determination that the lock up was caused by a hardware or firmware issue as shown at 3620. If at 3614, it is determined that no MCE has occurred on any of the locked up threads, the present embodiment proceeds to 3616.

At 3616, one embodiment of the present invention determines if a Non-Maskable Interrupt (NMI) is pending on any of the locked up threads at the time of the computer crash. If an NMI is pending on any of the locked up threads at the time of the computer crash, the present embodiment makes a determination that the lock up was caused by a hardware and/or firmware issue as shown at 3620. If at 3616, it is determined that no NMI is pending on any of the locked up threads at the time of the computer crash, the present embodiment proceeds to 3618.

At 3618, one embodiment of the present invention determines if any of the locked up threads have been in a "HALT" state for longer than 5 seconds at the time of the computer crash. If any of the locked up threads have been in a "HALT" state for longer than 5 seconds at the time of the computer crash, the present embodiment makes a determination that the lock up was caused by a hardware and/or firmware issue as shown at 3620. If at 3616, it is determined that none of the locked up threads were in a "HALT" state for longer than 5 seconds at the time of the computer crash, the present embodiment determines that the lock up was caused by software as shown at 3622.

It should be noted if a determination is made, as shown at 3620, that the computer crash is due to hardware and/or firmware, the present embodiment takes no further action. In some embodiments, a notification is automatically provided to an appropriate vendor indicating that the vendors hardware and/or firmware is responsible for causing the computer crash. In one such embodiment, the notification is sent to the appropriate vendor. In one such embodiment, information provider 3306 of FIG. 33 provides the information, determined by the present Method for Determination of a Culprit Thread after a Physical Central Processing Unit (pcpu) Lockup, to computer system users. In one embodiment, information provider 3306 provides the information, regarding the hardware or firmware causing the crash, on a portal accessible by to users of the computer systems of interest. In one such embodiment, information provider 3306 utilizes partner portal 216 of FIG. 32 to provide the information to the users of the computer systems of interest. In such an embodiment, users are made aware of the hardware or firmware causing the crash on their computer systems only if the user accesses partner portal 216. Thus, such an approach can be described as a "passive" approach.

Referring still to FIG. 33, in another embodiment of the present invention, information provider 3306 utilizes a messaging platform, not shown, to send a message to a user of a computer system. In such an embodiment, information provider 3306 sends a message to the computer system user (and/or the hardware or firmware vendor) containing the information regarding the hardware or firmware causing the crash of the user's computer system. Thus, such an approach can be described as an "active" approach. The present embodiments are well suited to either the passive or the active approach.

With reference still to FIG. 33, in various embodiments of the present invention, information provider 3306 may generate GUI including a graphical representation of the information regarding the hardware or firmware causing the crash. In such an embodiment, information provider 3306 would generate and provide the GUI for display in a manner as was described above in conjunction with discussion of FIGS. 12-22. Generally, in such embodiments, the GUIs provide a graphical representation and/or a categorization of novel data derived from the present Method for Determination of a Culprit Thread after a Physical Central Processing Unit (pcpu) Lockup. In some embodiments, the present GUI is provided, for example, on partner portal 216 which can be accessed by various vendors or other parties. In so doing, the present GUI enables a party to obtain insight and information about the hardware or firmware causing the crash in a manner that was not previously possible. It should be appreciated that GUIs may be designed to provide a particular interactive experience based on the type of information presented and/or received through the GUI. Moreover, a GUI may include one or more different type of interactive elements for receiving information. For example, the interactive elements may include, without limitation: buttons, widgets, controls, text boxes, radio buttons, tri-state boxes, list boxes, numerical input boxes, tool bars, sliders, spinners, drop-down lists, accordion lists, menus, menu bars, tool bars, icons, scroll bars, labels, tooltips, balloon help, status bars, progress bars, etc. The types of interactive elements included in a GUI are typically design decisions, where a GUI designer might attempt to provide particular elements to present and/or receive particular types of information. For example, a simple GUI may include a drop-down list, where a user would select an item from the drop down list. Moreover, it should be appreciated that an aspect of GUI design is to provide feedback to the user. For example, if the user inputs invalid information, or is limited in the information they may be input, it might be desirable to explain this to the user. This information may be explained explicitly, e.g., via a message, or implicitly, e.g., disallowing the input.

Referring back to FIG. 36, when the present embodiment determines, as shown at 3622, that the computer crash is due to software, the present embodiment proceeds to 3624. Also, although the description and examples herein related to 3614, 3616 and 3618 refer to MCE, NMI and HALT state, respectively, the present invention is well suited to utilizing a different exceptions, interrupts, and/or HALT state durations to indicate that hardware and/or firmware caused the computer crash. Also, for purposes of brevity and clarity, the present description of 3614, 3616 and 3618 of FIG. 36 pertains to an example in which crash analysis system 206 is analyzing a core dump or PSOD received from a VMware ESXi™, enterprise-class, type-1 hypervisor developed by VMware, Inc. of Palo Alto, Calif. Importantly it should be understood that the embodiments of the present invention are well suited to having the processes of FIG. 36 performed on other types of core dumps. However, the inventive concepts of the various embodiments of the present invention are still applicable to various other types of crash analysis systems which, in turn, are analyzing various other types of crash data.

At 3624, one embodiment of the present Method for Determination of a Culprit Thread after a Physical Central Processing Unit (pcpu) Lockup determines if only a single thread is locked up. That is, the present embodiment, provided the completion of steps 3602-3622 renders a determination that the lock up was caused by software, determines whether only a single thread is locked up. If only a single thread is locked up, the present Method for Determination of a Culprit Thread after a Physical Central Processing Unit (pcpu) Lockup makes the determination, as shown at 3626, that the single locked up thread is, in fact, the culprit thread. That is, in such an instance, as shown at 3626, the single locked up thread is deemed responsible for the pcpu lock up of the crashed computer system corresponding to the received PSOD or core dump. If, at 3624, it is determined that more than one thread is locked up, the present embodiment proceeds to 3628 as shown in FIG. 36.

It should be noted if a determination is made, as shown at 3626, that a single thread was responsible for the lock up and, therefore, that the single thread is the culprit thread, in some embodiments, a notification is automatically provided to the computer system user or to other parties of interest indicating which thread is responsible for causing the computer crash. Other parties of interest include, for example, third party software vendors. In one such embodiment, information provider 3306 of FIG. 33 provides the information, determined by the present Method for Determination of a Culprit Thread after a Physical Central Processing Unit (pcpu) Lockup, to computer system users or other parties of interest. In one embodiment, information provider 3306 provides the information and/or notification, regarding the culprit thread causing the crash, on a portal accessible by to users of the computer systems of interest. In one such embodiment, information provider 3306 utilizes partner portal 216 of FIG. 32 to provide the information to the users of the computer systems or other parties of interest. In such an embodiment, users (or parties of interest) are made aware of the culprit thread causing the crash on their computer systems only if the user (or party of interest) accesses partner portal 216. Thus, such an approach can be described as a "passive" approach.

Referring still to FIG. 33, in another embodiment of the present invention, information provider 3306 utilizes a messaging platform, not shown, to send a message to a user of a computer system. In such an embodiment, information provider 3306 sends a message to the computer system user (or party of interest) containing the information regarding the culprit thread causing the crash of the user's computer system. Thus, such an approach can be described as an "active" approach. The present embodiments are well suited to either the passive or the active approach.

With reference again to FIG. 36, and specifically to 3628, if it was determined at 3624 that more than one thread is locked up, the present Method for Determination of a Culprit Thread after a Physical Central Processing Unit (pcpu) Lockup generates a listing of all of the threads which are locked up. It should be noted that in computer systems crashes caused pcpu lock up, the number of locked up threads can be in the hundreds or even many hundreds of threads. In the present embodiment, at 3628, the present method generates a listing of all locked up threads in which the locked up threads are ordered in the list according to each locked up thread's respective preempt disable timestamp. In one embodiment of the present invention, at 3628, the list is generated with the locked up threads ranked on the list in ascending order according to each locked up thread's respective preempt disable timestamp. Although an ascending order is used in the present embodiment, the present method is also well suited to ranking the locked up threads other than by ascending order.

Referring still to 3628, in one embodiment, the present method also generates a second listing of the locked up threads. In such an embodiment, the present method generates the second listing of all locked up threads in which the locked up threads are ordered according to each locked up thread's respective interrupt disable timestamp. In one embodiment of the present invention, at 3628, the second list is generated with the locked up threads ranked on the list in ascending order according to each locked up thread's respective interrupt disable timestamp. Although an ascending order is used in the present embodiment, the present method is also well suited to ranking the locked up threads other than by ascending order on the second list. Upon completion of 3628, the present invention proceeds to 3630.

At 3630, one embodiment of the present invention analyzes the first list generated at 3628. The present embodiment locates the locked up thread which has the earliest preemptive disable timestamp. The present embodiment then identifies the locked up thread having the earliest preemptive disable timestamp as the culprit thread. Further, in an embodiment in which, for example, two locked up threads appear to have the same (or very similar) preemptive disable timestamps, the present embodiment then accesses the second list. The present embodiment then compares the first thread's interrupt disable timestamp to the second thread's interrupt disable timestamp. The present embodiment then identifies the locked up thread having the earliest interrupt disable timestamp as the culprit thread. Thus, even when two or more locked up threads appear to have very similar preemptive disable timestamps, embodiments of the present method utilize the interrupt disable timestamp to positively identify which of the two or more locked up threads is actually the culprit thread. Also, although the description and examples herein related to 3628 and 3630 refer to preemptive disable timestamps and interrupt disable timestamps, the present invention is well suited to utilizing different timestamps to identify the culprit thread. Also, for purposes of brevity and clarity, the present description of 3628 and 3630 of FIG. 36 pertains to an example in which crash analysis system 206 is analyzing a core dump or PSOD received from a VMware ESXi™, enterprise-class, type-1 hypervisor developed by VMware, Inc. of Palo Alto, Calif. Importantly it should be understood that the embodiments of the present invention are well suited to having the processes of FIG. 36 performed on other types of core dumps. However, the inventive concepts of the various embodiments of the present invention are still applicable to various other types of crash analysis systems which, in turn, are analyzing various other types of crash data.

In some embodiments, a notification is automatically provided to the computer system user or to other parties of interest indicating which thread is responsible for causing the computer crash. Other parties of interest include, for example, third party software vendors. In one such embodiment, information provider 3306 of FIG. 33 provides the information, determined by the present Method for Determination of a Culprit Thread after a Physical Central Processing Unit (pcpu) Lockup, to computer system users or other parties of interest. In one embodiment, information provider 3306 provides the information and/or notification, regarding the culprit thread causing the crash, on a portal accessible by to users of the computer systems of interest. In one such embodiment, information provider 3306 utilizes partner portal 216 of FIG. 32 to provide the information to the users of the computer systems or other parties of interest. In such an embodiment, users (or parties of interest) are made aware of the culprit thread causing the crash on their computer systems only if the user (or party of interest) accesses partner portal 216. Thus, such an approach can be described as a "passive" approach.

Referring still to FIG. 33, in another embodiment of the present invention, information provider 3306 utilizes a messaging platform, not shown, to send a message to a user of a computer system. In such an embodiment, information provider 3306 sends a message to the computer system user (or party of interest) containing the information regarding the culprit thread causing the crash of the user's computer system. Thus, such an approach can be described as an "active" approach. The present embodiments are well suited to either the passive or the active approach.

As was described in detail above, the present automated end-to-end analysis system 200 (described, for example, in conjunction with the discussion of FIG. 2) includes crash analysis system 206. Referring now to FIG. 37, an embodiment of the present crash analyzer 210 is provided.

In the present embodiment, crash analyzer is used to perform several of the task described above in detail in conjunction with 3602-3630.

Referring again to FIG. 37, as was described in detail above, core dump collector 208 of crash analysis system 206 receives the core dump from service request repository 204. Dump collector 208 then provides the unique core dump to crash analyzer 210. Crash analyzer 210 of the present embodiment analyzes the core dump and determines if the pcpu lockup is due to software. Provided the pcpu lockup is due to software, embodiments of the present invention positively identify the culprit thread responsible for the pcpu lockup of the computer system. In embodiments of the present invention, crash analyzer 210 includes timestamp analyzer 3702. Timestamp analyzer 3702 performs the operations described above in conjunction with 3602-3608. In embodiments of the present invention, crash analyzer 210 also includes computer state analyzer 3704. Computer state analyzer 3704 performs the operations described above in conjunction with 3612-3620. Additionally, in embodiments of the present invention, crash analyzer 210 also includes culprit thread identifier 3706. Culprit thread identifier 3706 performs the operations described above in conjunction with 3624-3630. In various embodiments, crash analyzer 210 also generates a graphic user interface for display on a computer, wherein the graphic user interface includes a graphical representation of the information derived from components 3702, 3704 and/or 3706.

Also, although certain components are depicted in, for example, crash analyzer 210, it should be understood that, for purposes of clarity and brevity, each of the components may themselves be comprised of numerous modules or macros which are not shown.

Hence, the embodiments of the present invention greatly extend beyond conventional methods which simply estimate or make a best guess as to whether or not a computer crash was caused by a pcpu lock up. In addition, embodiments of the present invention greatly extend beyond conventional methods of simply estimating or making a best guess as to whether or pcpu lock up was caused by a hardware or firmware issue, or whether the pcpu lock up was actually caused by software. Further, embodiments of the present invention greatly extend beyond conventional methods by positively identifying which locked up thread (of potentially many hundreds of locked up threads) is actually the responsible for the computer crash. That is, unlike conventional methods which simply estimate or make a best guess as to which thread is the actual culprit thread, embodiments of the present invention positively identify a culprit thread. Moreover, embodiments of the present invention amount to significantly more than merely using a computer to perform conventional analysis of pcpu lock ups. Instead, embodiments of the present invention specifically recite a novel process, necessarily rooted in computer technology, for determining a culprit thread after a physical central processing unit (pcpu) lockup. In various embodiments, the present invention utilizes a novel analysis approach employing threshold values associated with a plurality of disable timestamps. The various embodiments of the present invention further locate and utilize various exception types and threshold values associated with underlying computer status signals (e.g. Halt state data) to definitively differentiate between hardware or firmware caused lock ups and software caused lock ups. Further, embodiments of the present invention employ another novel process in which a plurality of disable timestamps are used to positively identify a culprit thread from numerous locked up threads. Thus, embodiments of the present invention teach novel approaches for using a computer to overcome a problem specifically arising in the realm of computer system crash analysis. More specifically, embodiments of the present invention teach novel approaches for using a computer to determine a culprit thread after a physical central processing unit (pcpu) lockup.

Once more, the details of the various components and processes for performing 3600 of FIG. 36 are provided above.

CONCLUSION

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," "various embodiments", or similar term, means that a particular feature, structure, or characteristic described in connection with that embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A computer-implemented method for determining a culprit thread after a physical central processing unit (pcpu) lockup of a computer system, said method comprising:
receiving a core dump, wherein said core dump corresponds to a customer service request regarding a crash of said computer system;
automatically analyzing said core dump with a processor to determine if said pcpu lockup of said computer system is due to a software issue, wherein said automatically analyzing said core dump further comprises:
automatically determining a culprit module responsible for said crash of said computer system, said core dump including crash results corresponding to said crash; and
automatically generating a signature back trace, wherein said signature back trace pertains to a symptom of said crash of said computer system, and wherein said automatically determining a culprit module responsible for said crash of said computer system further comprises:
generating an essential stack of functions corresponding to said crash of said computer system;
determining a tag sequence and a tag depth corresponding to said essential stack of functions;
deriving a list of permissible tag permutations corresponding to said computer system; and
utilizing said tag sequence and said tag depth in combination with said list of permissible tag permutations to identify a culprit module responsible for said computer crash; and
provided said pcpu lockup of said computer system is due to said software issue, determining which thread is a culprit thread responsible for said pcpu lockup of said computer system.

2. The computer-implemented method of claim 1, wherein said receiving said core dump further comprises:
automatically receiving said core dump.

3. The computer-implemented method of claim 1, further comprising:
provided said pcpu lockup of said computer system is not due to said software issue, providing a notification that said pcpu lockup is due to a hardware issue.

4. The computer-implemented method of claim 1, further comprising:
provided said pcpu lockup of said computer system is not due to said software issue, providing a notification that said pcpu lockup is due to a firmware issue.

5. The computer-implemented method of claim 1, wherein said automatically analyzing said core dump with a processor further comprises:
automatically evaluating timestamp data associated with said pcpu lockup; and
automatically evaluating hardware-related state information associated with said pcpu lockup.

6. The computer-implemented method of claim 1, further comprising:
providing a notification for display on a graphic user interface of a computer, wherein said notification identifies said culprit thread responsible for said pcpu lockup of said computer system.

7. In an automated end-to-end system for analysis of customer service requests,
a method for analyzing a core dump corresponding to a crash of a computer system, said method comprising:
receiving a core dump, wherein said core dump corresponds to a customer service request regarding a crash of said computer system;
automatically analyzing said core dump with a processor to determine if said pcpu lockup of said computer system is due to a software issue, wherein said automatically analyzing said core dump further comprises:
automatically determining a culprit module responsible for said crash of said computer system, said core dump including crash results corresponding to said crash; and
automatically generating a signature back trace, wherein said signature back trace pertains to a symptom of said crash of said computer system, and wherein said automatically determining a culprit module responsible for said crash of said computer system further comprises:
generating an essential stack of functions corresponding to said crash of said computer system;
determining a tag sequence and a tag depth corresponding to said essential stack of functions;

deriving a list of permissible tag permutations corresponding to said computer system; and utilizing said tag sequence and said tag depth in combination with said list of permissible tag permutations to identify a culprit module responsible for said computer crash; and provided said pcpu lockup of said computer system is due to said software issue, determining which thread is a culprit thread responsible for said pcpu lockup of said computer system.

8. The method of claim 7, wherein said receiving said core dump further comprises:

automatically receiving said core dump.

9. The method of claim 7, further comprising:

provided said pcpu lockup of said computer system is not due to said software issue, providing a notification that said pcpu lockup is due to a hardware issue.

10. The method of claim 7, further comprising:

provided said pcpu lockup of said computer system is not due to said software issue, providing a notification that said pcpu lockup is due to a firmware issue.

11. The method of claim 7, wherein said automatically analyzing said core dump with a processor further comprises:

automatically evaluating timestamp data associated with said pcpu lockup; and automatically evaluating hardware-related state information associated with said pcpu lockup.

12. The method of claim 7, further comprising:

providing a notification for display on a graphic user interface of a computer, wherein said notification identifies said culprit thread responsible for said pcpu lockup of said computer system.

* * * * *